United States Patent
Ishikawa et al.

(10) Patent No.: US 6,782,961 B1
(45) Date of Patent: Aug. 31, 2004

(54) DRIVING CONTROL APPARATUS FOR INDUSTRIAL VEHICLE

(75) Inventors: Kazuo Ishikawa, Kariya (JP); Hiroyuki Taniguchi, Kariya (JP); Hideaki Shima, Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/690,420

(22) Filed: Oct. 17, 2000

(30) Foreign Application Priority Data

| Oct. 18, 1999 | (JP) | 11-294783 |
| Oct. 18, 1999 | (JP) | 11-294784 |
| Oct. 18, 1999 | (JP) | 11-294795 |
| Oct. 18, 1999 | (JP) | 11-294796 |
| Oct. 18, 1999 | (JP) | 11-294797 |
| Aug. 8, 2000 | (JP) | 2000-239819 |

(51) Int. Cl.[7] .................... B60K 23/00
(52) U.S. Cl. .................... 180/197; 701/71
(58) Field of Search .................... 180/197, 170, 180/175, 176, 177, 338; 701/70, 71, 74, 78, 87

(56) References Cited

U.S. PATENT DOCUMENTS

| 4,771,850 A | * | 9/1988 | Matsuda | 180/197 |
| 4,913,270 A | | 4/1990 | Ishido et al. | 192/4 A |
| 4,989,470 A | | 2/1991 | Bulgrien | 74/335 |
| 5,150,761 A | * | 9/1992 | Shimanaka et al. | 180/197 |
| 5,216,938 A | * | 6/1993 | Yamaguchi | 701/70 |
| 5,253,931 A | | 10/1993 | Köster et al. | 303/95 |
| 5,265,947 A | | 11/1993 | Wupper et al. | 303/100 |
| 5,279,382 A | * | 1/1994 | Iwata | 180/197 |
| 5,303,794 A | | 4/1994 | Hrovat et al. | 180/197 |
| 5,312,169 A | * | 5/1994 | Buschmann | 180/197 |
| 5,353,662 A | | 10/1994 | Vaughters | 74/336 R |
| 5,431,241 A | * | 7/1995 | May et al. | 180/197 |
| 5,491,634 A | * | 2/1996 | Miller et al. | 701/71 |
| 5,588,515 A | | 12/1996 | Toyama et al. | 192/4 |
| 5,682,316 A | * | 10/1997 | Hrovat et al. | 180/197 |
| 5,719,565 A | * | 2/1998 | Tsuno et al. | 701/70 |
| 5,733,220 A | | 3/1998 | Iizuka | 477/116 |
| 5,794,735 A | * | 8/1998 | Sigl | 180/170 |
| 5,918,509 A | | 7/1999 | Heilig et al. | 74/730.1 |
| 6,339,749 B1 | * | 1/2002 | Rieker et al. | 701/70 |

FOREIGN PATENT DOCUMENTS

| DE | 36 06 460 A1 | 9/1987 | B60K/17/08 |
| DE | 36 37 388 A1 | 5/1988 | B65G/25/00 |
| DE | 195 06 148 A1 | 9/1995 | F16H/59/36 |
| DE | 198 38 886 A1 | 10/1999 | B60T/7/00 |
| EP | 0 224 833 | 6/1987 | B60T/8/32 |
| EP | 0 821 188 A1 | 1/1998 | F16H/61/02 |
| JP | 4-123935 | 4/1992 | B60K/41/02 |
| JP | 6-247190 | 9/1994 | B60K/41/28 |
| JP | 10-151974 | 6/1998 | |

* cited by examiner

Primary Examiner—Frank Vanaman
(74) Attorney, Agent, or Firm—Morgan & Finnegan, LLP

(57) ABSTRACT

An industrial vehicle includes a transmission, which is coupled to an engine by a torque converter. When the vehicle is accelerating, the rotational acceleration of driving wheels is computed based on the rotational speed of the driving wheels. A traction control procedure is executed based on the rotational acceleration for eliminating spinning of the driving wheels. When the vehicle is decelerating, the rotational deceleration of the driving wheels is computed based on the rotational speed of the driving wheels. An anti-lock brake control procedure is executed based on the rotational deceleration for preventing the driving wheels from locking. As a result, skidding of the driving wheels is reliably prevented by a simple structure.

28 Claims, 30 Drawing Sheets

Fig. 33
Fig. 32
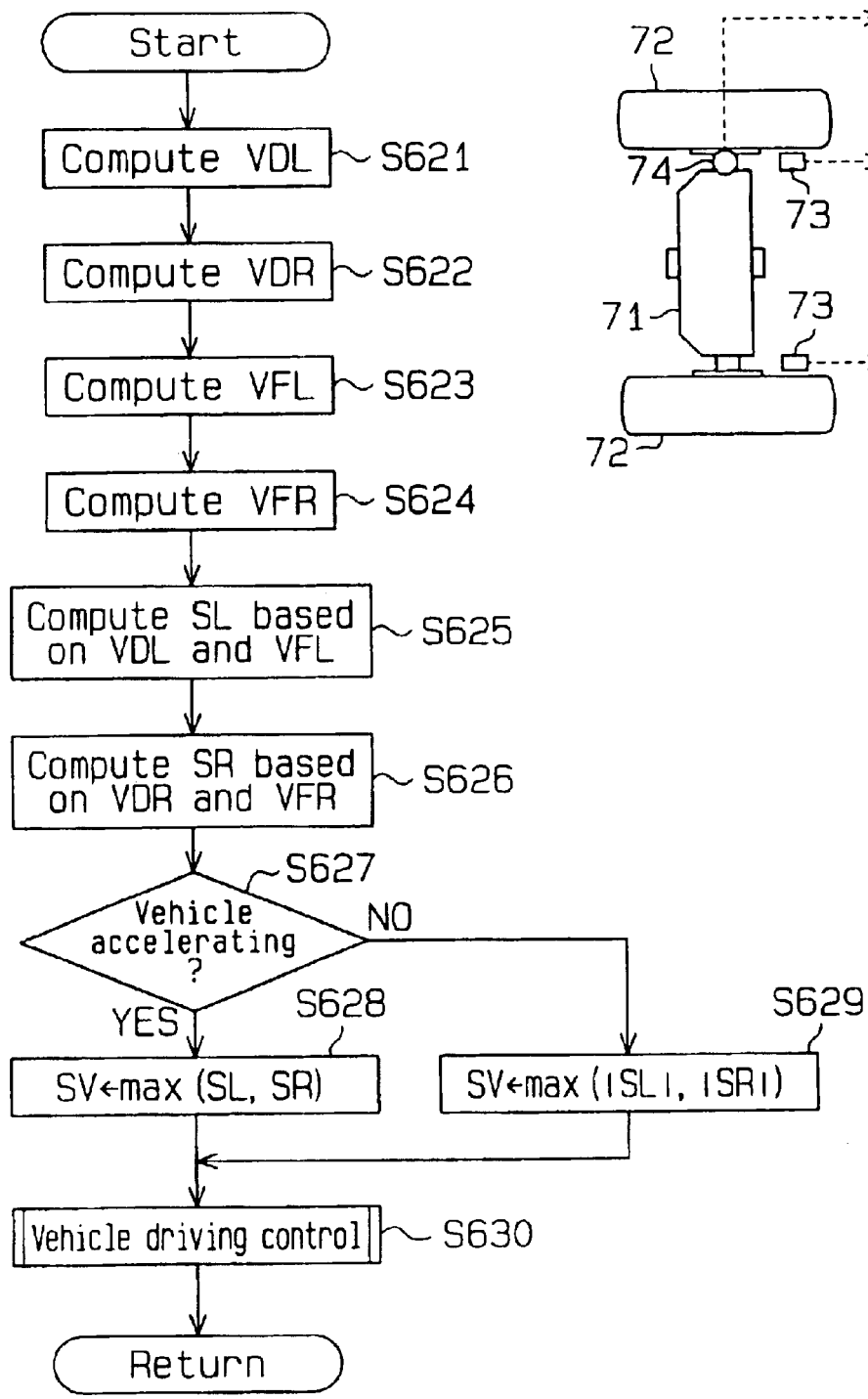
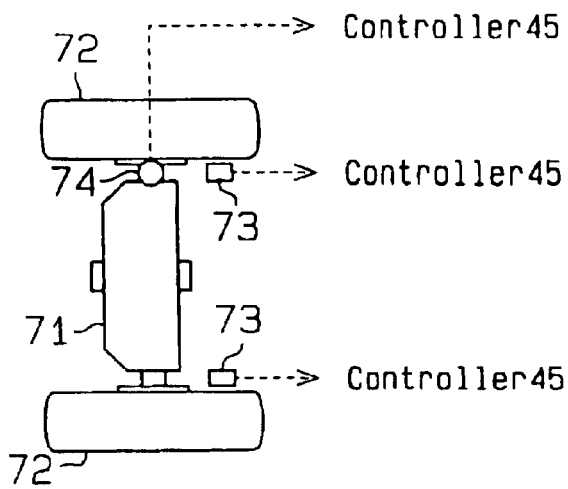

DRIVING CONTROL APPARATUS FOR INDUSTRIAL VEHICLE

BACKGROUND OF THE INVENTION

The present invention relates to a driving control apparatus for an industrial vehicle that includes a torque converter between an engine and a transmission.

Japanese Unexamined Patent Publication No. 10-151974 discloses an industrial vehicle that includes a torque converter between an engine and a transmission. The torque converter has an input shaft, which is coupled to the engine, and an output shaft, which is coupled to the transmission. The torque converter continuously varies the rotational ratio between the input shaft and the output shaft in accordance with the load on the output shaft. The torque converter and the transmission form an automatic transmission.

The vehicle of the publication does not include a clutch pedal. Basically, the vehicle is controlled by manipulating an acceleration pedal, a brake pedal and a shift lever for changing the moving direction of the vehicle. Since the vehicle has no clutch pedal, an operator need not actuate a clutch pedal, which requires subtle manipulation. The vehicle can be therefore easily operated by an inexperienced operator.

Compared to ordinary passenger cars, a typical industrial vehicle such as a forklift receives a great load on the wheels. Therefore, skidding of the wheels due to acceleration or braking wears the wheels and marks the road surface.

To avoid such disadvantages, traction control and anti-lock brake control, which have been used for ordinary passenger cars, may be used for industrial vehicles. This will prevent the wheels from spinning when the vehicle is accelerating and from locking when braking the vehicle. Hereinafter, traction control will be referred to as TRC control and anti-lock brake control will be referred to as ABS control. TRC control and ABS control, together with an automatic transmission, facilitate driving of industrial vehicles.

However, systems for TRC control and ABS control for ordinary passenger cars include multiple sensors for detecting skidding of wheels such as a sensor for detecting the speed of driving wheels and a sensor for detecting the speed of driven wheels. Further, the system needs many other special devices such as an actuator for controlling the braking force, which increases the cost. Unlike ordinary passenger cars, an industrial vehicle runs at twenty kilometers per hour at a maximum and is used in a different environment and different conditions. Thus, considering the cost and the suitability, TRC control and ABS control for ordinary passenger cars cannot be used in industrial vehicles without adjustment.

Some types of forklifts that have an automatic transmission can perform direction switching. Direction switching refers to switching a shift lever while the vehicle is running for switching the moving direction of the vehicle. Direction switching permits the vehicle to start moving in a direction that is opposite to the current moving direction after temporarily stopping without manipulating a brake pedal.

During the direction switching, the wheels must be stopped without being locked and then must be started in the opposite direction without spinning. Therefore, there is a demand for an inexpensive system that reliably prevents wheels from skidding when the moving direction is switched.

SUMMARY OF THE INVENTION

Accordingly, in an industrial vehicle that uses an automatic transmission, it is an object of the present invention to provide a driving control apparatus that performs TRC control and ABS control, which are suitable for industrial vehicle, thereby preventing the wheels from skidding with a simple structure.

To achieve the foregoing and other objectives, the present invention provides an industrial vehicle including an engine, a torque converter, a transmission coupled to the engine by the torque converter, and a driving wheel. The driving wheel is rotated by power that is transmitted from the transmission. A hydraulic brake brakes the driving wheel. The hydraulic brake generates a braking force, the magnitude of which corresponds to a hydraulic pressure applied to the hydraulic brake. A brake valve adjusts the hydraulic pressure applied to the hydraulic brake. A brake actuator is moved by a human operator to actuate the hydraulic brake. A sensor detects the rotational speed of the driving wheel. A controller controls the brake valve such that the hydraulic brake brakes the driving wheel with a force of a normal value, which corresponds to a force applied to the brake actuator. The controller computes the rotational deceleration of the driving wheel while braking based on the detected rotational speed. When the computed rotational deceleration exceeds a predetermined deceleration determination value, the controller controls the brake valve such that the braking force of the hydraulic brake is set to a limit value, which is smaller than the normal value.

The present invention also provides an industrial vehicle including an engine, a torque converter, a transmission coupled to the engine by the torque converter, and a driving wheel. The transmission includes a forward clutch, which is engaged when the vehicle is moving forward, and a reverse clutch, which is engaged when the vehicle is moving backward. The driving wheel is rotated by power that is transmitted from the transmission. A sensor detects the rotational speed of the driving wheel. A controller controls the engine and computes the rotational acceleration of the driving wheel when the vehicle is accelerating based on the detected rotational speed. When the computed rotational acceleration exceeds a predetermined acceleration determination value, the controller controls the engine output to limit the power transmitted to the driving wheel.

The present invention also provides an industrial vehicle having an engine, a torque converter, a transmission coupled to the engine by the torque converter, a forward clutch valve, a reverse clutch valve and a driving wheel. The transmission includes a hydraulic forward clutch, which is engaged when the vehicle is moving forward, and a hydraulic reverse clutch, which is engaged when the vehicle is moving backward. Each clutch produces an engaging force, the magnitude of which corresponds to a hydraulic pressure applied to the clutch. The forward clutch valve controls the hydraulic pressure applied to the forward clutch. The reverse clutch valve controls the hydraulic pressure applied to the reverse clutch. The driving wheel is rotated by power that is transmitted from the transmission. A sensor detects the rotational speed of the driving wheel. A controller controls the clutch valves and computes the rotational acceleration of the driving wheel when the vehicle is accelerating based on the detected rotational speed. When the computed rotational acceleration exceeds a predetermined acceleration determination value, the controller decreases an engaging force of one of the clutches that corresponds to the moving direction of the vehicle for decreasing the power transmitted to the driving wheel by controlling the corresponding clutch valve.

The present invention further provides an industrial vehicle having a drive source, a differential, and a pair of driving wheels coupled to the drive source by the differential. The differential permits the rotational speeds of the driving wheels to differ. A brake for brakes the driving wheels. A skid detector detects skid values, each representing the degree of skidding of one of the driving wheels. A controller controls the drive source or the brake for eliminating skidding of the driving wheels based on the greater of the detected skid values.

The present invention yet further provides an industrial vehicle having an engine, a torque converter, a transmission coupled to the engine by the torque converter, a differential, and a pair of driving wheels. The transmission includes a hydraulic forward clutch, which is engaged when the vehicle is moving forward, and a hydraulic reverse clutch, which is engaged when the vehicle is moving backward. Each clutch produces an engaging force, the magnitude of which corresponds to a hydraulic pressure applied to the clutch. The driving wheels are coupled to the transmission by the differential. The differential permits the rotational speeds of the driving wheels to differ. A skid detector detects skid values, each representing the degree of skidding of one of the driving wheels. A controller controls the clutches. When the greater of the detected skid values exceeds a predetermined acceleration determination value while the vehicle is accelerating, the controller decreases the engaging force of one of the clutches that corresponds to the moving direction of the vehicle for decreasing the power transmitted to the driving wheels.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 32 is a partial view illustrating a vehicle according to an eleventh embodiment of the present invention of the present invention;

FIG. 33 is a flowchart showing a skidding prevention control routine according to the eleventh embodiment.

DETAILED DESCRIPTION OF THE PREFERRED EMBODIMENTS

Figure 1:
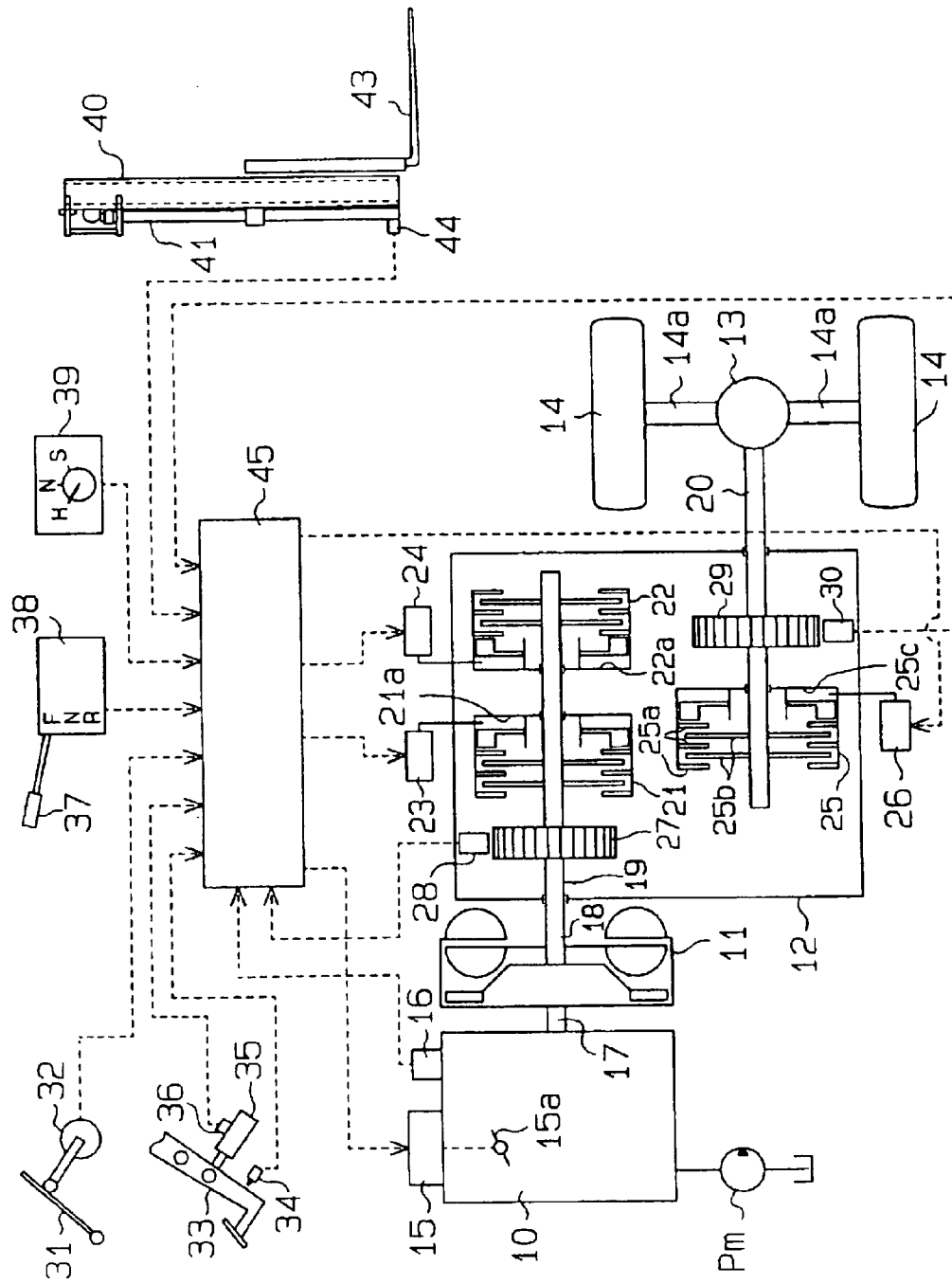
FIG. 1 is a diagrammatic view illustrating a forklift according to a first embodiment of the present invention.

A first embodiment according to the present invention will now be described with reference to FIGS. 1 to 6. As shown in FIG. 1, an industrial vehicle, which is a forklift, is driven by an engine 10. The engine 10 is coupled to a transmission 12 by a hydraulic torque converter 11. The transmission 12 is coupled to left and right driven shafts 14a by a differential 13. Each driven shaft 14a is coupled to a driving wheel, which is a front wheel 14.

The engine 10 includes a throttle valve 15a for controlling the power of the engine 10 and a throttle actuator 15 for actuating the throttle valve 15a. The throttle actuator 15 adjusts the opening size of the throttle valve 15a, or the throttle opening size TH, for controlling the engine power and the engine speed Ne. The engine 10 includes an engine speed sensor 16. The engine speed sensor 16 detects the speed of a crankshaft (not shown), or the engine speed NE. The engine speed sensor 16 includes, for example, a magnetic sensor.

The torque converter 11 includes an impeller pump and a turbine. An input shaft 17 extends from the impeller pump and is coupled to the crankshaft. An output shaft 18 extends from the turbine and is coupled to an input shaft 19 of the transmission 12. The torque converter 11 continuously varies the ratio of the speed of the output shaft 18 to the speed of the input shaft 17 in accordance with the load on the output shaft 18.

The transmission 12 includes an output shaft 20, which is coupled to the differential 13. The transmission 12 includes a forward clutch 21, a reverse clutch 22 and two sets of reduction gears, one corresponding to each of the clutches 21, 22. The clutches 21, 22 and the reduction gears are located between the input shaft 19 and the output shaft 20.

The forward clutch 21 selectively engages and disengages the input shaft 19 with the output shaft 20 though the corresponding reduction gears. The reverse clutch 22 selectively engages and disengages the input shaft 19 with the output shaft 20 through the corresponding reduction gears. The clutches 21, 22 are multiple disk hydraulic wet clutches. The engaging force of the clutches 21, 22 is controlled by changing the oil pressure in oil chambers 21a, 22a (clutch pressures PFCL, PRCL). In other words, the power transmission efficiency from the input shaft 19 to the output shaft 20 is varied.

When the clutch pressures PFCL, PRCL are zero, the clutches 21, 22 disconnect the output shaft 20 from the input shaft 19. When either clutch pressure PFCL, PRCL is a maximum value PFCLmax, PRCLmax, the corresponding clutch 21, 22 maximizes the engaging force to set the transmission efficiency to one hundred percent. When either clutch pressure PFCL, PRCL is between zero and the maximum value PFCLmax, PRCLmax, the corresponding clutch 21, 22 is partially engaged.

When the vehicle is moving forward, the forward clutch 21 is engaged and the reverse clutch 22 functions as a hydraulic brake. When the vehicle is moving backward, the reverse clutch 22 is engaged and the forward clutch 21 functions as a hydraulic brake. When functioning as a hydraulic brake, if the clutch pressure PFCL, PRCL is zero, the corresponding clutch does not brake. The clutches 21, 22 increase the braking force as the corresponding clutch pressure PFCL, PRCL increases.

The transmission 12 has a clutch-type parking brake 25, which is located on the output shaft 20. The parking brake 25 is a multiple disk hydraulic wet clutch and includes brake disks 25b fixed to the output shaft 20, brake pads 25a and an oil chamber 25c. Each brake pads 25a is urged toward the corresponding brake disk 25b by a spring (not shown). The pressure of oil supplied to the oil chamber 25c, or parking brake pressure PBCL, urges the brake pads 25a away from the brake disks 25b against the force of the spring. The parking brake 25 does not brake the vehicle when the parking brake pressure PBCL is a predetermined maximum value PBCLmax. As the parking brake pressure PBCL decreases toward zero, the parking brake 25 increases the braking force.

The transmission 12 includes clutch valves 23, 24 and a parking brake valve 26, which control the flow rate of oil to the oil chambers 21a, 22a, 25c. The valves 23, 24, 26 are electromagnetic proportional control valves. The transmission 12 also includes a hydraulic pump Pm driven by the engine 10. Oil discharged from the pump Pm is supplied to the oil chambers 21a, 22a, 25c through the valves 23, 24, 26, respectively.

The torque converter 11, the transmission 12, the valves 23, 24, 26 and the hydraulic pump Pm are housed in a single housing to form an automatic transmission device.

A gear 27 is fixed to the input shaft 19, and a gear 29 is fixed to the output shaft 20. The speed NT of the input shaft 19 is detected by a rotational speed sensor, which is an input speed sensor 28. The input speed sensor 28 outputs a pulse signal every time the input speed sensor 28 detects a tooth of the gear 27. A rotational speed sensor, which is an output speed sensor 30, detects the speed ND of the output shaft 20. The output speed sensor 30 outputs a pulse signal every time the output speed sensor 30 detects a tooth of the gear 29.

An acceleration pedal 31 and a brake pedal 33 are provided on the floor of the cab (not shown). The depression degree ACC of the acceleration pedal 31 is detected by a pedal sensor 32, which is a potentiometer. A brake switch 34 detects when the brake pedal 33 is located in a braking position. An emulator 35 is coupled to the brake pedal 33 to generate a pressure (brake actuation pressure PBRK), which corresponds to the force applied to the brake pedal 33. A pressure sensor 36 detects the brake actuation pressure PBRK generated by the emulator 35.

A shift lever 37 for determining the moving direction of the vehicle is provided in cab. The shift lever 37 is switched among a neutral position N, a forward position F and a reverse position R. When the shift lever 37 is at the neutral position N, the clutches 21, 22 are disengaged and the vehicle does not move. When the lever 37 is at the forward position F, the forward clutch 21 is engaged, which moves the vehicle forward. When the lever 37 is at the reverse position R, the reverse clutch 22 is engaged, which moves the vehicle backward. The position of the shift lever 37 is detected by a shift position switch 38.

A mode switch 39 is located in the cab. An operator adjusts the deceleration rate when braking the vehicle by the mode switch 39 according to his preference. The deceleration rate is switched among a normal mode, a hard mode and a soft mode.

A mast 40 is supported on the front of the vehicle. A fork 43 is supported by the mast 40. The fork 43 is lifted and lowered by a lift cylinder 41. The mast 40 is pivoted by a tilt cylinder (not shown). A hydraulic pump (not shown), which is driven by the engine 10, discharges oil to actuate the lift cylinder 41 and the tilt cylinder. A load weight sensor 44 detects the load weight W on the fork 43. More particularly the load weight sensor 44 detects the oil pressure in the lift cylinder 41. A lift lever and a tilt lever (both not shown) are provided in the cab for controlling the lift cylinder 41 and the tilt cylinder, respectively.

Figure 2:
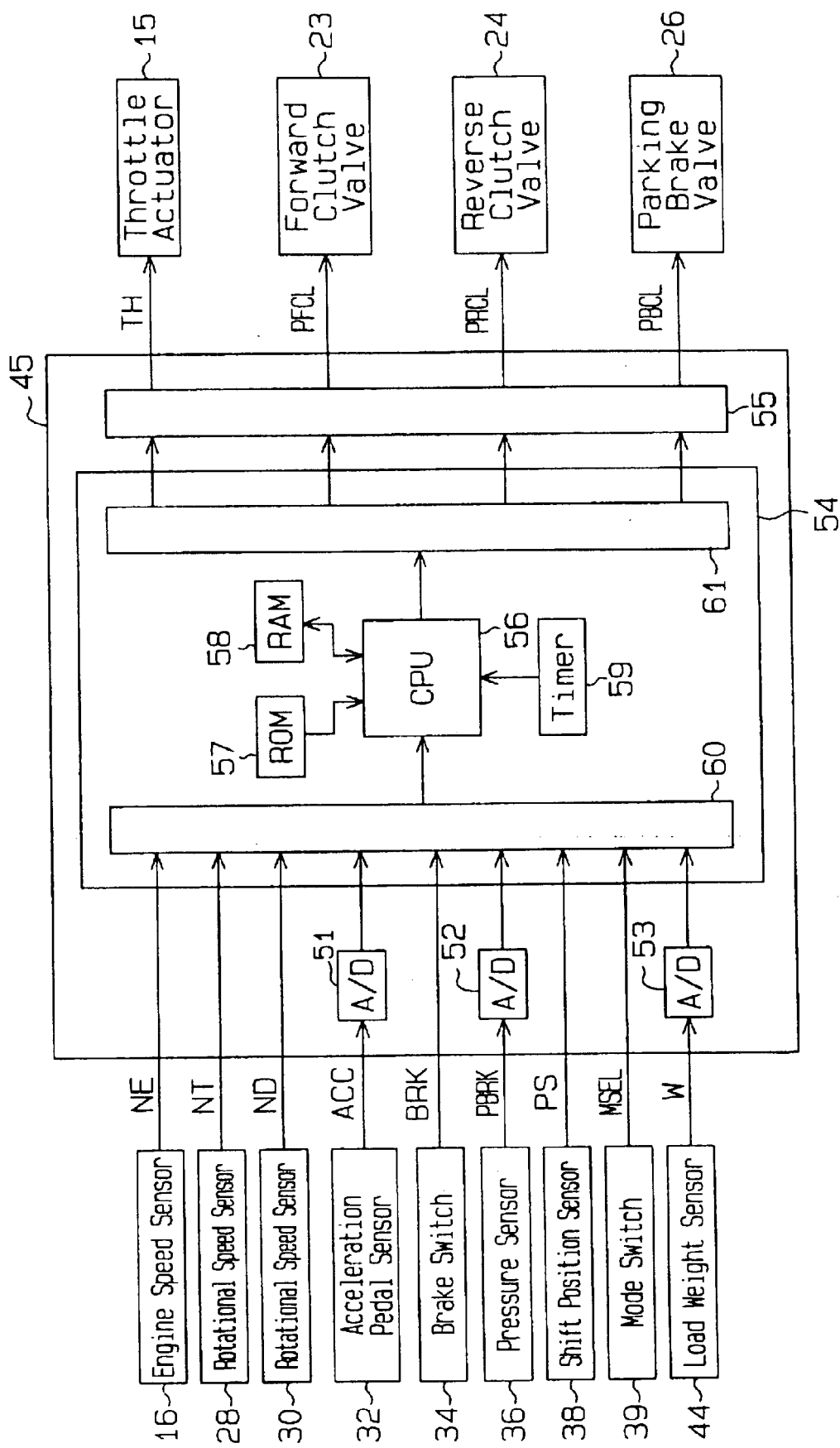
FIG. 2 is a block diagram showing the electric configuration of the forklift of FIG. 1.
Figure 3:
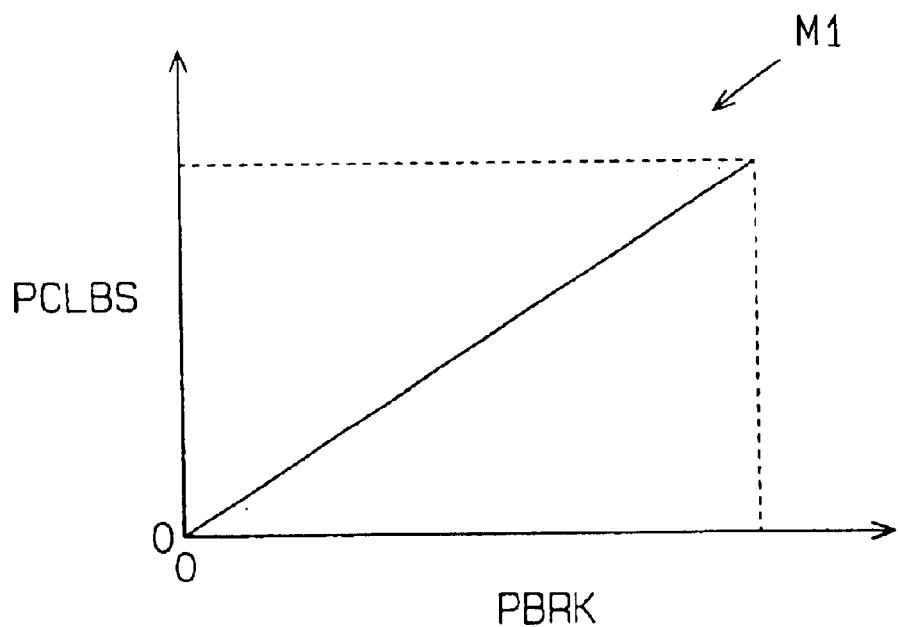
FIG. 3 is a graph showing the relationship between a brake actuation pressure PBRK and a basic brake pressure PCLBS.

The above described devices are controlled by a controller 45. The electrical construction of the forklift, which is centered by the controller 45, will now be described. As shown in FIG. 2, the controller 45 includes an analog-to-digital converters 51, 52, 53, a microcomputer 54 and a drive circuit 55. The microcomputer 54 includes a central processing unit (CPU) 56, a read only memory (ROM) 57, a random access memory (RAM) 58, a timer 59, an input interface 60 and an output interface 61.

The engine speed sensor 16 outputs pulse signals, which represent the engine speed NE, to the input interface 60. The input speed sensor 28 outputs pulse signals, which represent the speed NT of the input shaft 19 of the transmission 12, or the speed of the output shaft 18 of the torque converter 11, to the input interface 60. The output speed sensor 30 outputs pulse signals, which represent the speed ND of the output shaft 20 of the transmission 12 to the input interface 60. The speed ND of the output shaft 20 is proportional to the vehicle speed V.

The acceleration pedal sensor 32 outputs voltage signals, which represent the depression degree ACC, to the input interface 60 through the analog-to-digital converter 51. The brake switch 34 outputs a brake signal BRK, which indicates that the brake pedal 33 is depressed, to the input interface 60. The pressure sensor 36 outputs voltage signals, which represent the brake actuation pressure PBRK, to the input interface 60 through the analog-to-digital converter 52. The shift position switch 38 outputs a signal PS, which represents the position of the shift lever 37 to the input interface 60. The mode switch 39 outputs a signal MSEL, which represents the selected deceleration mode, to the input interface 60. The load weight sensor 44 outputs a voltage signal, which represents the weight W of a load to the input interface 60 through the analog-to-digital converter 52.

The CPU 56 controls the throttle actuator 15 through the output interface 61 and the drive circuit 55 such that a desired throttle opening size TH is obtained. The CPU 56 controls the clutch valves 23, 24 through the output interface 61 and the drive circuit 55 such that desired clutch pressures PFCL, PRCL are obtained. The CPU 56 further controls the parking brake valve 26 through the output interface 61 and the drive circuit 55 such that a desired parking brake pressure PBCL is obtained.

The CPU 56 executes various kinds of control procedures 1) to 4) according to control programs and maps, which are previously stored in the ROM 57.

1) Throttle Control Procedure

The CPU 56 computes the throttle opening size TH based on the pedal depression degree ACC and actuates the throttle actuator 15 for setting the actual throttle opening size to the computed throttle opening size TH.

2) Clutch Control Procedure

When the shift lever 37 is at the neutral position N, the CPU 56 controls the clutch valves 23, 24 such that the clutch pressures PFCL, PRCL of the clutches 21, 22 are set to zero. Accordingly, the clutches 21, 22 are disengaged.

When the shift lever 37 is switched from the neutral position N to the forward position F, the CPU 56 controls the forward clutch valve 23 such that the forward clutch pressure PFCL is changed from zero to a predetermined initial value PFCL0, which engages the forward clutch 21. The initial value PFCL0 is smaller than the maximum value PFCLmax. Therefore, the forward clutch 21 is partially engaged. When the forward clutch pressure PFCL is quickly increased from zero to the initial value PFCL0, the vehicle starts gently, not abruptly.

Until the difference ΔN between the engine speed NE and the speed NT of the output shaft 18 of the torque converter 11 becomes smaller than a determination value ΔN0, the CPU 56 maintains the initial value PFCL0 of the forward clutch pressure PFCL. The engine speed NE is equal to the speed NP of the input shaft 17 of the torque converter 11. When the speed difference ΔN is smaller than the determination value ΔN0, the CPU 56 controls the forward clutch valve 23 such that the forward clutch pressure PFCL is changed from the initial value PFCL0 to the maximum value PFCLmax, which completely engages the forward clutch 21.

When the shift lever 37 is switched from the neutral position N to the reverse position R, the CPU 56 executes the same procedure as when the lever 37 is switched to the forward position F. First, the CPU 56 controls the reverse clutch valve 24 such that the reverse clutch pressure PRCL is changed from zero to a predetermined initial value PRCL0. Then, when the difference ΔN between the engine speed NE (the speed NP of the input shaft 17) and the speed NT of the output shaft 18 is less than the determination value ΔN0, the CPU 56 controls the reverse clutch valve 24 such that the reverse clutch pressure PRCL is changed from the initial value PRCL0 to the maximum value PRCLmax.

3) Parking Brake Control Procedure

When the shift lever 37 is at the forward position F or the reverse position R and the pedal depression degree ACC is not zero, the CPU 56 controls the parking brake valve 26 such that the parking brake pressure PBCL is changed from zero to the maximum value PBCLmax. Accordingly, the parking brake 25 is switched from a braking state to a non-braking state.

The CPU 56 computes the vehicle speed V based on the speed ND of the output shaft 20 of the transmission 12. When the vehicle speed V is less than a predetermined determination value V0 and the brake signal BRK has been received by the CPU 56 over a predetermined determination period T0, the CPU 56 judges that vehicle is in a non-moving state. When the CPU 56 determines that the vehicle is in the non-moving state, the CPU 56 controls the parking brake valve 26 such that the parking brake pressure PBCL is changed from the maximum value PBCLmax to zero, which causes the parking brake 25 to brake the vehicle 4) Service Brake Control Procedure When the shift lever 37 is at the forward position F, the CPU 56 uses the reverse clutch 22 as a service brake. Particularly, when receiving the brake signal BRK, the CPU 56 actuates the reverse clutch 22 for braking the vehicle. When the shift lever 37 is at the reverse position R, the CPU 56 uses the forward clutch 21 as a service brake. Particularly, when receiving the brake signal BRK, the CPU 56 actuates the forward clutch 21 for braking the vehicle.

Hereinafter, when the clutch 21 or the clutch 22 functions as a service brake, the clutch will be referred to as a service brake. The clutch pressure PFCL, PRCL of the clutch functioning as a service brake will be referred to as clutch pressure PCL.

Figure 6:
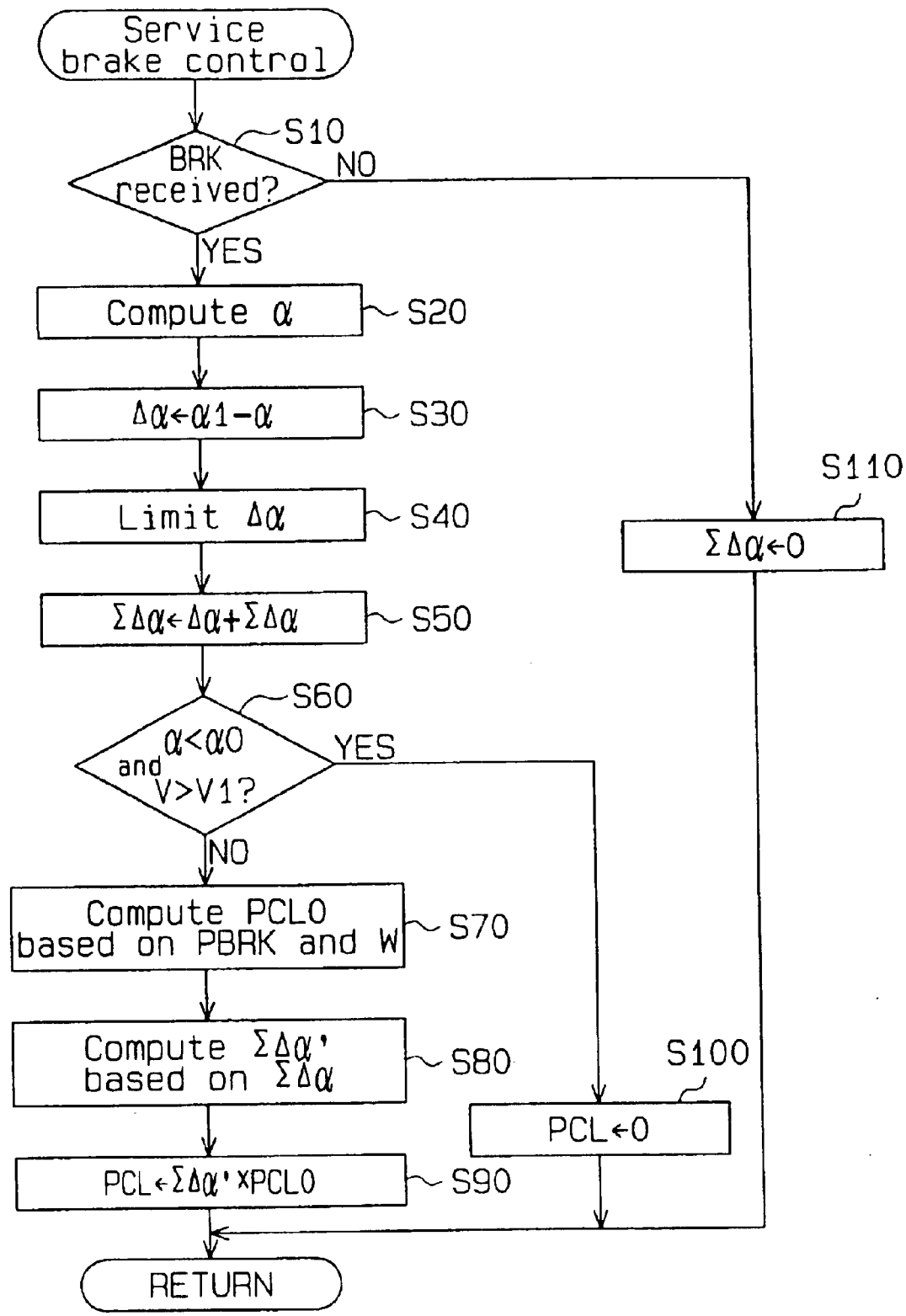
FIG. 6 is a flowchart showing a service brake control routine.

The service brake control procedure will now be described. FIG. 6 is a flowchart showing a service brake control routine. The routine of FIG. 6 is executed at predetermined intervals (for example ten milliseconds) while the shift lever 37 is in the forward position F or in the reverse position R.

In step S10, the CPU 56 judges whether it has received the brake signal BRK. If the CPU 56 has received the brake signal BRK, the CPU 56 determines that the brake pedal 33 is being depressed and moves to step S20. In step S20, the CPU 56 computes the acceleration $\alpha$ of the output shaft 20 of the transmission 12. The acceleration $\alpha$ is computed based on the difference between the speed ND of the output shaft 20 in the previous routine and the speed ND in the current routine. It is understood that a negative value of $\alpha$ represents deceleration, even if the term "deceleration" is not used. The following discussion concerns deceleration, and $\alpha$ represents negative values. Thus, a reference to lower acceleration refers to greater deceleration.

In step S30, the CPU 56 computes the difference $\Delta\alpha$ between the acceleration $\alpha$ and a reference value $\alpha 1$ ($\Delta\alpha = \alpha 1 - \alpha$). If the acceleration $\alpha$ is lower than the reference value $\alpha 1$, the difference $\Delta\alpha$ is a positive value. If the acceleration $\alpha$ is higher than the reference value $\alpha 1$, the difference $\Delta\alpha$ is a negative value.

The reference value $\alpha 1$ varies depending on the deceleration mode selected by the mode switch 39. That is, the reference value $\alpha 1$ when the hard mode is selected is lower than the value $\alpha 1$ when the normal mode is selected. The reference value $\alpha 1$ when the soft mode is selected is higher than that when the normal mode is selected.

In step S40, the CPU 56 limits the difference $\Delta\alpha$ to a predetermined range. That is, if the difference $\Delta\alpha$ is a negative value, the CPU 56 sets the difference $\Delta\alpha$ to zero. If the difference $\Delta\alpha$ is higher than a predetermined upper limit value, the CPU 56 sets the difference $\Delta\alpha$ to the upper limit value. As a result, the difference $\Delta\alpha$ is limited in the range between zero and the predetermined upper limit value. Therefore, the difference $\Delta\alpha$ is significant only when the acceleration $\alpha$ is lower than the reference value $\alpha 1$. When the acceleration is higher than the reference value $\alpha 1$, the difference $\Delta\alpha$ is set to zero.

In step S50, the CPU 56 computes an accumulated value $\Sigma\Delta\alpha$ of the difference $\Delta\alpha$. Specifically, the CPU 56 adds the difference $\Delta\alpha$ to the current accumulated value $\Sigma\Delta\alpha$ and sets the resultant as a new accumulated value $\Sigma\Delta\alpha$. As a result of executing step S40, a difference $\Delta\alpha$ that is computed when the acceleration $\alpha$ is lower than the reference value $\alpha 1$, or a difference $\Delta\alpha$ having a positive value, is added to the accumulated value $\Sigma\Delta\alpha$ in step 50.

In step S60, the CPU 56 judges whether the acceleration $\alpha$ is lower than a predetermined determination value $\alpha 0$ and the vehicle speed V is higher than a predetermined determination value V1. The determination value $\alpha 0$ is lower than the reference value $\alpha 1$ and is used for determining whether the front wheels 14 are locked due to braking while the vehicle is running. If the acceleration $\Delta\alpha$ is higher than or equal to the determination value $\alpha 0$, the CPU 56 judges that the speed of the front wheels 14 is being lowered without skidding and moves to step S70. Also, if the vehicle speed V is equal to or lower than the determination value V1, the CPU 56 moves to step S70.

Figure 4:
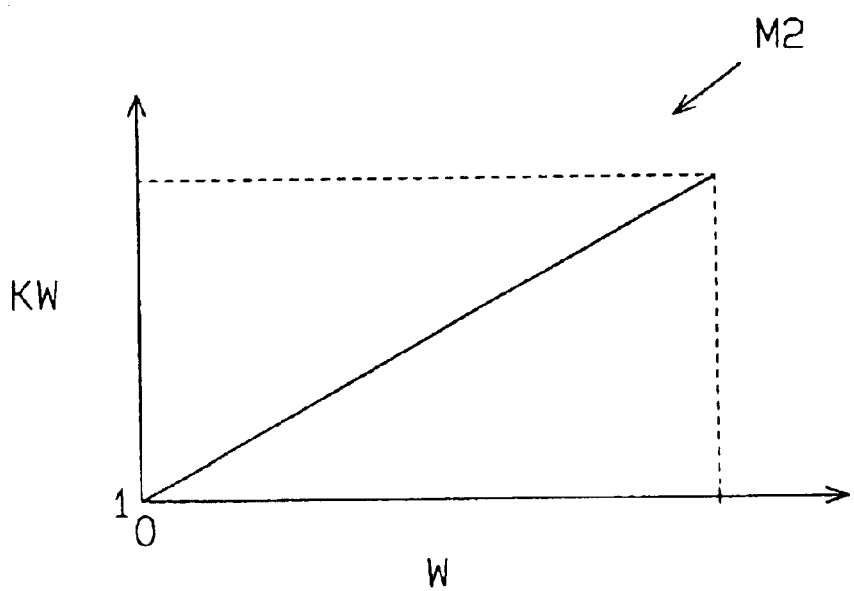
FIG. 4 is a graph showing a map for defining the relationship between a load weight W and a correction factor KW.

In step S70, the CPU 56 computes an initial clutch pressure PCL0 of the service brake 21, 22 based on the load weight W and the brake actuation pressure PBRK, which is generated by the emulator 35. Specifically, the CPU 56 computes a basic brake pressure PCLBS based on the brake actuation pressure PBRK referring to a map M1 shown in FIG. 3, which is stored in the ROM 57. The map M1 defines the relationship between the basic brake pressure PCLBS and the brake actuation pressure PBRK. Then, the CPU 56 computes a correction factor KW based on the load weight W referring to a map M2, which is shown in FIG. 4. The map M2 defines the relationship between the correction factor KW and the load weight W. The CPU 56 multiplies the basic brake pressure PCLBS by the correction factor KW and sets the resultant as the initial brake pressure PCL0. The initial brake pressure PCL0 is increased as the brake actuation pressure PBRK, which represents the force applied to the brake pedal 33, increases and as the load weight W increases.

In step S80, the CPU 56 computes a variable $\Sigma\Delta\alpha'$ based on the difference $\Delta\alpha$ and the accumulated value $\Sigma\Delta\alpha$. The variable $\Sigma\Delta\alpha'$ is a value between zero and one. When the accumulated value $\Sigma\Delta\alpha$ is zero, the variable $\Sigma\Delta\alpha'$ is one. The variable $\Sigma\Delta\alpha$ is decreased as the accumulated value $\Sigma\Delta\alpha$ increases.

Subsequently, in step S90, the CPU 56 multiplies the initial brake pressure PCL0 by the variable $\Sigma\Delta\alpha'$ and sets the resultant as the clutch pressure PCL of the service brake 21, 22. The CPU 56 then temporarily suspends the current routine. Therefore, as the variable $\Sigma\Delta\alpha'$ decreases due to increases of the accumulated value $\Sigma\Delta\alpha$, the clutch pressure PCL is lowered. The CPU 56 controls the clutch valve 23, 24 of the service brake 21, 22 such that the set clutch pressure PCL is obtained. As a result, the vehicle is braked by a force that corresponds to the clutch pressure PCL.

If the acceleration $\alpha$ is lower than the determination value $\alpha 0$ and the vehicle speed V is higher than the determination value V1 in step S60, the CPU 56 moves to step S100 and sets the clutch pressure PCL to zero. The CPU 56 then temporarily suspends the current routine. The CPU 56 controls the clutch valve 23, 24 such that the clutch pressure PCL is set to zero. The braking of the vehicle is released.

If the acceleration $\alpha$ is lower than the determination value $\alpha 0$ while the vehicle speed V is higher than the determination value V1, the speed of the front wheels 14 is likely to be rapidly dropping due to braking and the front wheels 14 are likely to be skidding. Therefore, if the outcome of step S60 is positive, the CPU 56 moves to step S100 to reduce the braking of the vehicle.

If the CPU 56 is not receiving the brake signal BPK in step S10, the CPU 56 judges that the brake pedal 33 is not currently depressed and moves to step s110. In step S110, the CPU 56 initializes the accumulated value $\Sigma\Delta\alpha$ to zero and temporarily suspends the current routine.

Figure 5A:
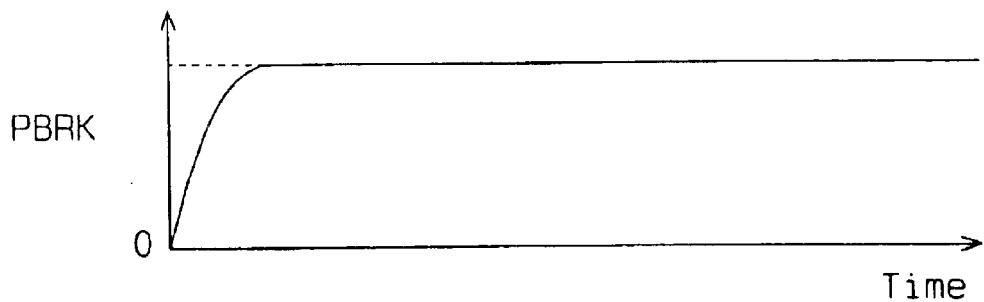
FIGS. 5(a) to 5(d) are timing charts showing changes of the actuation pressure PBRK, a vehicle speed V, a rotational acceleration α and a clutch pressure PCL.
Figure 5B:
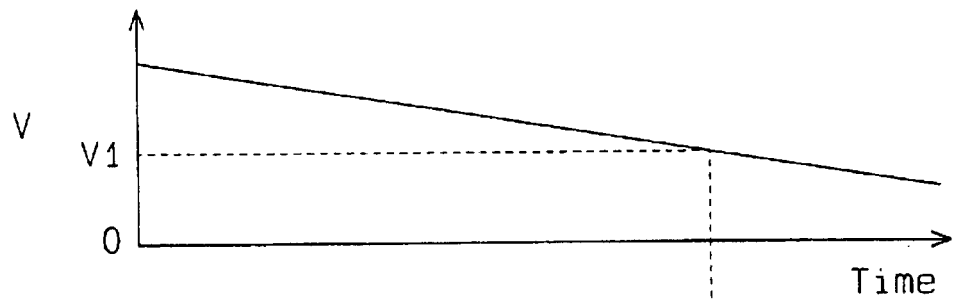
Figure 5C:
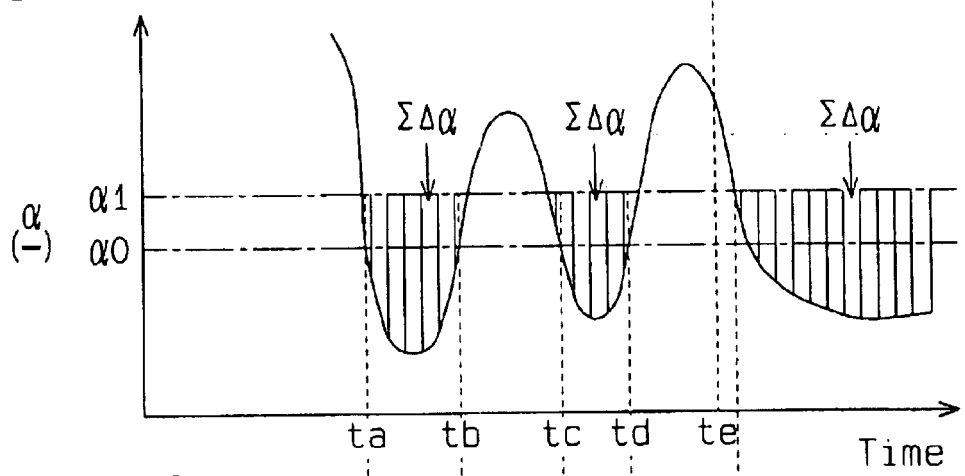
Figure 5D:
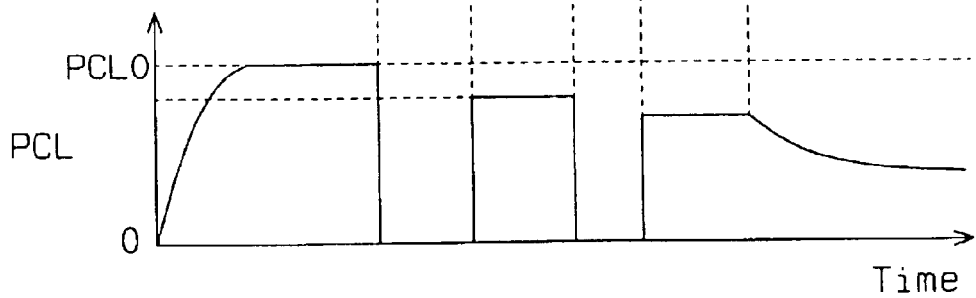

The service brake control of FIG. 6 will now be described with reference to the timing charts of FIGS. 5(a) to (d). FIG. 5(a) shows that the brake actuation pressure PBRK, which has a value corresponding to a force applied to the brake pedal 33, is generated due to a depression of the brake pedal 33 while the vehicle is running. FIG. 5(b) shows the decrease of the vehicle speed V due to the depression of the brake pedal 33. FIG. 5(c) shows changes of the acceleration $\alpha$ of the output shaft 20 of the transmission 12, or changes of the acceleration $\alpha$ of the front wheels 14. FIG. 5(d) shows changes of the clutch pressure PCL of the service brake 21, 22.

When the routine of FIG. 6 is first executed after the brake pedal 33 is depressed, the clutch pressure PCL has not been generated and the acceleration $\alpha$ is not lower than the reference value $\alpha 1$. Therefore, even if steps S30 to S50 are executed, the accumulated value $\Sigma\Delta\alpha$ is maintained at zero. Since the acceleration $\alpha$ is not lower than the reference value $\alpha 0$, the outcome of step S60 is negative. Thus, in step S90, the initial brake pressure PCL0, which is computed based on the brake actuation pressure PBRK and the load weight W, is used as the clutch pressure PCL. As a result, immediately after the brake pedal 33 is depressed, the service brake 21, 22 brakes the vehicle by a braking force that corresponds to the initial brake pressure PCL0 as shown in FIG. 5(d).

If the acceleration $\alpha$ falls below the determination value $\alpha 0$ while the vehicle speed V is higher than the determination value V1 (time ta in FIG. 5(c)), the outcome of step S60 is positive and the clutch pressure PCL is set to zero. That is, when the speed of the front wheels 14 rapidly drops due to braking, the front wheels 14 might be skidding. In this case, the braking is temporarily suspended, which prevents the front wheels 14 from locking and skidding.

When the braking is suspended, the acceleration $\alpha$ increases, that is, deceleration decreases. When the acceleration $\alpha$ exceeds the determination value $\alpha 0$ (time tb in FIG. 5(c)), the outcome of step S60 in FIG. 6 is negative and the CPU 56 moves to step S90. In step S90, the CPU 56 sets the value of the clutch pressure PCL for resuming the braking. Before the time tb, the acceleration $\alpha$ is lower than the reference value $\alpha 1$ for a certain period. Therefore, in steps S30 to S50, the accumulated value $\Sigma\Delta\alpha$ is gradually increased. Accordingly, the clutch pressure PCL that is set at time tb is less than the initial brake pressure PCL0. The accumulated value $\Sigma\Delta\alpha$ corresponds to the area of the hatched regions in FIG. 5(c).

When the acceleration $\alpha$ falls below the determination value $\alpha 0$ again (time tc in FIG. 5(c)), the clutch pressure PCL is set to zero, which suspends the braking. Accordingly, the acceleration $\alpha$ is raised above the determination value $\alpha 0$ (time td in FIG. 5(c)). This sets the clutch pressure PCL and the braking is resumed. At time td, the accumulated value $\Sigma\Delta\alpha$ is greater than that at time tb. Thus, the clutch pressure PCL at time td is less than that at time tb.

As described above, when the acceleration $\alpha$ is lower than the determination value $\alpha 0$, in other words, when the speed of the front wheels 14 rapidly decreases due to braking, the braking is temporarily suspended. Every time the braking is suspended, the braking force is gradually decreased in the subsequent braking.

When the vehicle speed V is lower than the determination value V1 (time te in FIG. 5(c)), the outcome of the step S60 in FIG. 6 is negative regardless of the acceleration $\alpha$. Thus, braking is continued. If the acceleration $\alpha$ is lower than the reference value $\alpha 1$, the difference $\Delta\alpha$ and the accumulated value $\Sigma\Delta\alpha$ are renewed. Therefore, even if the brake actuation pressure PBRK is constant, the clutch pressure PCL is gradually decreased.

When the vehicle speed V is lower than the determination value V1, the vehicle speed V is significantly low and the vehicle is about to stop. In this state, intermittent braking is undesirable. Therefore, if the vehicle speed V is lower than the determination value V1, the braking is not suspended even if the acceleration $\alpha$ is lower than the determination value $\alpha 0$, which permits the vehicle to smoothly stop. Also, when the vehicle speed V is lower than the determination value V1, the vehicle will quickly stop even if the front wheels 14 skid.

Although not shown in the timing charts of FIGS. 5(a) to 5(d), the parking brake 25 is switched from a non-braking state to a braking state by the parking brake control procedure if the vehicle speed V is lower than the determination value V0, which is lower than the determination value V1, and if the CPU 56 has been receiving the brake signal BRK over the predetermined period TO. Thus, if the brake pedal 33 is released when the vehicle is stopped, the vehicle remains braked by the parking brake 25. When the acceleration pedal 31 is depressed, the parking brake 25 is switched from braking state to non-braking state by the parking brake control procedure.

The embodiment of FIGS. 1 to 6 has the following advantages.

The transmission 12 includes the forward clutch 21 and the reverse clutch 22. When the shift lever 37 is switched to the forward position F, the forward clutch 21 is used for moving the vehicle and the reverse clutch 22 is used as a service brake. When the shift lever 37 is switched to the reverse position R, the reverse clutch 22 is used for moving the vehicle and the forward clutch 21 is used as a service brake. If the service brake 21, 22 causes the front wheels 14 to skid due when the brake pedal 33 is depressed while the vehicle is running, braking is temporarily suspended. Such intermittent braking permits the vehicle to smoothly stop without causing the front wheels 14 to skid.

In this manner, the forward clutch 21 and the reverse clutch 22 are selectively used as a service brake. This permits the vehicle to execute ABS control without requiring any extra devices.

Every time the braking is suspended and resumed, the braking force is gradually decreased. The degree of each decrease depends upon the accumulated value $\Sigma\Delta\alpha$ of the difference $\Delta\alpha$. The longer a suspension period is, the greater the accumulation value $\Sigma\Delta\alpha$ becomes. Accordingly, the braking force is decreased by a greater degree when the braking is resumed. The length of each suspension period represents the likelihood of skidding by the front wheels 14. Thus, if skidding is more likely to occur, the braking force is decreased by a greater degree after each suspension. Accordingly, the braking force is gradually decreased to a level that will not cause the front wheels 14 to skid. The brake control is therefore optimized for the road condition.

When the vehicle speed V is lower than the determination speed V1, the braking is not suspended even if the acceleration $\alpha$ is lower than the determination value $\alpha 0$, which causes the vehicle to stop smoothly.

The reference value $\alpha 1$ varies in accordance with the deceleration mode selected by the mode switch 39. As the deceleration mode is moved from the hard mode to the soft mode via the normal mode, the reference value $\alpha 1$ is raised further from the determination value $\alpha 0$. Therefore, as the deceleration mode is switched from the hard mode to the soft mode via normal mode, the acceleration $\alpha$ is more likely to fall below the reference value $\alpha 1$. Thus, the difference $\Delta\alpha$ and the accumulated value $\Sigma\Delta\alpha$ are likely to be greater in the hard mode than in the soft mode. Thus, the braking force is decreased by a greater amount every time the braking is suspended and resumed. Therefore, even if the force applied to the brake pedal 33 is the same, the deceleration of the vehicle becomes milder when the deceleration mode is changed from the hard mode to the soft mode.

Even if the force applied to the brake pedal 33 does not change, the braking force is increased as the load weight W is increased. Thus, the relationship between the force applied to the brake pedal 33 and the braking distance is substantially constant. The operator can stop the vehicle at a desired braking distance without considering the load weight W.

In the embodiment of FIGS. 1 to 6, the parking brake 25 may be omitted.

Figure 7:
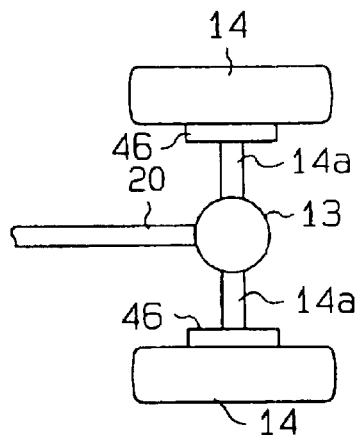
FIG. 7 is a partial diagrammatic view illustrating a vehicle according to a second embodiment, which has wheel brakes.
Figure 8:
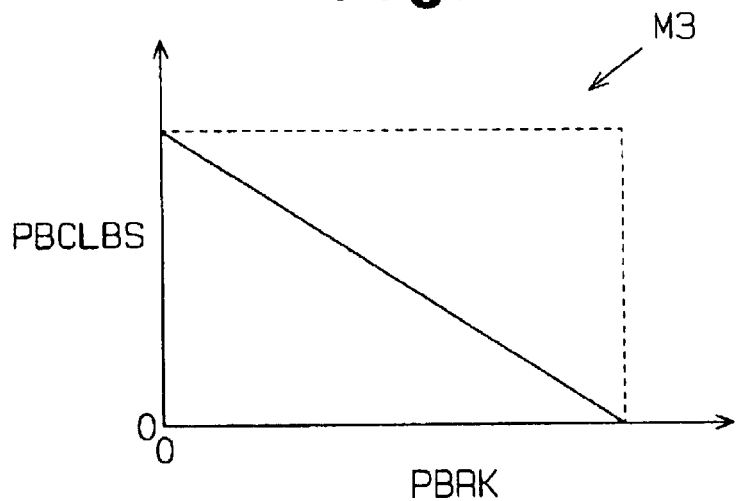
FIG. 8 is a graph showing a map that defines the relationship between the brake actuation pressure PBRK and a basic brake pressure PBCLBS.
Figure 9:
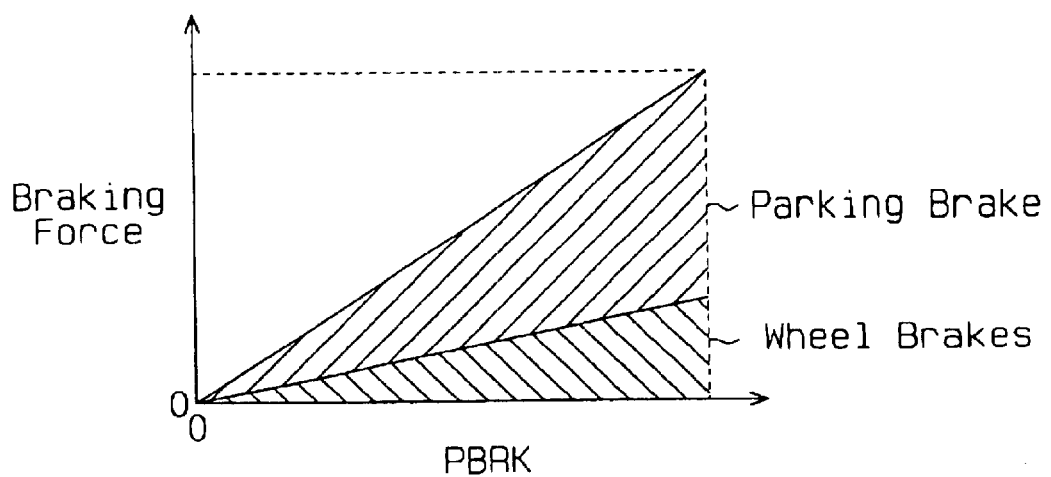
FIG. 9 is a graph showing the relationship between the brake actuation pressure PBRK and the braking force of a parking brake and the wheel brakes.

A second embodiment of the present invention will now be described with reference to FIGS. 7 to 9. Mainly, the differences from the embodiment of FIGS. 1 to 6 will be discussed below. The embodiment of FIGS. 7 to 9 is different from the embodiment of FIGS. 1 to 6 in that a wheel brake 46 is located at each front wheel 14 (see FIG. 7), and braking is executed by the parking brake 25 and the wheel brakes 46 based on a depression of the brake pedal 33. That is, in the embodiment of FIGS. 7 to 9, the forward and reverse clutches 21, 22 are not used as service brakes. Instead, the parking brake 25 and the wheel brakes 46 function as service brake.

The wheel brakes 46 are hydraulic brakes and are actuated by a master cylinder (not shown) in accordance with depression of the brake pedal 33. The master cylinder is mechanically coupled to the brake pedal 33 and applies oil pressure, the magnitude of which corresponds to the force applied to the brake pedal 33, to the wheel brakes 46. The wheel brakes 46, which are, for example, drum brakes or disk brakes, brake the front wheels 14 by a force corresponding to the applied oil pressure. Otherwise, this embodiment is the same as that of FIG. 1.

A brake control procedure of this embodiment will now be described with reference to the routine of FIG. 6. The CPU 56 executes steps S10 to S60 and S110 of FIG. 6. Steps S70 to S100 are different from those of FIG. 6.

That is, in step S70, the CPU 56 computes an initial brake pressure PBCL0 of the parking brake 25 based on the brake actuation pressure PBRK generated by the emulator 35 and the load weight W. Specifically, the CPU 56 computes the basic brake pressure PBCLBS of the parking brake 25 based on the brake actuation pressure PBRK referring to the map M3 of FIG. 8, which is stored in the ROM 57. The map M3 defines the relationship between the basic brake pressure PBCLBS and the brake actuation pressure PBRK. Since the braking force of the parking brake 25 increases as the supplied oil pressure decreases, the basic brake pressure PBCLBS is lowered to increase the brake actuation pressure PBRK. Then, the CPU 56 computes a correction factor based on the load weight W referring to a map (not shown), which is stored in the ROM 57. Unlike the map M2 of FIG. 4, the correction factor decreases as the load weight W increases. The CPU 56 multiplies the basic brake pressure PBCLBS by the correction factor and sets the resultant as the initial brake pressure PBCL0. The initial brake pressure PBCL0 has a smaller value for a greater value of the brake actuation pressure PBRK and for a greater value of the load weight W.

In step S80, the CPU 56 computes a variable $\Sigma\Delta\alpha'$ based on the accumulated value $\Sigma\Delta\alpha$ of the difference $\alpha\Delta$. In this embodiment, the variable $\Sigma\Delta\alpha'$ is equal to or greater than one. When the accumulated value $\Sigma\Delta\alpha$ is zero, the variable $\Sigma\Delta\alpha'$ is one. The variable $\Sigma\Delta\alpha'$ increases as the accumulated value $\Sigma\Delta\alpha$ increases.

In step S90, the CPU 56 multiplies the initial brake pressure PBCL0 by the variable $\Sigma\Delta\alpha'$ and sets the resultant as the parking brake pressure PBCL of the parking brake 25. Thus, the parking brake pressure PBCL increases as the variable $\Sigma\Delta\alpha'$ increases due to an increase of the accumulated value $\Sigma\Delta\alpha$. Accordingly, the braking force of the parking brake 25 is decreased. The CPU 56 controls the parking brake valve 26 such that the computed parking pressure PBCL is obtained. The parking brake 25 brakes the vehicle by a force that corresponds to the set parking brake pressure PBCL.

In step S100, the CPU 56 sets the parking brake pressure PBCL to the maximum value PBCLmax. The CPU 56 controls the parking brake valve 26 such that the parking brake pressure PBCL is set to the maximum value PBCLmax. This sets the parking brake 25 to a non-braking state.

As described above, when functioning as a service brake, the parking brake 25 operates in the same manner as the clutches 21, 22 in the embodiment of FIGS. 1 to 6 when the clutches 21, 22 function as a service brake. That is, when the brake pedal 33 is depressed, the parking brake 25 intermittently brakes the front wheels 14 such that the front wheels 14 do not skid. Every time the braking is suspended and resumed, the braking force is gradually decreased.

The wheel brakes 46 brake the front wheels 14 by a force that corresponds to the force applied to the brake pedal 33 and do not perform intermittent braking. Thus, when braking of the parking brake 25 is suspended, the vehicle continues to be braked by the wheel brakes 46. That is, when the parking brake 25 suspends braking, the total braking force is decreased to a level that does not cause the front wheels 14 to skid.

FIG. 9 is a graph defining the relationship between the brake actuation pressure PBRK and the braking force of the parking brake 25 and relationship between the brake actuation pressure PBRK and the braking force of the wheel brakes 46. The braking force of the parking brake 25 and the braking force of the wheel brakes 46 both increase as the brake actuation pressure PBRK, or the force applied to the brake pedal 33, increases. When the brake pedal 33 is depressed and the brakes 25 is braking the vehicle, the wheel brakes 46 also brake the vehicle. When the parking brake 25 suspends braking, only the wheel brakes 46 brake the vehicle.

Generally, the vehicle is moved forward more often than backward. Thus, if the forward clutch 21 and the reverse clutch 22 are used as service brakes, the reverse clutch 22 functions as a service brake more often than the forward clutch 22, which wears the reverse clutch 22 more quickly. However, in this embodiment, the forward and reverse clutches 21, 22 are not used as service brakes, and the parking brake 25 is used as a service brake, which prevents the reverse clutch 22 from being worn faster than the forward clutch 21.

The parking brake 25 and the wheel brake 46 cooperate to brake the vehicle, which prevents early wear of the parking brake 25.

The parking brake 25 is located relatively far from the front wheels, and the differential 13 is located between them. Thus, there is a little play between the parking brake and the front wheels 14. When the vehicle is stopped only by the parking brake 25, the play may cause the vehicle to sway in a direction opposite to the moving direction. However, in this embodiment, the front wheels 14 are stopped by the wheel brakes 46, which prevents the vehicle from swaying.

The embodiments of FIGS. 1 to 6 and FIGS. 7 to 9 may be modified as follows.

In the embodiment of FIGS. 1 to 6, the wheel brakes 46 of FIG. 7 may be used, and the wheel brakes 46 may be used as service brakes in addition to the front and rear clutches 21, 22. Alternatively, the forward clutch 21 or the reverse clutch 22 and the parking brake 25 may be used as service brakes. This reduces load on the clutches 21, 22.

In the embodiment of FIGS. 7 to 9, the wheel brakes 46 may be omitted and only the parking brake 25 may function as a service brake. This simplifies the structure of the vehicle.

In the embodiment of FIGS. 7 to 9, the forward and reverse clutches 21, 22 may be used as service brakes in addition to the wheel brakes 46 and the parking brake 25. This reduces the load on the parking brake 25.

In the embodiments of FIGS. 1 to 9, the braking force need not represent the accumulated value $\Sigma\Delta\alpha$ of the difference $\Delta\alpha$. That is, steps S25 to S50, S80 and S90 may be omitted from the routine of FIG. 6. In the embodiment of FIGS. 1 to 6, the initial brake pressure PCL0, which is computed in step S70, is always used as the clutch pressure PCL. In the embodiment of FIGS. 7 to 9, the initial brake pressure PBCL0, which is computed in step S70, is always used as the parking brake pressure PBCL.

In the embodiments of FIGS. 1 to 9, the mode switch 39 may be omitted, and the reference value $\alpha 1$ may be a fixed value that is equal to the determination value $\alpha 0$.

In the embodiments of FIGS. 1 to 9, the braking force of the parking brake 25 may be set to a predetermined value, which is greater than zero, when the acceleration $\alpha$ is lower than the determination value $\alpha 0$. That is, in the embodiment of FIGS. 1 to 6, the clutch pressure PCL may be a predetermined value, which is greater than zero, in step S100. In the embodiment of FIGS. 7 to 9, the parking brake pressure PBCL may be a predetermined value, which is smaller than the maximum value PBCLmax, in step S100.

In the embodiments of FIGS. 1 to 9, the braking force may be intermittently changed even if the vehicle speed V is lower than the determination value V1. In this case, step S60 is replaced by a step only for determining whether the acceleration $\alpha$ is lower than the determination value $\alpha 0$.

In the embodiments of FIGS. 1 to 9, the determination value $\alpha 0$ may be changed. For example, the determination value $\alpha 0$ need not be used for judging whether the front wheels 14 are locked but may be used for judging whether the vehicle running state is unstable due to braking.

A third embodiment of the present invention will now be described with reference to FIGS. 10(*a*) and 11(*d*). The embodiments of FIGS. 1 to 9 relate to control of service brakes when the brake pedal 33 is depressed. The embodiment of FIGS. 10(*a*) and 11(*d*) relates to a control procedure for preventing the front wheels 14 from spinning when the vehicle is accelerated due to depression of the acceleration pedal 31.

The vehicle of the third embodiment has substantially the same mechanical structure as the vehicle of FIG. 1. Like or the same reference numerals are given to those components that are like or the same as the corresponding components of the embodiment of FIGS. 1 to 6. The wheel brakes 46 shown in FIG. 7 may be attached to the front wheels 14.

A spin prevention control procedure according to the third embodiment will now be described. FIGS. 10(*a*) and 10(*b*) are flowchart showing a spin prevention control routine executed by the CPU 56. The CPU 56 executes this routine at predetermined intervals, for example, every ten milliseconds.

As shown in FIG. 10(*a*), the CPU 56 computes the acceleration $\alpha$ of the output shaft 20 of the transmission 12 in step S210 in the same manner as step S20 of FIG. 6. Unlike the routine of FIG. 6, the routine of FIGS. 10(*a*), 10(*b*) is executed when the vehicle is accelerated. Thus, the acceleration $\alpha$ has a positive value.

In step S211, the CPU 56 judges whether the acceleration $\alpha$ is higher than a predetermined determination value $\alpha 10$ or whether the accumulated value $\Sigma\Delta\alpha[0]$ of the difference $\Delta\alpha$ is greater than zero. The determination value $\alpha 10$ is used for judging whether the front wheels 14 are skidding due to acceleration of the vehicle. When the acceleration $\alpha$ is higher than the determination value $\alpha 10$, the CPU 56 judges that the front wheels 14 are likely to be skidding and moves to step S212. The difference $\Delta\alpha$ and the accumulated value $\Sigma\Delta\alpha[0]$ will be described with reference to steps S212 to S214. If the accumulated value $\Sigma\Delta\alpha[0]$ is higher than zero, that is, if the value $\Sigma\Delta\alpha[0]$ is positive, the CPU 56 moves to step S212.

In step S212, the CPU 56 stores the current accumulated value $\Sigma\Delta\alpha[0]$ as an accumulated value $\Sigma\Delta\alpha[1]$. In step S213, the CPU 56 computes the difference $\Delta\alpha$ between the acceleration $\alpha$ and the determination value $\alpha 10$ ($\Delta\alpha=\alpha-\alpha 10$). If the acceleration $\alpha$ is higher than the determination value $\alpha 10$, the difference $\Delta\alpha$ has a positive value. If the acceleration $\alpha$ is lower than the determination value $\alpha 10$, the difference $\Delta\alpha$ has a negative value. In step S214, the CPU 56 adds the difference $\Delta\alpha$ to the accumulated value $\Sigma\Delta\alpha[1]$ and sets the resultants as an accumulated value $\Sigma\Delta\alpha[0]$. If the difference $\Delta\alpha$ has a positive value, the accumulated value $\Sigma\Delta\alpha[0]$ will be greater than the accumulated value $\Sigma\Delta\alpha[1]$. If the difference $\Delta\alpha$ has a negative value, the accumulated value $\Sigma\Delta\alpha[0]$ is smaller than the accumulated value $\Sigma\Delta\alpha[1]$.

Although not shown in the flowchart, when the acceleration $\alpha$ is lower than a predetermined determination value $\alpha 11$, which is lower than the value $\alpha 10$, the accumulated value $\Sigma\Delta\alpha[0]$ is maintained at zero. When the acceleration $\alpha$ is raised from the value $\alpha 11$ above the determination value $\alpha 10$ for the first time, the computation of the accumulated value $\Sigma\Delta\alpha[0]$ is started. The value all represents a state in which the front wheels 14 are not skidding and is set to zero in this embodiment.

If the acceleration $\alpha$ is lower than the value $\alpha 10$ and the accumulated value $\Sigma\Delta\alpha[0]$ is lower than zero in step S211, the CPU 56 moves to step S215 and initializes the accumulated value $\Sigma\Delta\alpha[0]$ to zero.

The CPU 56 moves to step S216 either from step S214 or step S215. In step S216, the CPU 56 judges whether the accumulated value $\Sigma\Delta\alpha[0]$ is higher than zero, that is, whether the value $\Sigma\Delta\alpha[0]$ is positive. If the value $\Sigma\Delta\alpha[0]$ is positive, the CPU 56 moves to step S217 and controls the throttle actuator 15 such that the throttle opening size TH is set to a predetermined limit value TH10 regardless of the current pedal depression degree ACC. The limit value TH10 is smaller than the current throttle opening size TH. Thereafter, the CPU 56 moves to step S220 of FIG. 10(*b*). If the accumulated value $\Sigma\Delta\alpha[0]$ is not positive in step S216, the CPU 56 moves to step S220 without executing step S217. Therefore, the throttle opening size TH is set to a value that corresponds to the pedal depression degree ACC.

The limit value TH10 is determined such that the engine does not cause the front wheels 14 to spin even if the engaging force of the clutch 21, 22 that is being used for moving the vehicle is maximum. In other words, when the throttle opening size TH is equal to or smaller than the limit value TH10, the acceleration $\alpha$ does not exceed the determination value $\alpha 10$ even if the engaging force of the clutch 21, 22 that is being used for moving the vehicle is maximum. The limit value TH10 is, for example, about thirty percent of the maximum value THmax of the throttle opening size TH.

When the accumulated value $\Sigma\Delta\alpha[0]$ of the difference $\Delta\alpha$ has a positive value, the throttle opening size TH is prevented from being greater than the limit value TH10. According to steps S210 to S217, the accumulated value $\Sigma\Delta\alpha[0]$ always has a positive value when the acceleration $\alpha$ is higher than the determination value $\alpha 10$. Thus, when the acceleration $\alpha$ is higher than the determination value $\alpha 10$ and the front wheels 14 are likely to be spinning, the throttle opening size TH is limited to restrict the engine output. As a result, the front wheels 14 are prevented from spinning and skidding.

Figure 10A:
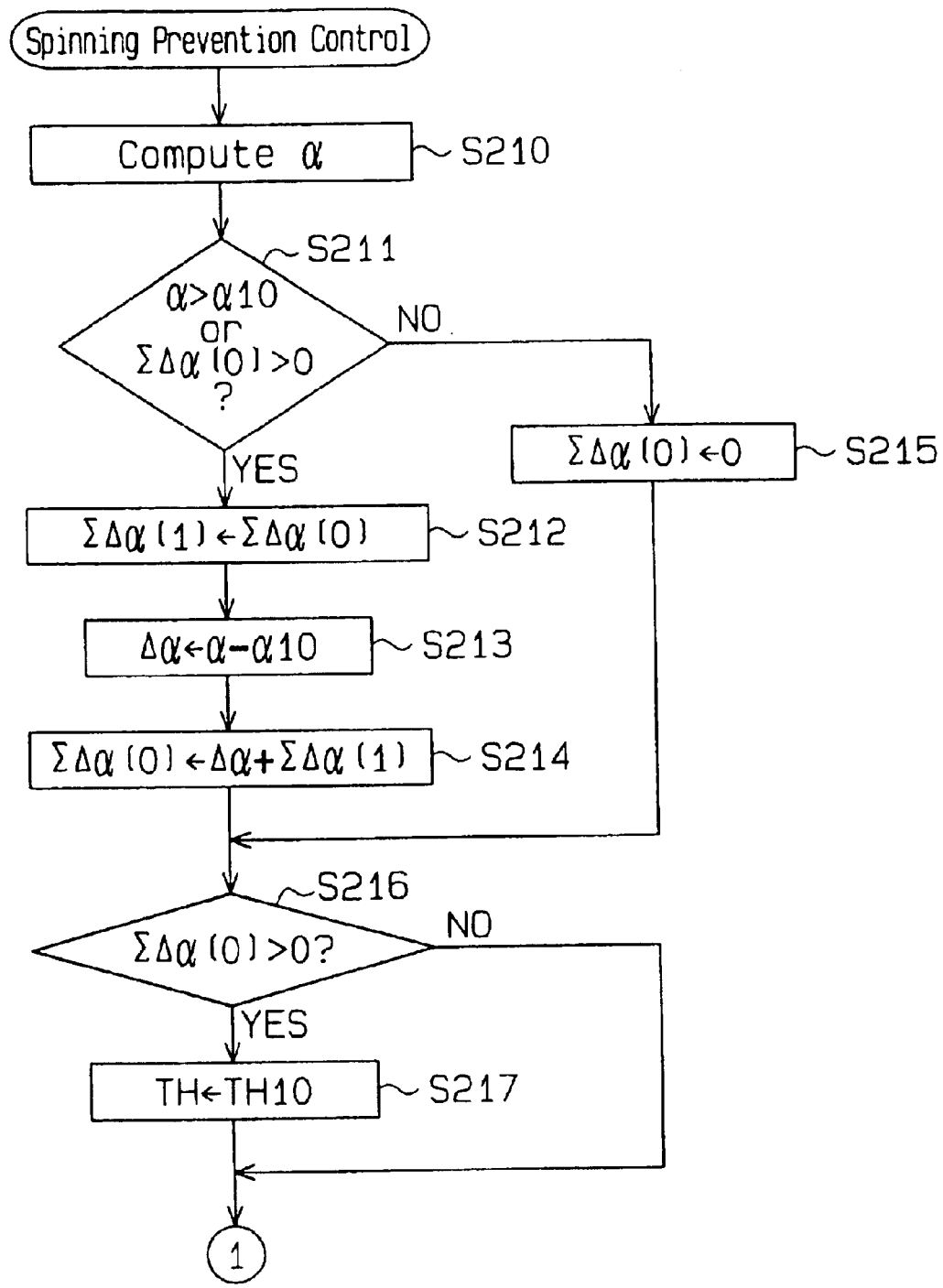
FIGS. 10(a) and 10(b) are flowcharts showing a spin prevention control routine according to a third embodiment of the present invention.
Figure 10B:
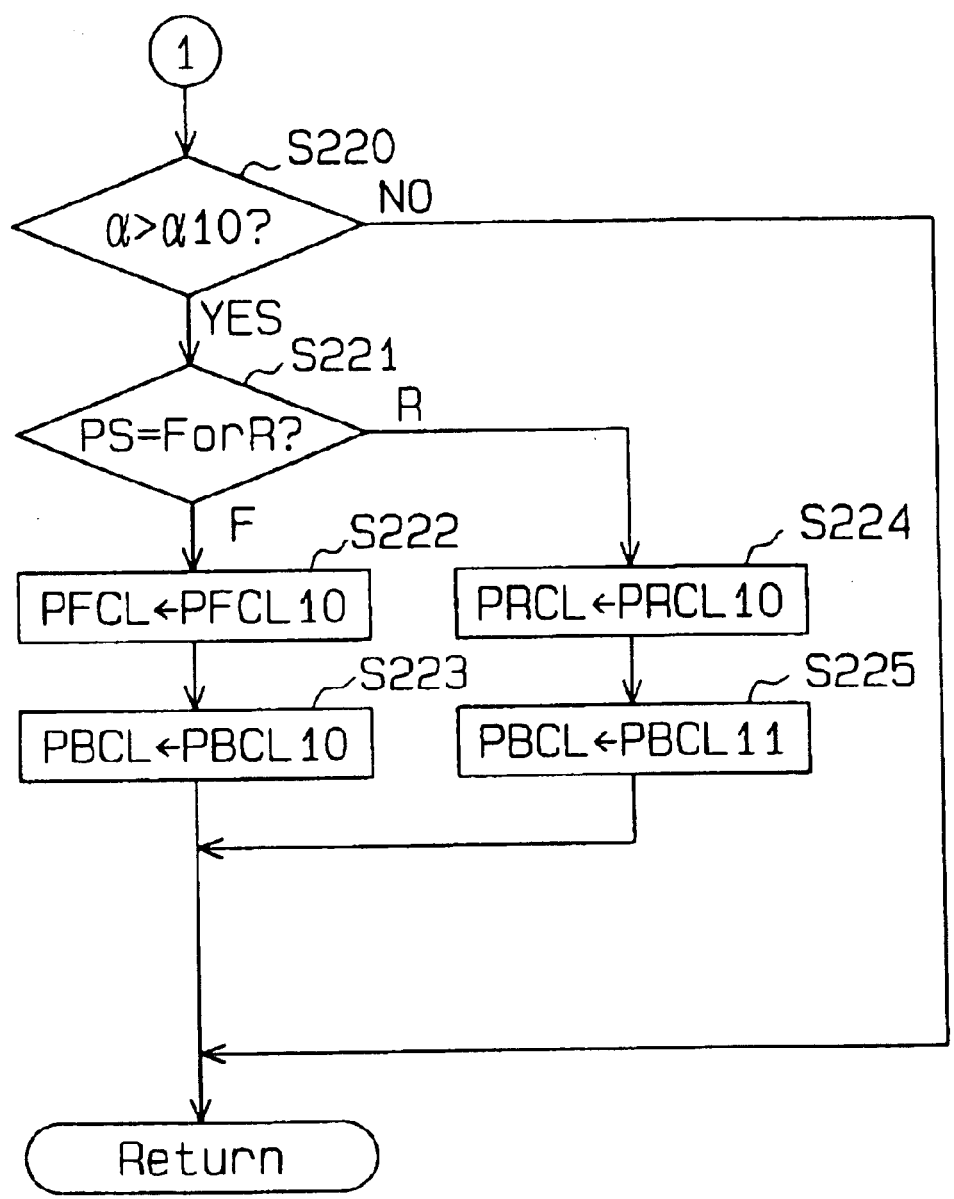

As shown in FIG. 10(b), the CPU 56 judges whether the acceleration α is higher than the determination value α10 in step S220. If the acceleration α is higher than the determination value α10, the CPU 56 moves to step S221. In step S221, the CPU 56 judges whether the signal PS, which represents the position of the shift lever 37, is indicating the forward position F or the reverse position R. If the shift position signal PS is indicating the forward position F, the CPU 56 moves to step S222. In step S222, the CPU 56 controls the forward clutch valve 23 such that the forward clutch pressure PFCL of the forward clutch 21 is set to a predetermined limit value PFCL10. The value PFCL10 is smaller than the current forward clutch pressure PFCL. Thus, the engaging force of the forward clutch 21 is weakened, which lowers the power transmission efficiency from the engine 10 to the front wheels 14. As a result, the front wheels 14 are prevented from spinning.

The limit value PFCL10 is determined such that the power that is transmitted from the engine 10 to the front wheels 14 by the forward clutch 21 does not cause the front wheels 14 to spin even if the throttle opening size TH is the maximum value THmax. In other words, if the forward clutch pressure PFCL is lower than the limit value PFCL10, the acceleration α does falls below the determination value α10 even if the throttle opening size TH is the maximum value THmax.

The limit value PFCL10 is, for example, set equal to the initial value PFCL0, which is described in the clutch control procedure section of the description of the embodiment shown in FIGS. 1 to 6. As described above, when the shift lever 37 is shifted to the forward position F, the forward clutch pressure PFCL is temporarily maintained at the initial value PFCL0 and is then increased to the maximum value PFCLmax. As long as the front wheels 14 do not spin when the throttle opening size TH is the maximum value THmax, the limit value PFCL10 may be greater than the initial value PFCL0.

In step S223, which follows step S222, the CPU 56 controls the parking brake valve 26 such that the parking brake pressure PBCL of the parking brake 25 is set to a predetermined limit value PBCL10 and temporarily suspends the current routine. The limit value PBCL10 is smaller than the maximum value PBCLmax of the parking brake pressure PBCL. When the vehicle is moving in a normal state, the parking brake pressure PBCL is maintained at the maximum value PBCLmax so that the parking brake 25 does not brake the vehicle. In step S223, the parking brake pressure PBCL is lowered from the maximum value PBCLmax to the limit value PBCL10 so that the parking brake 25 is switched from a non-braking state to a braking state. As a result, the force transmitted to the front wheels 14 is reduced. Accordingly, the front wheels 14 are prevented from spinning.

The limit value PBCL10 is determined such that the parking brake 25 prevents the front wheels 14 from spinning even if the throttle opening size TH is the maximum value THmax and the engaging force of the forward clutch 21 is maximum. In other words, when the parking brake pressure PBCL is equal to or lower than the limit value PBCL10, the acceleration α falls below the determination value α10 even if the throttle opening size TH is the maximum value THmax and the engaging force of the forward clutch 21 is maximum.

If the shift position signal PS is indicating the reverse position F in step S221, the CPU 56 moves to step S224. In step S224, the CPU 56 controls the reverse clutch valve 24 such that the reverse clutch pressure PRCL of the reverse clutch 22 is set to a predetermined limit value PRCL10. The value PFCL10 is smaller than the current reverse clutch pressure PRCL. Thus, the engaging force of the reverse clutch 22 is weakened, which lowers the transmission efficiency from the engine 10 to the front wheels 14. As a result, the front wheels 14 are prevented from spinning.

The limit value PRCL10 is determined such that the power that is transmitted from the engine 10 to the front wheels 14 by the reverse clutch 22 does not cause the front wheels 14 to spin even if the throttle opening size TH is the maximum value THmax. In other words, if the reverse clutch pressure PRCL is lower than the limit value PRCL10, the acceleration α falls below the determination value α10 even if the throttle opening size TH is the maximum value THmax.

Like the limit value PFCL10 of the forward clutch pressure PFCL, the limit value PRCL10 is, for example, set equal to or greater than the initial value PRCL0, which is described in the clutch control section of the description embodiment of FIGS. 1 to 6.

In step S225, the CPU 56 controls the parking brake valve 26 such that the parking brake pressure PBCL of the parking brake 25 is set to a predetermined limit value PBCL11. Then, the CPU 56 temporarily suspends the current routine. The limit value PBCL11 is lower than the maximum value PBCLmax of the parking brake pressure PBCL. Thus, in step S225, the parking brake pressure PBCL is lowered from the maximum value PBCLmax to the limit value PBCL11 to activate the parking brake 25. As a result, the force transmitted to the front wheels 14 is suppressed. Accordingly, the front wheels 14 are prevented from spinning.

The limit value PBCL11 is determined such that the parking brake 25 prevents the front wheels 14 from spinning even if the throttle opening size TH is the maximum value THmax and the engaging force of the reverse clutch 22 is maximum. In other words, if the parking brake pressure PBCL is equal to or lower than the limit value PBCL11, the acceleration α falls below the determination value α10 even if the throttle opening size TH is the maximum value THmax and the engaging force of the forward clutch 21 is maximum.

The limit value PBCL11, which is used when the vehicle is moving backward, is different from the limit value PBCL10, which is used when the vehicle is moving forward. This is because the braking characteristics of the parking brake 25 are different when the vehicle is moving forward from when the vehicle is moving backward.

If the acceleration α is lower than the determination value α10 in step S220, the CPU 56 temporarily suspends the current routine without executing steps S222 to S225. Thus, one of the clutches 21, 22 that is being used for moving the vehicle is controlled as in the clutch control procedure shown in FIGS. 5(a)–5(b) and 6. The parking brake 25 is switched to a non-braking state by raising the parking brake pressure PBCL to the maximum value PBCLmax.

Figure 11:
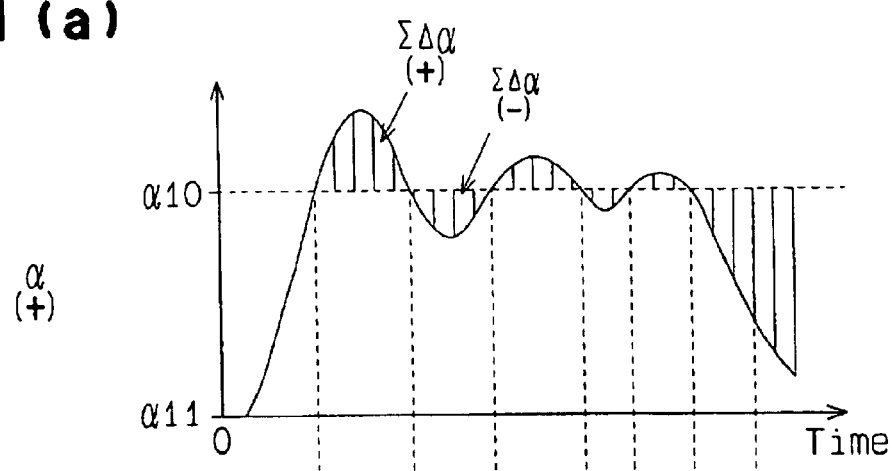
FIGS. 11(a) to 11(d) are timing charts showing changes of the acceleration α, a throttle opening size TH, a forward clutch pressure PFCL and a parking brake pressure PBCL when the vehicle is accelerating.
Figure 11:
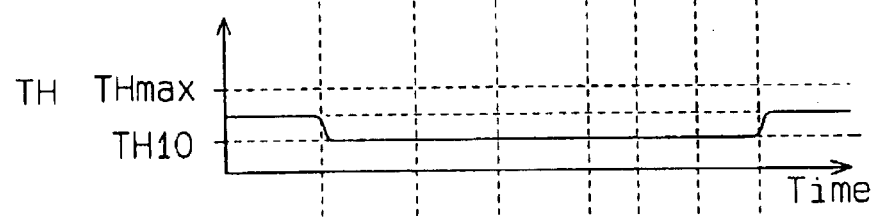
Figure 11:
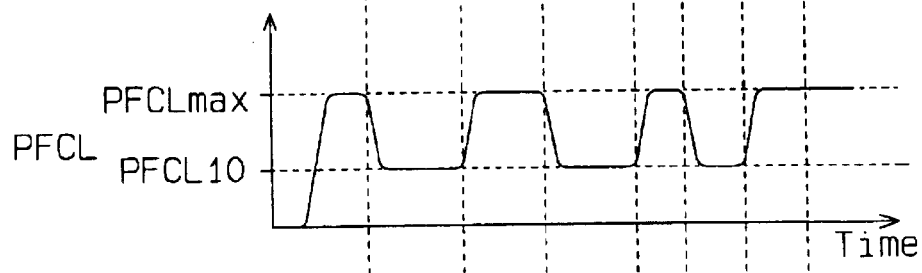
Figure 11:
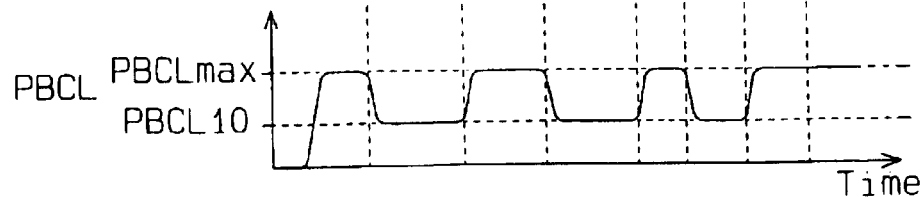
Figure 12:
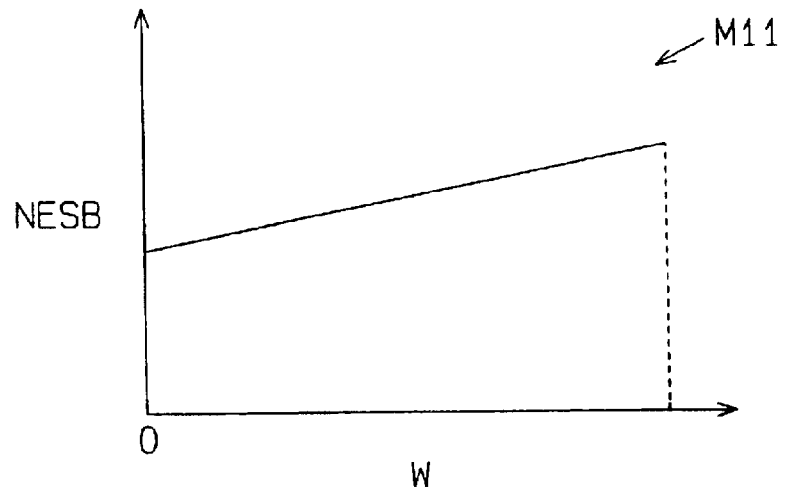
FIG. 12 is a graph showing a map for defining the relationship between the load weight W and an upper limit value NESB of an engine speed NE according to a fourth embodiment of the present invention.

The above described spin prevention control procedure will now be described with reference to the timing charts of FIGS. 11(a) to 11(d). The timing charts of FIGS. 11(a) to 11(d) represent a state in which the shift lever 37 is at the forward position F. However, if the shift lever 37 is at the reverse position R, the results will be the same. FIG. 11(a) shows changes of the acceleration α of the front wheels 14 when the vehicle is accelerated. FIGS. 11(b) to 11(d) show changes of the throttle opening size TH, the forward clutch pressure PFCL and the parking brake pressure PBCL, which correspond to the acceleration α.

When the acceleration α is raised from the reference value α11 and exceeds the determination value α10 for the first time as shown in FIG. 11(a) due to acceleration of the vehicle, the outcome of step S216 in FIG. 10(a) is positive. Therefore, as shown in FIG. 11(b), the throttle opening size TH is decreased to the limit value TH10 from a value that corresponds to the current pedal depression degree ACC.

In the routine of FIG. 10(a), the throttle opening size TH is limited to the limit value TH10 when the accumulated value $\Sigma\Delta\alpha[0]$ is a positive value even if the acceleration $\alpha$ is equal to or lower than the determination value $\alpha10$. Thus, as shown in FIGS. 11(a) and 11(b), even if the acceleration $\alpha$ falls from a value that is higher than the determination value $\alpha10$ to a value that is lower than the value $\alpha10$, the throttle opening size TH is maintained at the limit value TH10 as long as the accumulated value $\Sigma\Delta\alpha[0]$ has a positive value.

It takes time from when the CPU 56 commands the throttle actuator 15 to set the throttle opening size TH to the limit value TH10 to when the result of the command is actually reflected by the engine output. Thus, the throttle opening size TH is maintained at the limit value TH10 such that the engine output corresponds to the limit value TH10 while the accumulated value $\Sigma\Delta\alpha[0]$ has a positive value. As a result, the front wheels 14 are prevented from spinning by limiting the throttle opening size TH.

As shown in FIGS. 11(a) and 11(b), the throttle TH is returned to a value that corresponds to the pedal depression degree ACC when the accumulated value $\Sigma\Delta\alpha[0]$ is equal to or below zero as the acceleration $\alpha$ is lowered.

When the acceleration $\alpha$ exceeds the determination value $\alpha10$ as shown in FIG. 11(a), the forward clutch pressure PFCL is set to the limit value PFCL10 in step S222 of FIG. 10(b). As shown in FIG. 11(b), the forward clutch pressure PFCL changes from the maximum value PFCLmax to the limit value PFCL10 or from the limit value PFCL10 to the maximum value PFCLmax in accordance with changes of the acceleration $\alpha$ through the determination value $\alpha10$. That is, the forward clutch 21 changes its state from complete engagement to partial engagement or from partial engagement to complete engagement. As a result, the front wheels 14 are effectively prevented from spinning. While the forward clutch pressure PFCL is increasing from the initial value PFCL0 to the maximum value PFCLmax, for example, immediately after the vehicle is started, the forward clutch pressure PFCL is also changed to the limit value PFCL10 if the acceleration $\alpha$ exceeds the determination value $\alpha10$.

When the acceleration $\alpha$ exceeds the determination value $\alpha10$ as shown in FIG. 11(a), the parking brake pressure PBCL is set to the limit value PBCL10 in step S223 of FIG. 10(b). As shown in FIG. 11(d), the parking brake pressure PBCL changes from the maximum value PBCLmax to the limit value PBCL10 or from the limit value PBCL10 to the maximum value PBCLmax in accordance with changes of the acceleration $\alpha$ through the determination value $\alpha10$. That is, the parking brake 25 changes its state from the deactivated state to the activated state or from the activated state to the deactivated state. As a result, the front wheels 14 are effectively prevented from skidding.

The embodiment of FIGS. 10(a) to 11(d) has the following advantages.

The acceleration $\alpha$ of the front wheels 14 is computed based on the speed ND of the output shaft 20 of the transmission 12, or the speed ND of the front wheels 14, which are driving wheels. The spinning state (or skidding state) of the front wheels 14 is judged based on the acceleration $\alpha$. The forward or reverse clutch pressure PFCL, PRCL and the parking brake pressure PBCL are controlled based on the judged spinning state of the front wheels 14 to prevent the front wheels 14 from spinning. Therefore, spinning of the front wheels 14 during acceleration of the vehicle is prevented by a simple structure and a simple procedure without adding any new devices to the vehicle.

The front wheels 14 are prevented from skidding by limiting the throttle opening size TH, the forward or reverse clutch pressure PFCL, PRCL, and the parking brake pressure PBCL. In other words, spinning is prevented by limiting the engine output, lowering the transmission efficiency from the engine 10 to the front wheels 14 and the braking of the front wheels 14. The three procedures effectively prevent the front wheels 14 from spinning.

The throttle opening size TH is limited for preventing the front wheels 14 from spinning. This prevents the engine from generating excessive power. Accordingly, the fuel economy is improved.

A change of the power transmission efficiency due to actuation of the clutches 21, 22 and a change of the braking force due to actuation of the parking brake 25 are more quick than a change of the engine output due to actuation of the throttle valve 15a. Thus, if the front wheels 14 spin, the spinning is quickly prevented by controlling the clutches 21, 22 and the parking brake 25.

The embodiment of FIGS. 10(a) to 11(d) may be modified as follows.

Spinning of the front wheels 14 may be prevented by one or more of the throttle opening control procedure, the clutch pressure control procedure and the parking brake pressure control procedure.

The speed of the front wheels 14 may be detected at a location other than the output shaft 20 of the transmission 12. The speed of the front wheels 14 may be detected at any location in the power transmission path between the engine and the front wheels 14.

The parking brake 25 may be omitted and one of the clutches 21, 22 that is being used as the service brake when the vehicle is moving may be used as a brake for preventing the front wheels 14 from spinning. Alternatively, in the vehicle having the wheel brakes 46 shown in FIG. 7, the wheel brakes 46 may be used for preventing the front wheels 14 from spinning.

In the vehicle of FIG. 1, the acceleration pedal 31 is not mechanically coupled to the throttle valve 15a. The pedal depression degree ACC is electrically detected and the throttle valve 15a is electrically controlled based on the detected depression degree ACC. Thus, the throttle valve 15a may be controlled regardless of the detected depression degree ACC. If the acceleration pedal 31 is mechanically coupled to the throttle valve 15a, the throttle valve 15a is always controlled according to the depression degree ACC of the acceleration pedal 31. In this case, spinning of the front wheels 14 may be prevented by at least one of the clutch pressure control procedure and the brake pressure control procedure.

Unlike the vehicle of FIG. 1, the forward clutch 21 and the reverse clutch 22 are mechanically coupled to the shift lever 37 and are not electrically controlled in some vehicles. In this case, spinning of the front wheels 14 may be prevented by at least one of the throttle opening control procedure and the brake pressure control procedure.

A fourth embodiment of the present invention will now be described with reference to FIGS. 12 to 21. The fourth embodiment relates to a direction switching control procedure, which is executed when the shift lever 37 is shifted for changing the moving direction of the vehicle. Direction switching refers to changing the moving direction of the vehicle by switching the shift lever 37 from the forward position F to the reverse position R or from the reverse position R to the forward position F. Direction switching causes the vehicle to temporarily stop and start moving in the opposite direction.

During direction switching, it is desirable that the vehicle be stopped without locking the front wheels 14 and that the vehicle be started in the opposite direction without spinning the front wheels 14. The objective of the fourth embodiment is to prevent the wheels 14 from skidding during direction switching for permitting the vehicle to reliably switch directions.

The mechanical structure of the vehicle of the fourth embodiment is the same as the vehicle shown in FIG. 1. Thus, like or the same reference numerals are given to those components that are like or the same as the corresponding components of the embodiment of FIGS. 1 to 6. The wheel brakes 46 shown in FIG. 7 may be used for the front wheels 14.

Direction switching will now be described. When the shift lever 37 is shifted for switching direction, one of the clutches 21, 22 that corresponds to the moving direction prior to shifting of the shift lever 37 is disengaged. Also, the other clutch 21, 22, which corresponds to the current position of the shift lever 37, or the post-shifting clutch, is partially engaged to function as a brake. As a result, the vehicle is braked by the post-shifting clutch 21, 22. At this time, the front wheels 14 are prevented from locking by the ABS control procedure. Subsequently, the post-shifting clutch 21, 22 functions as a moving clutch to move the vehicle in the opposite direction. When the vehicle is started, the TRC control procedure is executed, which prevents the front wheels 14 from spinning.

Hereinafter, the clutch 21, 22 that corresponds to the position of the shift lever 37 after direction switching will be referred to as the post-shifting clutch. The clutch pressure PFCL, PRCL of the post-shifting clutch will be referred to as the clutch pressure PCL.

Figure 17A:
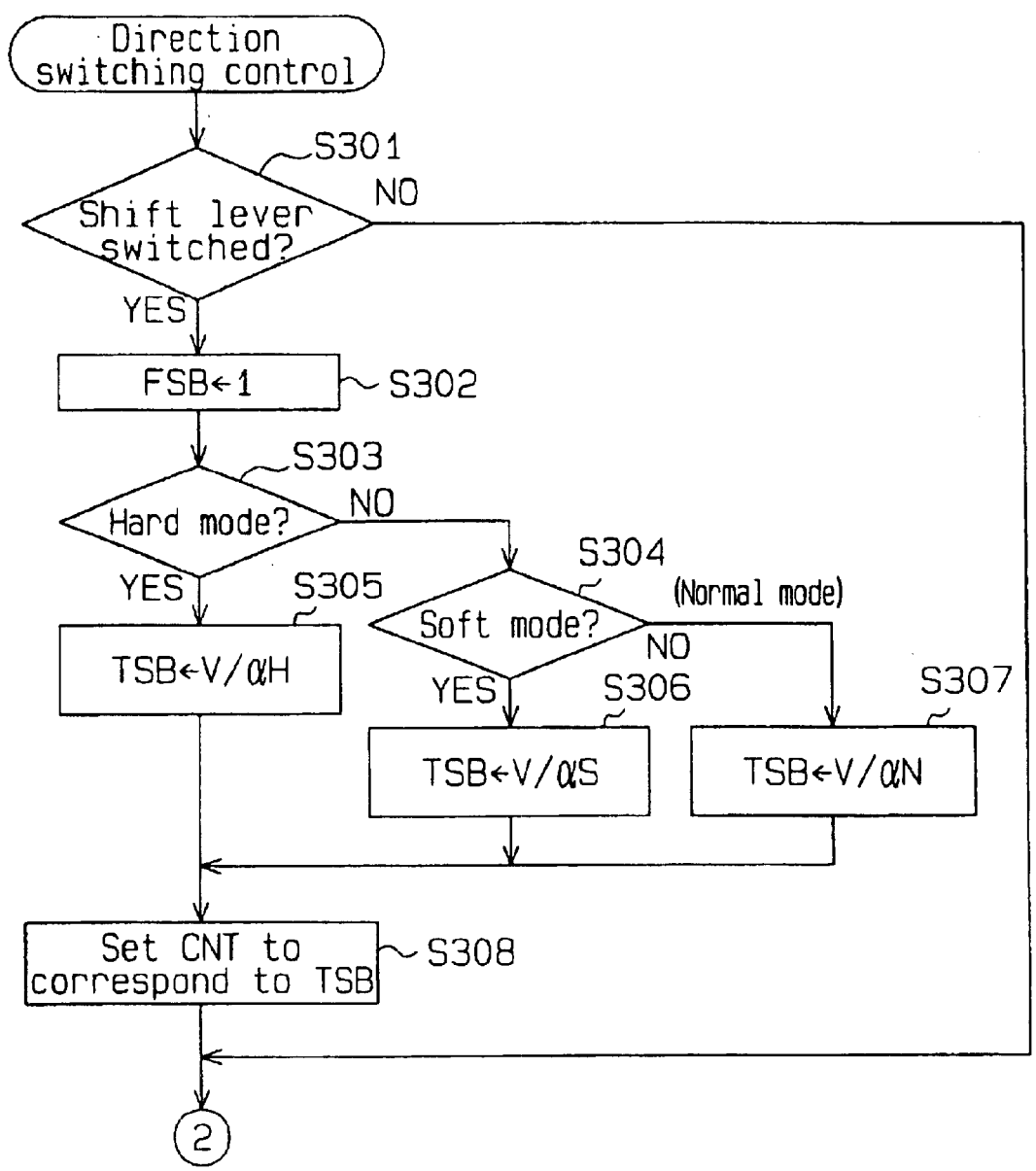
FIGS. 17(a) and (b) are flowcharts showing a direction switching control routine.
Figure 17B:
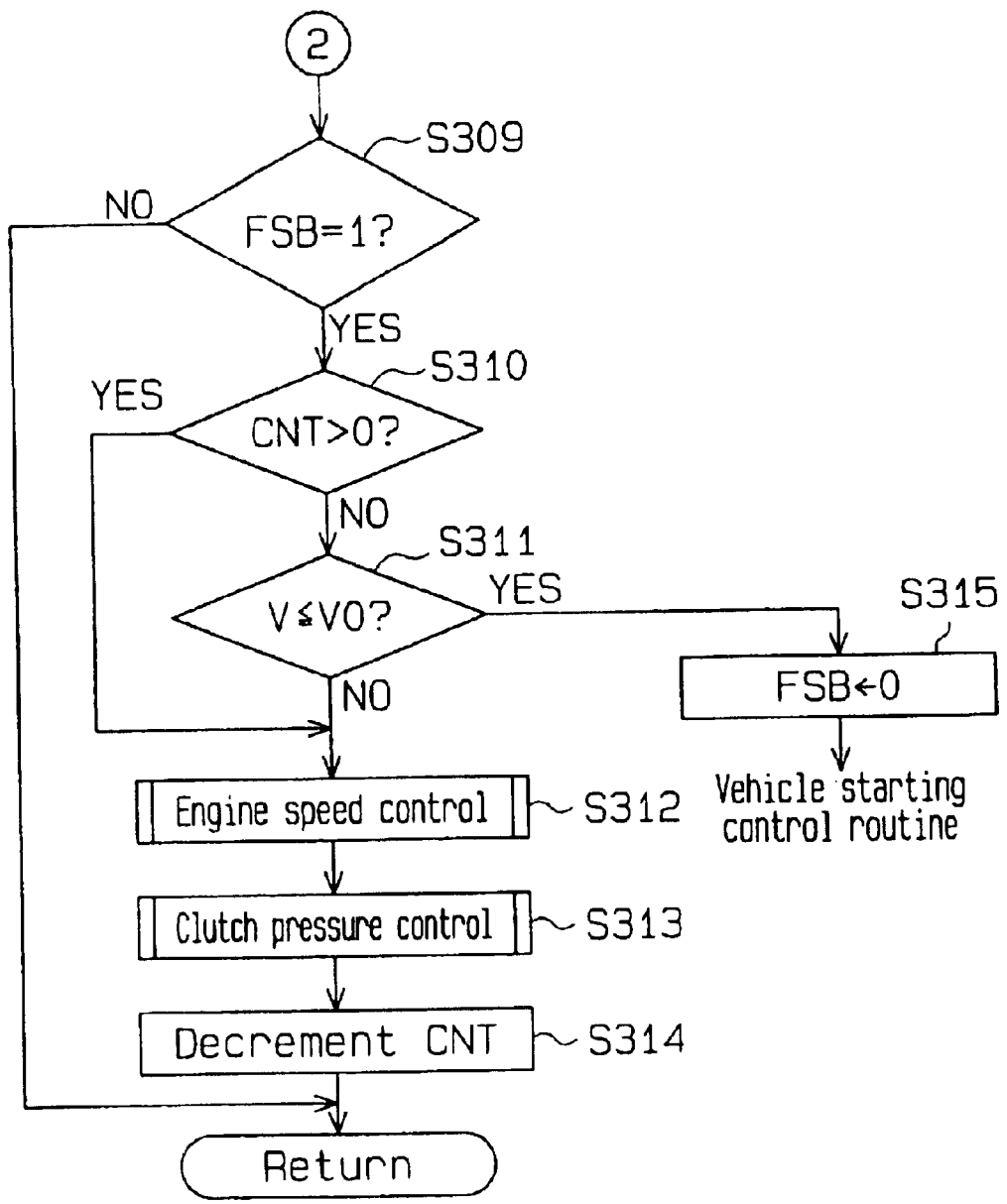

FIGS. 17(a) and 17(b) show flowcharts of a direction switching control procedure executed by the CPU 56. The CPU 56 executes the routine at predetermined intervals (for example, ten to fifty milliseconds) while the engine 10 is running.

As shown in FIG. 17(a), the CPU 56 judges whether the shift lever 37 is shifted for changing the direction of the vehicle in step S301. In other words, the CPU 56 judges whether the current routine is being executed for the first time since direction switching is performed. If the shift lever 37 is switched from the forward position F to the reverse position R or from the reverse position R to the forward position F when the vehicle speed V is greater than zero, the CPU 56 judges that the shift lever 37 has been shifted for direction switching.

If the shift lever 37 has been shifted for direction switching, the CPU 56 moves to step S302 and sets a direction switching flag FSB to one. When the flag FSB is one, direction switching is being performed. Although not shown in the flowchart, the clutch 21, 22 that corresponds to the position of the shift lever 37 before the shift lever 37 is shifted is disengaged.

Steps S303 to S308, which follow step S302, are executed only once immediately after the shift lever 37 is shifted for direction switching. In steps S303 to S307, a period (predicted period) TSB from when the shift lever 37 is shifted for direction switching until when the vehicle is stopped is computed according to the deceleration mode set by the mode switch 39.

The predicted period TSB is computed based on the current vehicle speed V and vehicle deceleration prediction data, which is previously stored in the ROM 57. The deceleration prediction data correspond to the three deceleration modes and are determined taking the initial value of the clutch pressure PCL, or an initial clutch pressure PCL20, into account. The initial clutch pressure PCL20 is applied to the post-shifting clutch 21, 22 while the post-shifting clutch 21, 22 is functioning as a brake from when the shift lever 37 is shifted until when the vehicle is stopped. The initial clutch pressure PCL20 will be described later. The initial clutch pressure PCL20 represents the braking force of the post-shifting clutch 21, 22.

The CPU 56 computes a vehicle deceleration that corresponds to the selected deceleration mode based on the vehicle deceleration prediction data stored in the ROM 57. Then, the CPU 56 computes the predicted period TSB based on the computed vehicle deceleration and the current vehicle speed V. Specifically, the predicted period TSB is computed by dividing the current vehicle speed V by the vehicle deceleration.

In step S303, the CPU 56 judges whether the current deceleration mode is the hard mode. If the current mode is the hard mode, the CPU 56 moves to step S305. If the current mode is not the hard mode, the CPU 56 moves to step S304. In step S304, the CPU 56 judges whether the current mode is the soft mode. If the current mode is the soft mode, the CPU 56 moves to step S306. If the current mode is not the soft mode, that is, if the current mode is the normal mode, the CPU 56 moves to step S307.

In each of steps S305, S306, S307, the CPU 56 computes the predicted period TSB, which corresponds to the selected deceleration mode in the above described manner. That is, the CPU 56 computes the vehicle deceleration that corresponds to the selected deceleration mode. The CPU 56 also computes the predicted period TSB by dividing the current vehicle speed V by the computed deceleration. In FIG. 17(a), the deceleration computed during the hard mode is represented by αH the deceleration computed during the soft mode is represented by αS, and the deceleration computed during the normal mode is represented by αN. These decelerations satisfy the inequality αH>αN>αS. Therefore, if the vehicle speed V is the same, the predicted period TSB becomes shorter in the order of the hard mode, the normal mode and the soft mode.

The vehicle speed V is computed based on the speed ND of the output shaft 20 of the transmission 12, or the speed of the front wheels 14. Therefore, if deceleration prediction data of the output shaft 20 is stored in the ROM 57 instead of the vehicle deceleration prediction data, the predicted period TSB is computed based on the speed ND and the deceleration prediction data of the output shaft 20.

The CPU 56 moves to step S308 from one of steps S305, S306 or S307. In step S308, the CPU 56 sets a count value CNT, which corresponds to the predicted period TSB, and moves to step S309. If it is judged that the shift lever 37 is not shifted in step S301, the CPU 56 moves to step S309.

In step S309, which is shown in FIG. 17(b), the CPU 56 judges whether the direction switching flag FSB is one, or whether the direction switching is being executed. If the flag FSB is one, the CPU 56 moves to step S310. If the flag FSB is zero, the CPU 56 temporarily suspends the current routine.

In step S310, the CPU 56 judges whether the count value CNT is greater than zero, that is whether the predicted period TSB has elapsed. In other words, the CPU 56 judges whether the vehicle is decelerating due to the direction switching. If the count value CNT is greater than zero, that is, if the vehicle is assumed to be still moving, the CPU 56 moves to step S312. If the count value CNT is lower than zero, the CPU 56 judges that the vehicle has been stopped and moves to step S311.

In step S311, the CPU 56 judges whether the vehicle speed V is equal to or smaller than the determination value V0. The determination value V0 is a value at which little shock is created when the post-shifting clutch 21, 22 is completely engaged. That is, the determination value V0 is a vehicle speed at which the vehicle is substantially stopped and is between zero to five kilometers per hour.

If the vehicle speed V is lower than the determination value V0, the CPU 56 moves step S315 and sets the direction switching flag FSb to zero. Thereafter, the CPU 56 moves to a vehicle starting control routine, which will be described later. That is, the CPU 56 judges that the vehicle is stopped only when the vehicle is assumed to have stopped based on the count value CNT in step S310 and the vehicle speed V, which is computed based on the speed ND of the output shaft 20, is equal to or smaller than the determination value V0 in step S311. In this case, the CPU 56 moves to the vehicle starting control routine.

If the vehicle speed V is greater than the determination value V0 in step S311, the CPU 56 moves to step S312. That is, even if the vehicle is assumed to have stopped based on the count value CNT in step S310, the vehicle is not judged to have stopped when the vehicle speed V, which is computed based on the speed ND of the output shaft 20, is greater than the determination value V0 in step S311.

The CPU 56 moves to step S312 either from step S310 or from step S311. In step S312, the CPU 56 executes an engine speed control procedure. The engine speed control procedure is described in the flowchart of FIG. 18. In step S313, the CPU 56 executes a clutch pressure control procedure. The clutch pressure control procedure is described in the flowchart of FIG. 19. In step S314, the CPU 56 decrements the count value CNT and then temporarily suspends the current routine.

Figure 18:
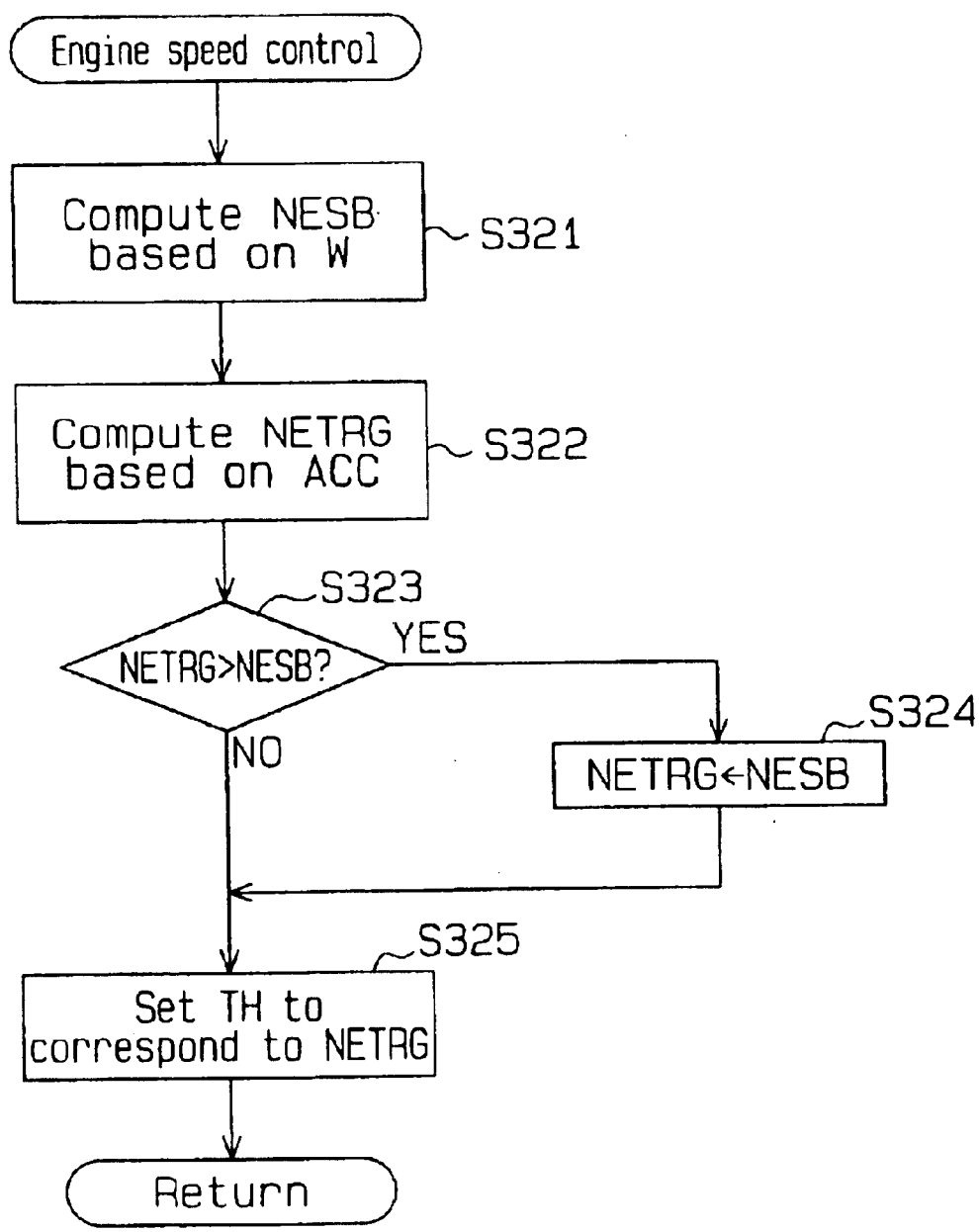
FIG. 18 is a flowcharts showing an engine speed control routine executed in step S312 of the routine shown in FIG. 17(b)
Figure 19:
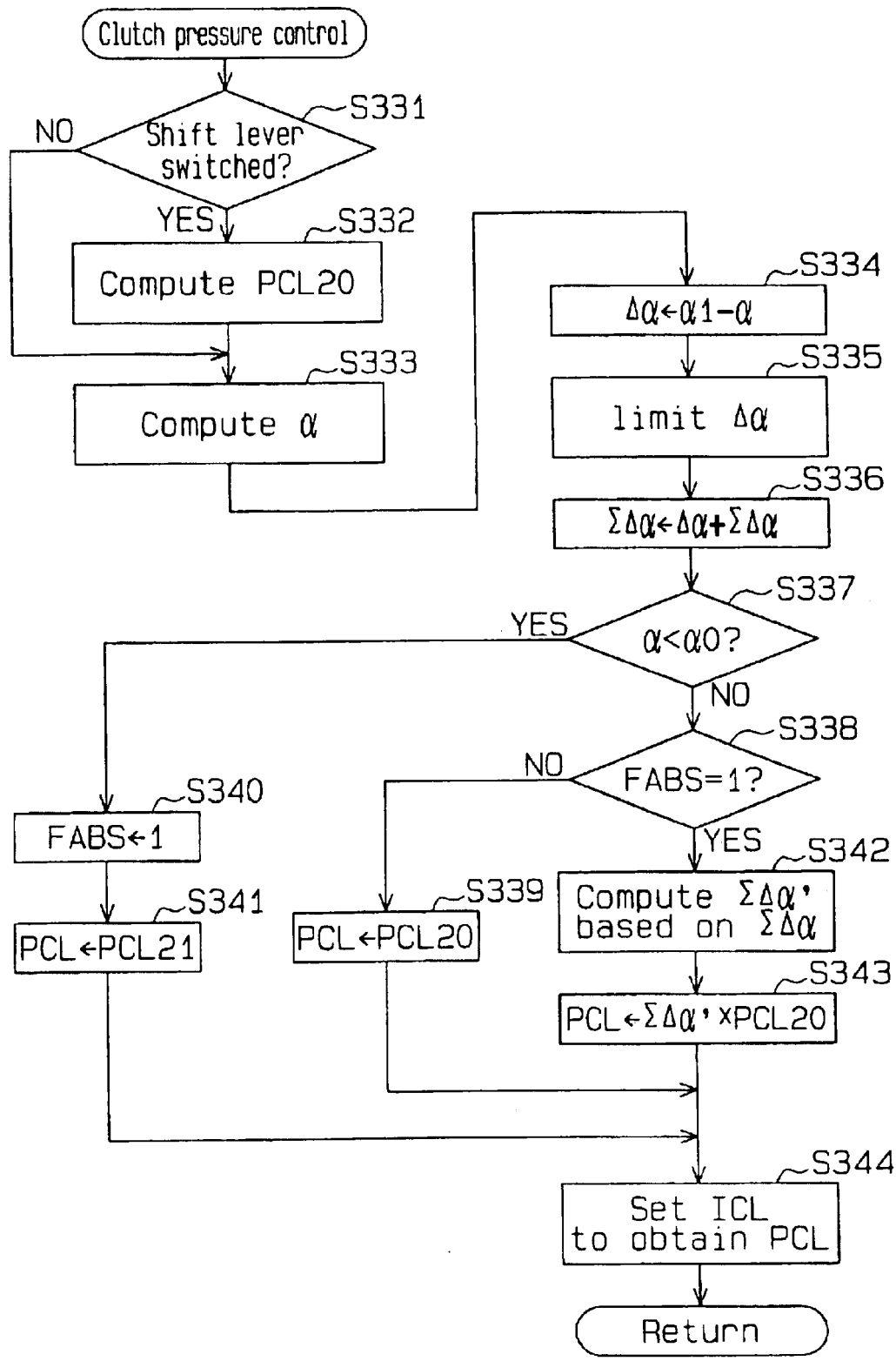
FIG. 19 is a flowcharts showing a clutch pressure control routine executed in step S313 of the routine shown in FIG. 17(b)

When the shift lever 37 is shifted for direction switching while the vehicle is running, the engine speed control procedure of FIG. 18 and the clutch pressure control procedure of FIG. 19 are performed until the predicted period TSB elapses and the vehicle speed V falls below the determination value V0.

The engine speed control procedure routine shown in FIG. 18 will now be described. In step S321, the CPU 56 computes an upper limit value NESB of the engine speed W based on the load weight W by referring to a map M11 of FIG. 11. In step S322, the CPU 56 computes a target engine speed NETRG based on the pedal depression degree ACC by referring to a map M12 shown in FIG. 13.

In step S323, the CPU 56 judges whether the target engine speed NETRG is greater than the limit value NESB. If the outcome of step S323 is positive, the CPU 56 moves to step S324. If the outcome of step S323 is negative, the CPU 56 moves to step 3325.

In step S324, the CPU 56 substitutes the upper limit value NESB for the target engine speed NETRG and moves to step S325. In step S325, the CPU 56 controls the throttle actuator 15 to set the throttle opening size TH to a value that permits the engine to run at the target speed NETRG.

The routine of FIG. 18 prevents the engine speed NE from exceeding the upper limit value NESB.

The clutch pressure control procedure routine shown in FIG. 19 will be described with reference to timing charts of FIGS. 15(*a*) to 15(*d*). FIGS. 15(*a*) to 15(*d*) show changes of the acceleration α of the front wheels 14, the clutch pressure PCL of the post-shifting clutch 21, 22, the value ICL of current supplied to the clutch valve 23, 24 of the post-shifting clutch 21, 22 after the shift lever 37 is shifted from the reverse position R to the forward position F of after the shift lever 37 is shifted from the forward position F to the reverse position R. The control routine shown in FIG. 19 is basically similar to the service brake control routine shown in FIG. 6.

In step S331, the CPU 56 judges whether the shift lever 37 is shifted for direction switching as in step S301 of FIG. 17(*a*). In other words, the CPU 56 judges whether the CPU 56 is executing the routine of FIG. 19 for the first time after the shift lever 37 is switched. If the outcome is positive, the CPU 56 moves to step S332. Step S332 is executed only once immediately after the shift lever 37 is switched.

In step S322, the CPU 56 computes the initial clutch pressure PCL20 in accordance with the load weight W and the selected deceleration mode. The CPU 56 refers to a map M13 shown in FIG. 14 when computing the initial clutch pressure PCL20. The map M13 is previously stored in the ROM 57. The map M13 defines the relationship between the load weight W and the initial clutch pressure PCL20 according to the deceleration mode. In each deceleration mode, the initial clutch pressure PCL20 increases as the load weight W is increased. If the load weight W is constant, the initial clutch pressure PCL20 increases in order of the hard mode, the normal mode and the soft mode. The deceleration data, which is used for computing the predicted period TSB in steps S305, 5306 and S307 of the routine of FIG. 17(*a*), is determined taking the initial clutch pressure PCL20 set in the map M13 into account.

Steps S333 to S336 correspond to steps S20 to S50 of the routine shown in FIG. 6. That is, in step S333, the CPU 56 computes the acceleration α of the output shaft 20 of the transmission 12, or the acceleration α of the front wheels 14, in the same manner as step S20 of FIG. 6. The acceleration α has a negative value and represents the deceleration of the front wheels 14.

In step S334, the CPU 56 computes the difference Δα (Δα=α1−α) between the acceleration α and the predetermined reference value α1 in the same manner as step S30 of FIG. 6. As in the embodiment of FIGS. 1 to 6, the reference value α1 varies in accordance with the deceleration mode selected by the mode switch 39.

In step S336, the CPU 56 limits the value of the difference Δα in the same manner as step S40 of FIG. 6. That is, the difference Δα is limited to a value in a range from zero to a predetermined upper limit value.

In step S336, the CPU 56 adds the difference Δα to the current accumulated value ΣΔα and sets the resultant as a new accumulated value ΣΔα in the same manner as step S50 of FIG. 6. The accumulated value ΣΔα corresponds to the area of the hatched region in FIG. 15(*b*).

In step S337, the CPU 56 judges whether the acceleration α is lower than the predetermined determination value α0. The determination value α0 is lower than the reference value α1 as described in step S60 of FIG. 6. The determination value α0 is used for judging whether the front wheels 14 are locked by braking while the vehicle is running. If the acceleration α is higher than the determination value α0, the CPU 56 judges that the front wheels 14 are not locked and moves to step S338.

In step S338, the CPU 56 judges whether a flag FABS is one. The flag FABS indicates that the ABS control mode is being performed. If the flag FABS is not one, the CPU 56 judges that the ABS control mode has not been executed and moves to step S339. In step S339, the CPU 56 sets the initial clutch pressure PCL20 as the clutch pressure PCL of the post-shifting clutch 21, 22. In step S344, the CPU 56 supplies a current having a value ICL (the value ICL20 shown in FIG. 15(d)) to the clutch valve 23, 24. The value ICL20 corresponds to the clutch pressure PCL (the initial clutch pressure PCL20). As a result, the post-shifting clutch 21, 22 brakes the vehicle by a braking force that corresponds to the initial clutch pressure PCL20 (see FIG. 15(c)). At this time, the deceleration is substantially equal to the deceleration $\alpha H, \alpha S$ or $\alpha N$, which are computed in steps S305, s306 and S307.

If the acceleration $\alpha$ is lower than the determination value $\alpha 0$ in step S337, the CPU 56 judges that the front wheels 14 are locked by braking and moves to step S340 to start the ABS control mode. In step S340, the CPU 56 sets the flag FABS to one. In step S341, the CPU 56 substitutes a predetermined limit value PCL21, which is smaller than the initial clutch pressure PCL20, for the clutch pressure PCL of the post-shifting clutch 21, 22. In step S344, the CPU 56 supplies a current having a value ICL (a value ICL21 shown in FIG. 15(d)) to the clutch valve 23, 24. The value ICL21 corresponds to a clutch pressure PCL (a limit value PCL21). As a result, the braking force of the post-shifting clutch 21, 22 is weakened in accordance with the limit value PCL21 (see FIG. 15(c)), which prevents the front wheels 14 from being locked.

Figure 15A:
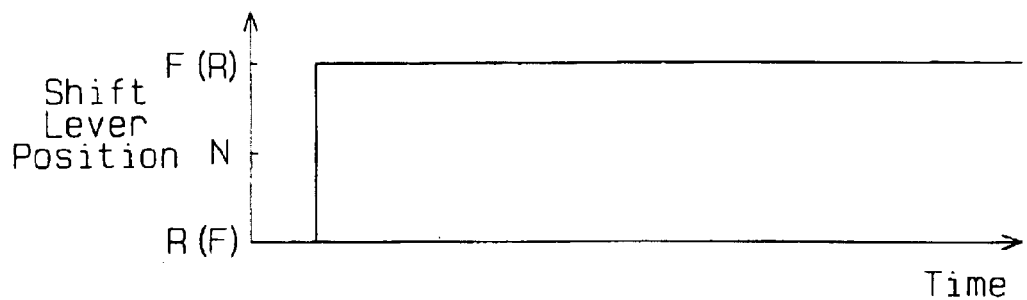
FIGS. 15(a) to 15(d) are timing charts showing changes of the acceleration α, the clutch pressure PCL and a current value ICL when the vehicle is stopped during a direction switching.
Figure 15B:
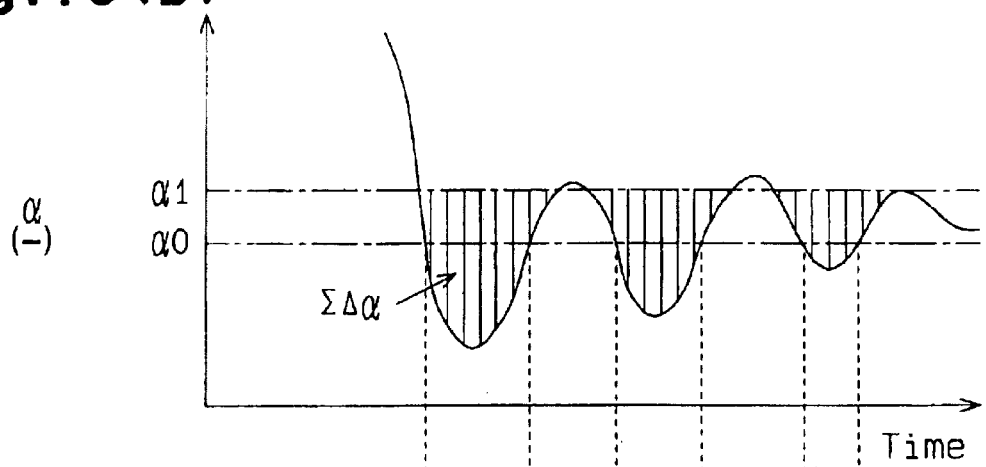
Figure 15C:
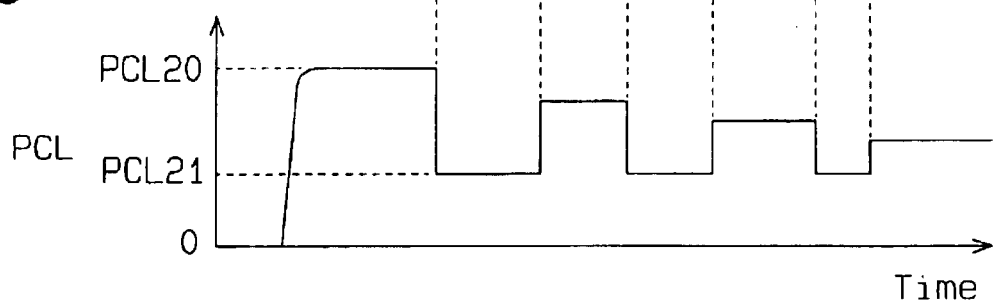
Figure 15D:
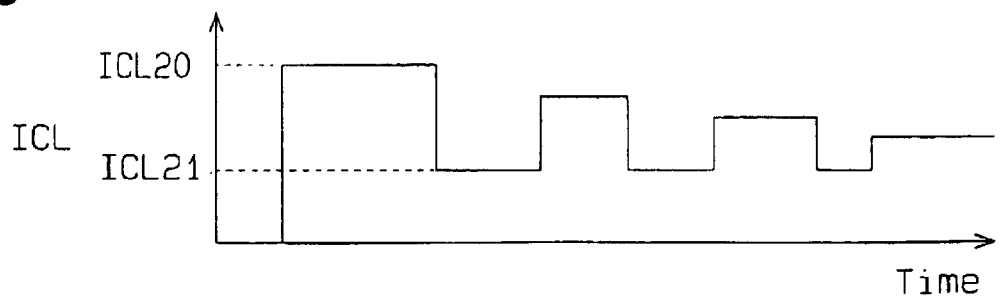

When the braking force is weakened for preventing locking of the front wheels 14, the acceleration $\alpha$ is raised as shown in FIGS. 15(b) and 15(c). That is, the deceleration is decreased. If the acceleration $\alpha$ is lower than the determination value $\alpha 0$ in step S337 and the flag FABS is one in step S338, the CPU 56 moves to step S342 for increasing the braking force.

Steps S342 and S343 correspond to steps S80 and S90 of FIG. 6. That is, the CPU 56 computes a variable $\Sigma\Delta\alpha$ based on the accumulated value $\Sigma\Delta\alpha$ of the difference $\Delta\alpha$ in step S342 in the same manner as step S80. The variable $\Sigma\Delta\alpha'$ is a value between zero and one. The variable $\Sigma\Delta\alpha'$ is zero when the accumulated value $\Sigma\Delta\alpha$ is zero and increases as the accumulated value $\Sigma\Delta\alpha$ decreases.

In step S343, the CPU 56 multiplies the initial clutch pressure PCL20 by the variable $\Sigma\Delta\alpha'$ and sets the resultant as the clutch pressure PCL of the post-shifting clutch 21, 22 in the same manner as step S90 of FIG. 6. Therefore, as the accumulated value $\Sigma\Delta\alpha$ increases and the variable $\Sigma\Delta\alpha'$ decreases, the clutch pressure PCL decreases. In step S344, the CPU 56 supplies a current having a value ICL to the clutch valve 23, 24 for obtaining the clutch pressure PCL that corresponds to the variable $\Sigma\Delta\alpha'$. As a result, when the clutch pressure PCL is subsequently increased from the limit value PCL21 as shown in FIG. 15(c), the clutch pressure PCL is set at a level lower than the initial clutch pressure PCL20 by a degree according to the accumulated value $\Sigma\Delta\alpha$.

According to the clutch pressure control routine shown in FIG. 19, the vehicle is braked by a braking force that corresponds to the initial clutch pressure PCL20. However, if the front wheels 14 are judged to be locked, the braking is temporarily suspended and resumed. Every time braking is suspended and resumed, the new braking force is gradually decreased. As a result, the acceleration $\alpha$ gradually seeks a value that is slightly higher than the determination value $\alpha 0$ as shown in FIG. 15(b).

Although not shown in the flowchart of FIG. 19, the difference ($\alpha 0-\alpha$) between the acceleration $\alpha$ and the determination value $\alpha 0$ and its accumulated value are computed from when the acceleration $\alpha$ falls below the determination value $\alpha 0$ for the first time, that is, from when the ABS control mode is started and the flag FABS is set to one. When the acceleration $\alpha$ is lower than the determination value $\alpha 0$, the difference ($\alpha 0-\alpha$) has a positive value. When the acceleration $\alpha$ is higher than the determination value $\alpha 0$, the difference ($\alpha 0-\alpha$) has a negative value. When the accumulated value of the difference ($\alpha 0-\alpha$) falls below zero due to execution of the ABS control mode, the ABS control mode is terminated and the flag FABS is reset to zero. At the same time, the accumulated value $\Sigma\Delta\alpha$ of the difference $\Delta\alpha$ and the difference ($\alpha 0-\alpha$) are reset to zero.

When the brake pedal 33 is depressed during direction switching, the service brake control shown in, for example, FIGS. 1 to 6 or FIGS. 7 to 9, is executed instead of the clutch pressure control shown in FIG. 19.

The vehicle starting control will now be described. The vehicle starting control is executed after the direction switching control shown in FIGS. 17(a) and 17(b) is completed. That is, the vehicle starting control is executed when the vehicle is judged to be stopped in steps S310 and S311. The starting control includes a starting engine speed control procedure shown in FIG. 20 and a starting clutch control shown in FIG. 21.

Figure 20:
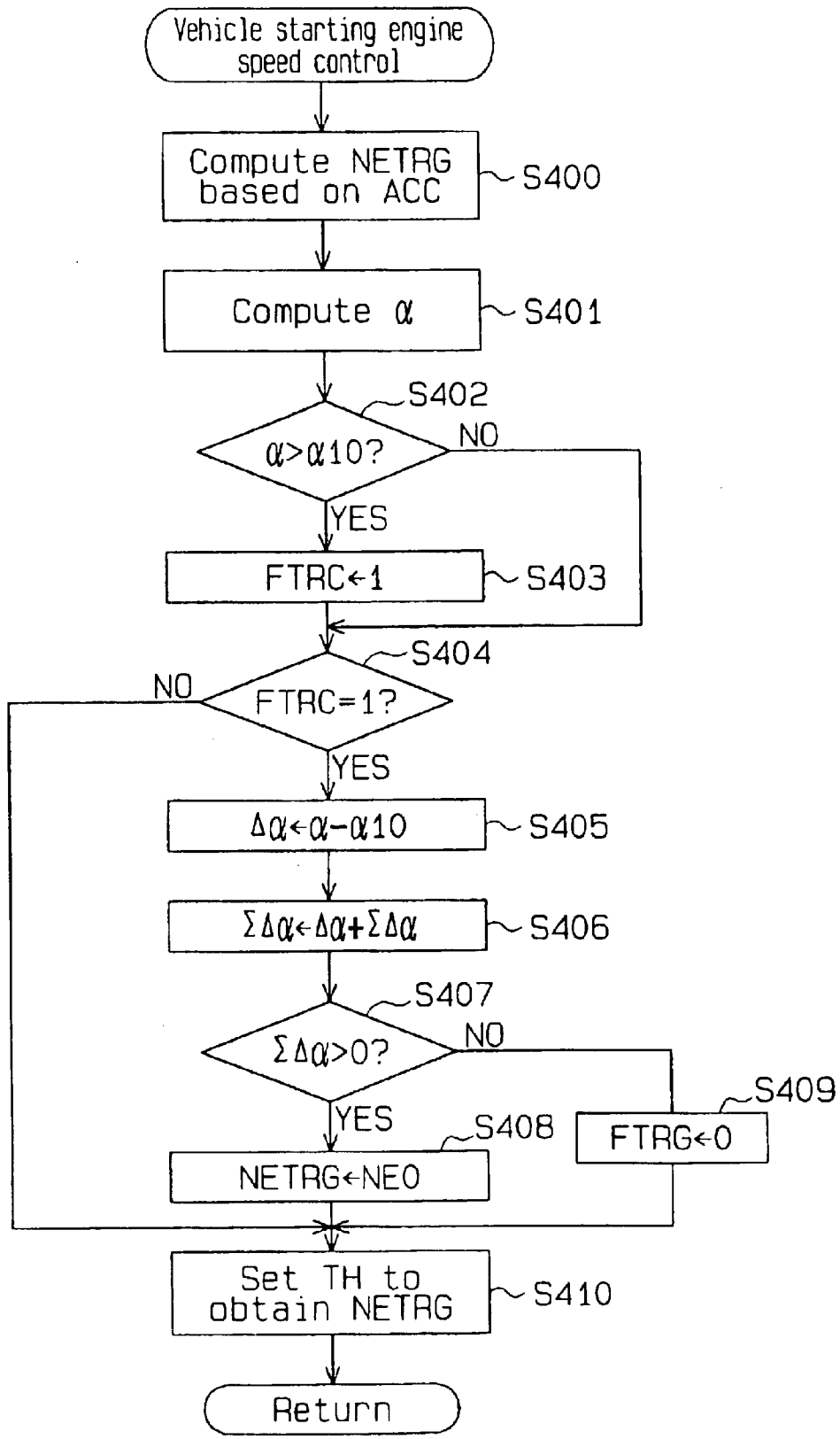
FIG. 20 is a flowcharts showing a vehicle starting engine speed control routine.

The vehicle starting engine speed control routine shown in FIG. 20 will now be described. The routine of FIG. 20 is basically similar to steps S210 to S217 of the spin prevention control routine shown in FIG. 10(a).

Figure 13:
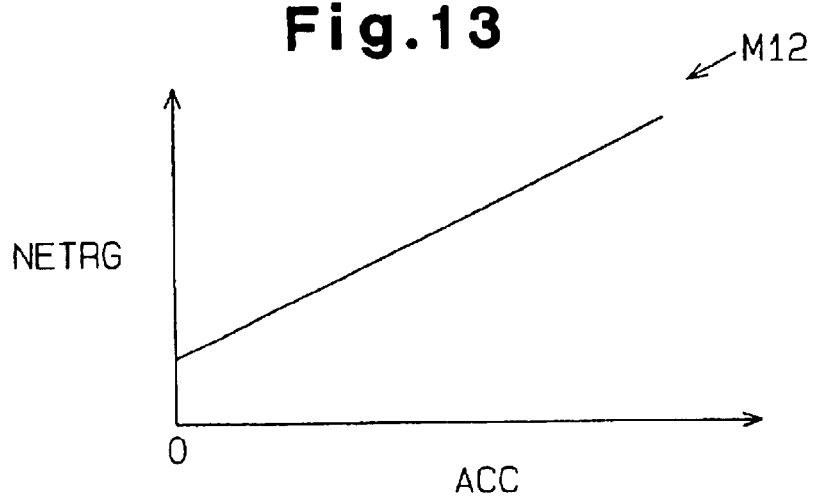
FIG. 13 is a graph showing a map for defining the relationship between a pedal depression degree ACC and a target engine speed NETRG.

In step S400, the CPU 56 computes a target engine speed NETRG, which corresponds to the pedal depression degree ACC, referring to a map M12 shown in FIG. 13. In step S401, the CPU 56 computes the acceleration $\alpha$ of the output shaft 20, or the acceleration $\alpha$ of the front wheels 14. The acceleration $\alpha$ has a positive value.

In step S402, the CPU 56 judges whether the acceleration $\alpha$ is higher than the determination value $\alpha 10$. The determination value $\alpha 10$ is used for judging whether the front wheels 14 are spinning due to acceleration of the vehicle. If the acceleration $\alpha$ is higher than the determination value $\alpha 10$, the CPU 56 judges that the front wheels 14 are spinning and moves to step S403 for starting the TRC control mode.

In step S403, the CPU 56 sets a flag FTRC, which indicates that the TRC control mode is being executed, to one and moves to step S404. If the acceleration $\alpha$ is equal to or lower than the determination value $\alpha 10$ in step S402, the CPU 56 judges that the front wheels 14 are not spinning and moves to step S404.

In step S404, the CPU 56 judges whether the flag FTRC is one. If the flag FTRC is one, the CPU 56 moves to step S405. If the flag FTRC is not one, the CPU 56 moves to step S410.

In step S405, the CPU 56 computes the difference $\Delta\alpha$ ($\Delta\alpha=\alpha-\alpha 10$) between the acceleration $\alpha$ and the determination value $\alpha 10$. If the acceleration $\alpha$ is higher than the determination value $\alpha 10$, the difference $\Delta\alpha$ is positive. If the acceleration $\alpha$ is lower than the determination value $\alpha 10$, the difference $\Delta\alpha$ is negative. In step S406, the CPU 56 adds the difference $\Delta\alpha$ to the current accumulated value $\Sigma\Delta\alpha$ and sets the resultant as a new accumulated value $\Sigma\Delta\alpha$. If the added difference $\Delta\alpha$ is positive, the accumulated value $\Sigma\Delta\alpha$ is increased. If the added difference $\Delta\alpha$ is negative, the accumulated value $\Sigma\Delta\alpha$ is decreased.

In step S407, the CPU 56 judges whether the accumulated value $\Sigma\Delta\alpha$ is higher than zero, or whether the value $\Sigma\Delta\alpha$ is positive. If the accumulated value $\Sigma\Delta\alpha$ is positive, the CPU 56 moves to step S408. In step S408, the CPU 56 substitutes a predetermined limit value NE0 for the target engine speed NETRG and moves to step S410. The limit value NE0 corresponds to, for example, the engine speed NE when the engine 10 is idling. If the accumulated value ΣΔα is not positive, the CPU 56 moves to step S409 and sets the flag FTRC to zero for terminating the TRC control mode. Thereafter, the CPU 56 moves to step S410.

In step S410, the CPU 56 controls the throttle actuator 15 to adjust the throttle opening size TH such that the target engine speed NETRG is obtained. Thus, when the accumulated value ΣΔα is positive, the engine speed NE is limited to the limit value NE0 regardless of the pedal depression degree ACC.

Like the spin prevention routine of FIG. 10(a), the routine of FIG. 20 prevents the front wheels 14 from spinning when the vehicle is started.

The starting clutch pressure control routine shown in FIG. 21 will now be described. In the TRC control in this routine, the clutch pressure PCL of the post-shifting clutch 21, 22 is temporarily lowered for stopping spinning when the acceleration α exceeds the determination value α10, or when the front wheels 14 are judged to be spinning. After spinning is stopped, the clutch pressure PCL is increased to a level that is lower than the value before the temporary reduction. The basic concept of this control procedure is the same as the ABS control, which is executed according to the clutch pressure control routine of FIG. 19.

In step S461, the CPU 56 computes the difference Δα (Δα=α−α20) between the acceleration α and a predetermined reference value α20. The acceleration α is a value that is computed in step S401 of the routine shown in FIG. 20. The reference value α20 is slightly lower than the determination value α10.

In step S462, the CPU 56 adds the computed difference Δα to the current accumulated value ΣΔα and sets the resultant as a new accumulated value ΣΔα. The value of the difference Δα is limited in a range from zero to a predetermined upper limit value. Thus, the difference Δα changes the accumulated value ΣΔα only when the difference Δα is positive, or when the acceleration α is higher than the reference value α20.

In step S463, the CPU 56 judges whether the acceleration α is higher than the determination value α10. If the acceleration is equal to or lower than the determination value α10, the CPU 56 judges that the front wheels 14 are not spinning and moves step S464. If the acceleration α is higher than the determination value α10, the CPU 56 judges that the front wheels 14 are spinning and moves to step S466.

In step S464, the CPU 56 judges whether the flag FTRC, which is set in the routine of FIG. 20, is one. If the flag FTRC is not one, the CPU 56 moves to step S465 and sets the clutch pressure PCL to the maximum value PCLmax. In step S469, the CPU 56 sends a current, the value ICL of which corresponds to the clutch pressure PCL (the maximum value PCLmax in this case), to the clutch valve 23, 24 of the post-shifting clutch 21, 22. Thus, the engagement force of the post-shifting clutch 21, 22 is maximized immediately after the vehicle starting control is started, which sets the power transmission efficiency from the engine 10 to the front wheels 14 to one hundred percent.

The post-shifting clutch 21, 22 is completely engaged immediately after the vehicle starting control is started, which shortens the period during which the post-shifting clutch 21, 22 is partially engaged. Therefore, wear on the clutches 21, 22 is reduced.

In step S466, the CPU 56 substitutes a predetermined limit value PCL21 for the clutch pressure PCL. The limit value PCL 21 may be the same as or different from the limit value PCL21 set in step S341 of the clutch pressure control routine shown in FIG. 19. In step S469, the CPU 56 sends a current, the value ICL of which corresponds to the clutch pressure PCL (the limit value PCL21 in this case), to the clutch valve 23, 24 of the post-shifting clutch 21, 22. In this manner, the engaging force of the post-shifting clutch 21, 22 is weakened when the front wheels 14 are judged to be spinning and the power transmission efficiency from the engine 10 to the front wheels 14 is lowered. As a result, the spinning of the front wheels 14 is stopped.

When the clutch pressure PCL is lowered for preventing the front wheels 14 from spinning, the acceleration α is lowered. If the acceleration α is judged to be lower than the determination value α10 in step S463 and if the flag FTRC is one in step S464, the CPU 56 moves to step S467 to increase the clutch pressure PCL.

In step S467, the CPU 56 computes a variable ΣΔα' based on the difference Δα and the accumulated value ΣΔα in the same manner as step S342 of FIG. 19. The variable ΣΔα' is a value between zero and one. When the accumulated value ΣΔα' is zero, the variable ΣΔα' is one. The variable ΣΔα' decreases as the accumulated value ΣΔα increases.

In step S468, the CPU 56 multiplies the maximum value PCLmax by the variable ΣΔα' and sets the resultant as the clutch pressure PCL of the post-shifting clutch 21, 22. As the variable ΣΔα' decreases due to an increases of the accumulated value ΣΔα, the clutch pressure PCL decreases. In step S469, the CPU 56 sends a current, the value ICL of which corresponds to clutch pressure PCL representing the variable ΣΔα', to the clutch valve 23, 24 of the post-shifting clutch 21, 22. When the clutch pressure PCL is subsequently increased from the limit value PCL21, the clutch pressure PCL is set in accordance with the accumulated value ΣΔα and is smaller than the maximum value PCLmax.

Figure 16A:
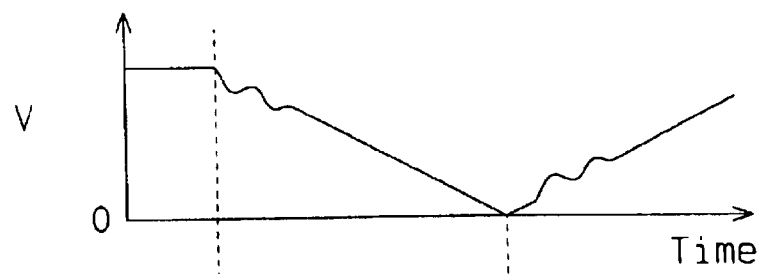
FIGS. 16(a) to 16(d) are timing charts showing changes of the vehicle speed V, the acceleration α, the clutch pressure PCL and the engine speed NE during a direction switching.
Figure 16B:
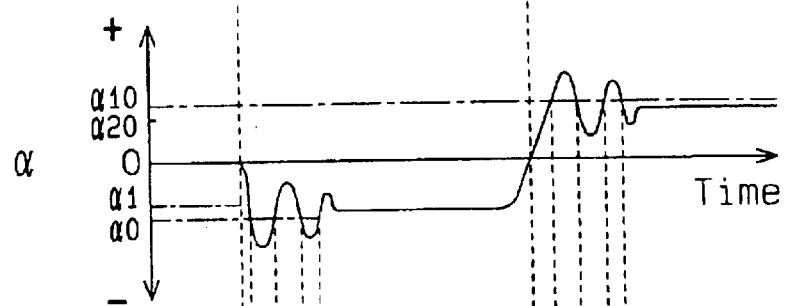
Figure 21:
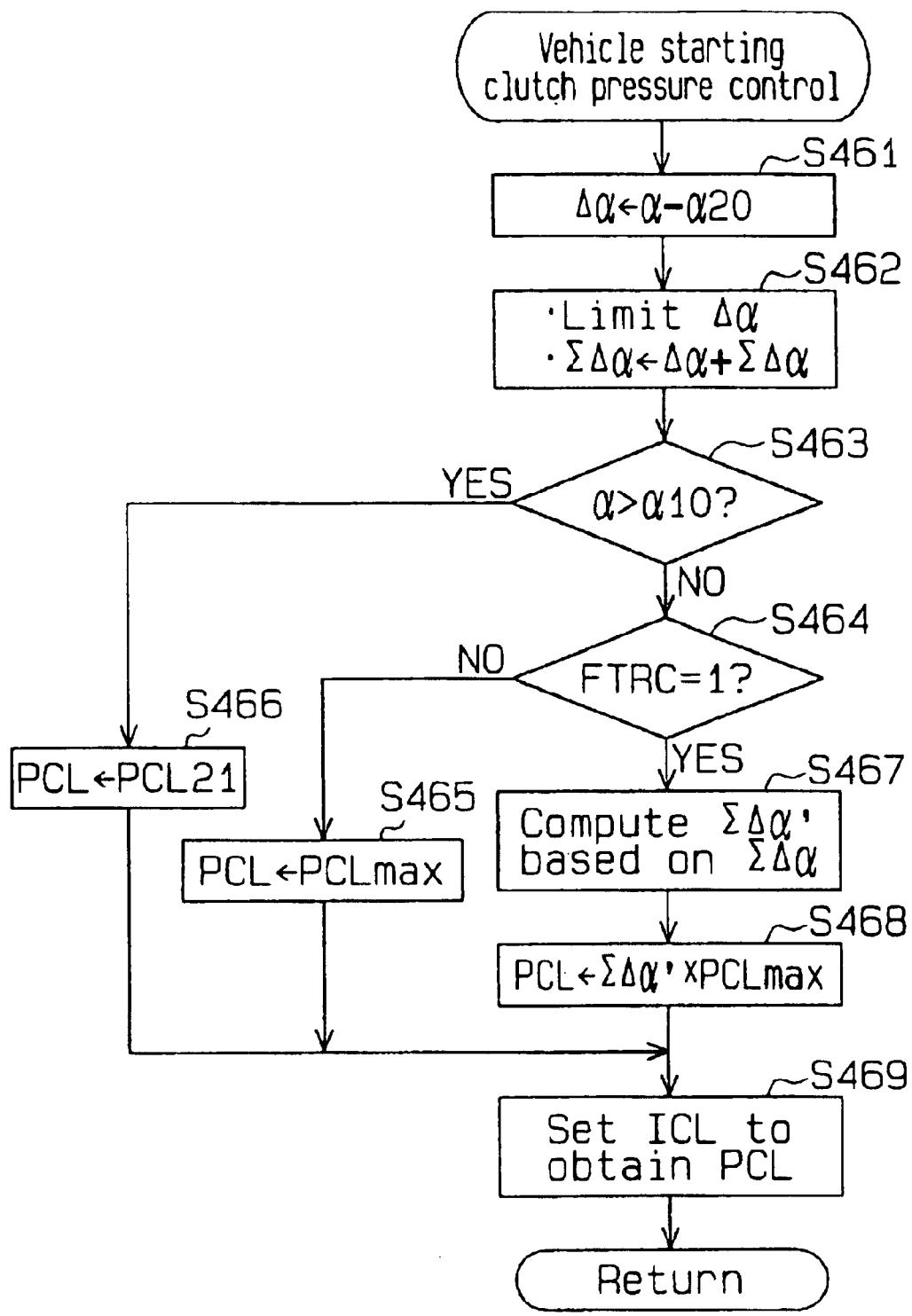
FIG. 21 is a flowchart showing a vehicle starting clutch pressure control routine.

In the starting clutch pressure control shown in FIG. 21, the vehicle is started in a direction that is opposite to the direction in which the vehicle had been moving until the shift lever 37 was shifted. At this time, the post-shifting clutch 21, 22 is completely engaged. If the front wheels 14 are judged to be spinning, the engaging force of the post-shifting clutch 21, 22 is temporarily reduced and is subsequently increased. When increased, the coupling force is weaker than that before the reduction. Every time the coupling force is reduced and increased, the coupling force is gradually weakened compared to that of the previous pressurization. As a result, the coupling force is weakened to a level that does not cause the front wheels 14 to spin. As shown in FIG. 16(b), the acceleration α seeks a value that is slightly lower than the determination value α10.

Figure 16C:
Figure 16D:
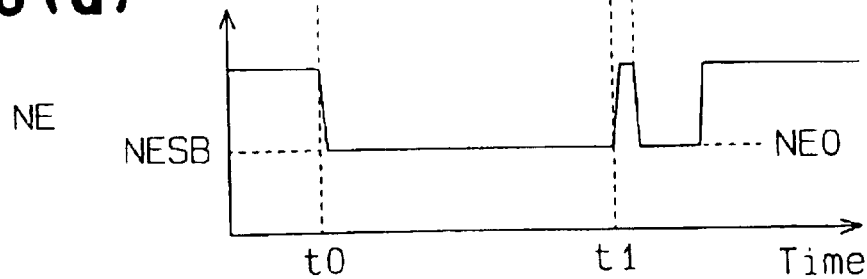

The procedure of the routine shown in FIGS. 17(a) to 21 will now be described with reference to timing charts shown in FIGS. 16(a) to 16(d). The timing charts of FIGS. 16(a) to 16(d) show changes after the shift lever 37 is shifted for direction switching. FIG. 16(a) shows changes of the vehicle speed V. FIG. 16(b) shows changes of the acceleration α. FIG. 16(c) shows changes of the clutch pressure PCL of the post-shifting clutch 21, 22. FIG. 16(d) shows changes of the engine speed NE.

At time t0, the shift lever 37 is shifted to switch the moving direction of the vehicle, which disengages the clutch 21, 22 that corresponds to the previous shift lever position. The other clutch, which corresponds to the current shift lever position, or the post-shifting clutch 21, 22, is engaged. At this time, the clutch pressure PCL of the post-shifting clutch 21, 22 is set to the initial clutch pressure PCL20, which reflects the load weight W and the deceleration mode. Also, a prediction period TSB, which is from when the shift lever 37 is shifted to when the vehicle is stopped, is computed. As shown in FIG. 16(d), the engine speed NE is maintained no higher than an upper limit value NESB until the predicted period TSB has elapsed. Therefore, when the vehicle is decelerated due to direction switching, the vehicle is smoothly decelerated.

If the front wheels 14 are locked due to braking based on the initial clutch pressure PCL20, the ABS control procedure is executed. As shown in FIGS. 16(b) and 16(c), when the acceleration α falls below the determination value α0, the clutch pressure PCL is lowered to the limit value PCL21. When the clutch pressure PCL is restored from the limit value PCL21, the clutch pressure PCL is set to a value that is lower than the initial clutch pressure PCL20. Thereafter, every time the clutch pressure PCL is restored from the limit value PCL21, the clutch pressure PCL is gradually decreased. As a result, the vehicle is smoothly stopped in a relatively short distance without locking the front wheels 14.

When the predicted period TSB has elapsed and the vehicle speed V falls equal to or below the determination value V0 (time t1), the vehicle is judged to have stopped. The CPU 56 initiates the vehicle starting control procedure. In the starting control procedure, the clutch pressure PCL is first set to the maximum value PCLmax as shown in FIG. 16(c), and the post-shifting clutch 21, 22 is completely engaged. At this time, the vehicle speed V is substantially zero. The input speed and the output speed of the post-shifting clutch 21, 22 are substantially zero and the same. Therefore, if the post-shifting clutch 21, 22 is suddenly completely engaged, little shock is created.

In the starting control procedure, the engine speed NE is set to a value that corresponds to the pedal depression degree ACC. However, if the accumulated value ΣΔα of the difference Δα between the acceleration α and the determination value α10 is higher than zero, the engine speed NE is set to a limit value NE0 as shown in FIG. 16(d). This is effective for preventing the front wheels 14 from spinning.

If the front wheels 14 spin when the vehicle is started, the TRC control procedure is performed. That is, if the acceleration α exceeds the determination value α10 as shown in FIGS. 16(b) and 16(c), the clutch pressure PCL is lowered to the limit value PCL21. When the clutch pressure PCL is restored from the limit value PCL21, the clutch pressure PCL is lower than the maximum value PCLmax. Thereafter, every time the clutch pressure PCL is restored from the limit value PCL21, the clutch pressure PCL is gradually decreased. As a result, the vehicle is smoothly and quickly accelerated without spinning the front wheels 14.

When the accumulated value ΣΔα of the difference Δα is equal to or lower than zero, the TRC control procedure is terminated and the clutch pressure PCL is set to the maximum value PCLmax. Also, the engine speed NE is set to a value that corresponds to the pedal depression degree ACC.

In addition to the advantages of the embodiments shown in FIGS. 1 to 11(d), the embodiment of FIGS. 12 to 21 has the following advantages.

The vehicle speed V is computed based on the speed ND of the output shaft 20 detected by the rotational speed sensor 30 (see FIG. 1). However, if the front wheels 14 are locked during braking, the speed ND of the output shaft 20 is zero. Although the vehicle speed V is not zero, the vehicle speed V will be erroneously judged to be zero. Therefore, if the vehicle is judged to have stopped based only on the vehicle speed V computed according to a value detected by the rotational speed sensor 30 during direction switching, the vehicle may be erroneously judged to be stopped. In this case, although the vehicle is still moving, a procedure for moving the vehicle in the opposite direction may be started when the front wheels 14 are locked, which creates a great shock. Accordingly, the moving direction of the vehicle cannot be smoothly and reliably switched.

In the embodiment of FIGS. 12 to 21, the vehicle is judged to have stopped when the predicted period TSB has elapsed and the vehicle speed V is lower than the determination value V0, and then direction switching is taken over by the vehicle starting procedure. The predicted period TSB is computed based on the current vehicle speed V and predetermined vehicle deceleration prediction data. The deceleration prediction data is determined taking the vehicle braking force, which is determined based on the load weight W, and the selected deceleration mode into account. Therefore, the predicted period TSB substantially accurately represents the time from when the direction switching procedure is started to when the vehicle is stopped. Thus, in the direction switching procedure, locking of the front wheels 14 is not taken to mean that the vehicle is stopped. The vehicle is reliably stopped and then the starting procedure is started, which results in a smooth direction switching procedure.

Stopping of the vehicle is accurately detected without installing additional sensors, which simplifies the system and reduces the cost.

The engine speed NE is set equal to or lower than the predetermined upper limit value NESB from when the direction switching procedure started until the vehicle is stopped, which permits the vehicle to be smoothly decelerated and the moving direction to be reliably switched.

The upper limit value NESB of the engine speed NE is determined in accordance with the load weight W. Therefore, when the vehicle is braked, the engine speed NE is optimally limited according to the load weight W.

If the vehicle has no mode switch 39, the deceleration prediction data, which is used for computing the predicted period TSB, is determined without taking the deceleration mode into account. Thus, the selected deceleration mode need not be judged in steps S303 to s307, and the predicted period TSB need not be computed in accordance with the deceleration mode. Also, when computing the initial clutch pressure PCL20 in step S332 shown in FIG. 19, the deceleration mode need not be considered, which simplifies the map M13 shown in FIG. 14. Accordingly, the control is simplified.

Figure 22:
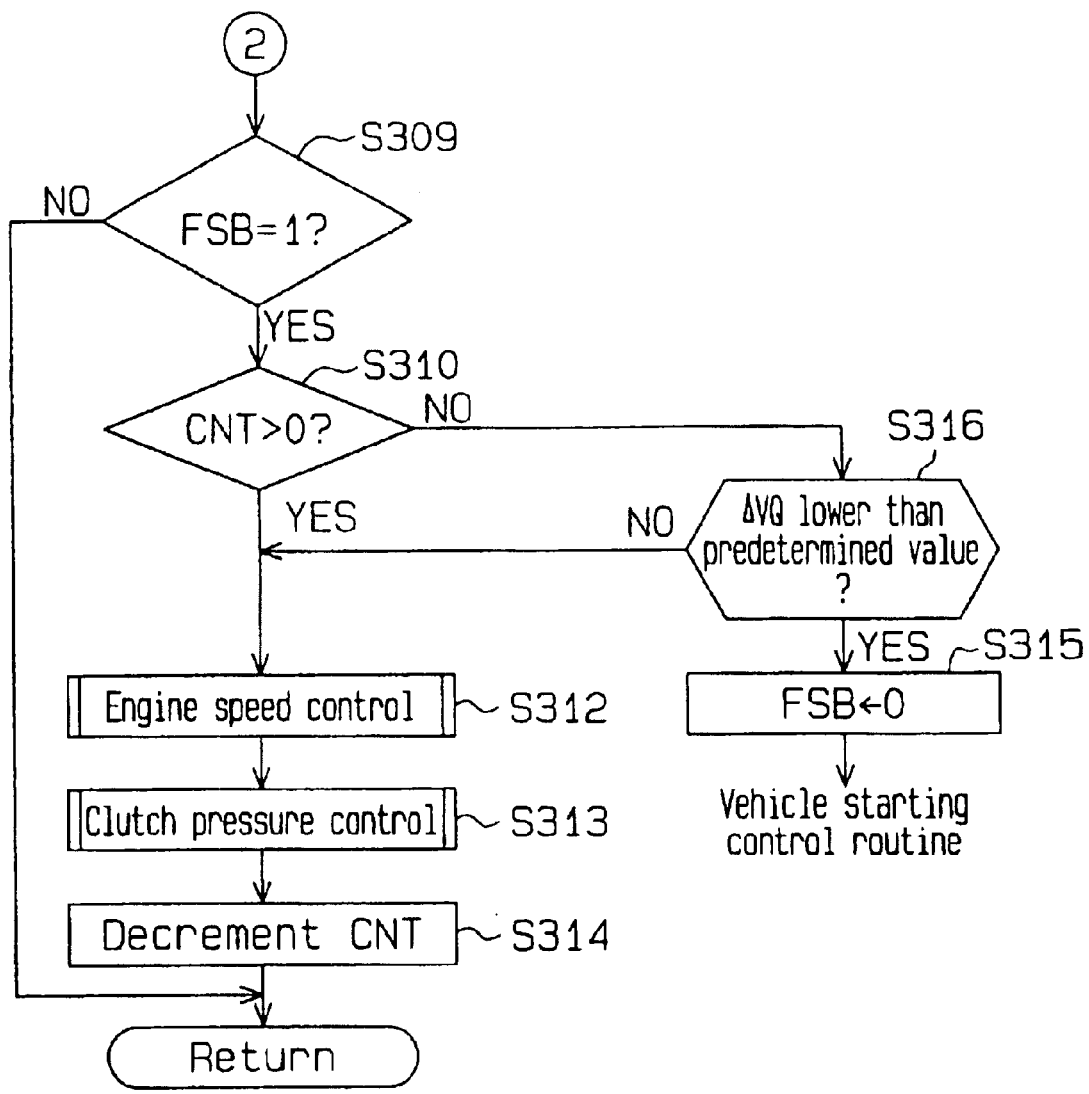
FIG. 22 is a flowchart showing a direction switching control routine according to a fifth embodiment of the present invention.

A fifth embodiment of the present invention will now be described with reference to FIGS. 22 to 23(b). As shown in a flowchart of FIG. 22, the embodiment of FIGS. 22 to 23(b) is the same as the embodiment of FIGS. 12 to 21 except that step S311 of FIG. 17(b) is replaced by step S316.

In step S316, the CPU 56 judges the difference ΔVQ between the input speed and the output speed of the post-shifting clutch 21, 22 is less than a predetermined value. The predetermined value is, for example, zero or a value close to zero. If the outcome is positive, the CPU 56 moves to step S315 and resets the direction switching flag FSB to zero. Thereafter, the CPU 56 moves to the starting control routine of FIGS. 20 and 21. If the outcome of step S316 is negative, the CPU 56 moves to step S312 for continuing the direction switching control procedure.

The input speed of each clutch 21, 22 is equal to the speed NT of the input shaft 19 of the transmission 12, which is detected by the rotational speed sensor 28 shown in FIG. 1, or to the speed NT of the output shaft 18 of the torque converter 11 (see FIG. 1). Thus, a value detected by the rotational speed sensor 28 is used as the speed of the input shaft of the post-shifting clutch 21, 22. Reduction gears are located between the output shaft of the post-shifting clutch 21, 22 and the output shaft 20 of the transmission 12. Therefore, the speed of the output shaft of the post-shifting clutch 21, 22 and the speed ND of the output shaft are proportional to each other according to the reduction ratio of the reduction gears. The speed of the output shaft of the post-shifting clutch 21, 22 is computed based on the speed of the output shaft 20 detected by the rotational speed sensor 30 shown in FIG. 1 taking the reduction ratio of the reduction gears into account.

Figure 23A:
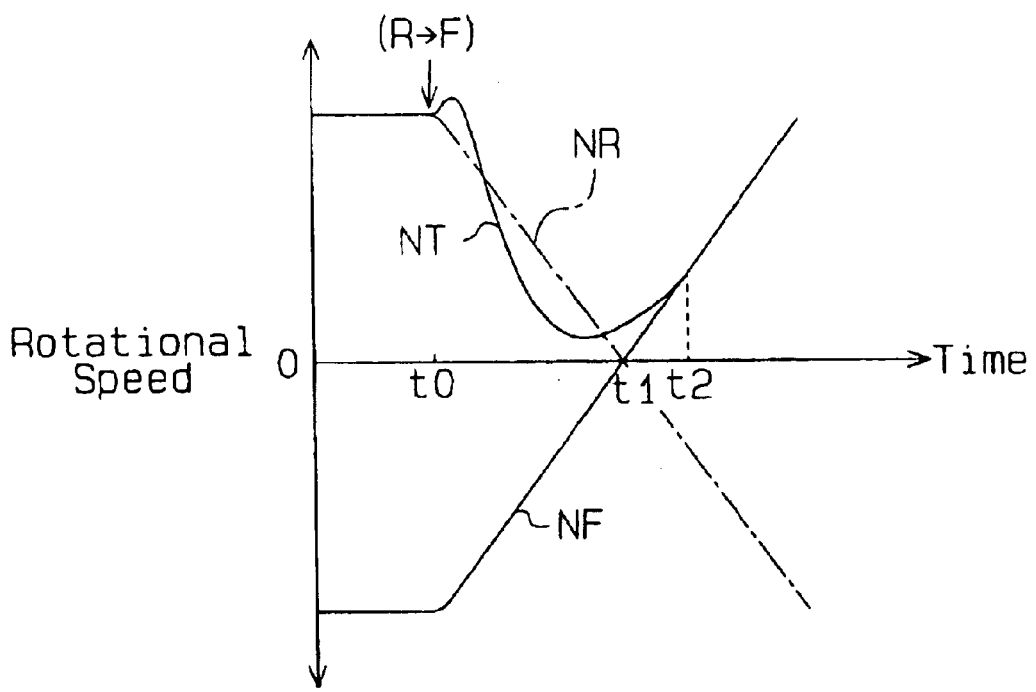
FIG. 23(a) is a timing chart showing changes of the output speed NF of a forward clutch, the output speed NR of a reverse clutch and a turbine speed NT during a direction switching.
Figure 23B:
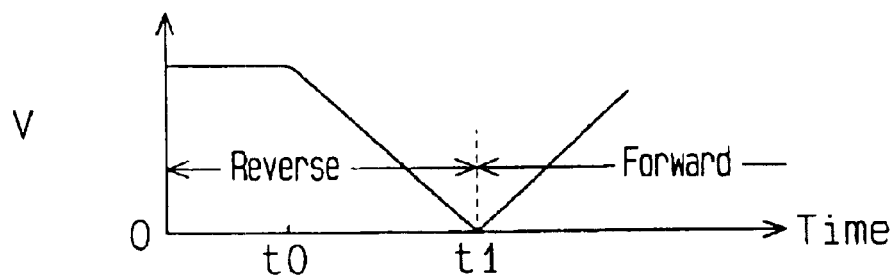
FIG. 23(b) is a timing chart showing changes of the vehicle speed V corresponding to the timing chart of FIG. 23(a)

FIG. 23(a) is a graph showing changes of the output speed NF of the forward clutch 21, the output speed NR of the reverse clutch 22 and the speed NT of the output shaft 18 of the torque converter 11 when shift lever 37 is switched for direction switching. As described above, the speed NT of the output shaft 18 of the torque converter 11 (hereinafter referred to as turbine speed NT) represents the input speed of each clutch 21, 22. FIG. 23(b) is a graph showing changes of the vehicle speed V corresponding to the graph of FIG. 23(a). These graphs show a state where the shift lever 37 is shifted from the reverse position R to the forward position F at time t0.

At time t0, the vehicle is moving backward. The reverse clutch 22 is engaged and the forward clutch 21 is disengaged. At this time, the output speed NR of the reverse clutch 22 is equal to the turbine speed NT. If the gear ratio of the gears corresponding to the forward clutch 21 is equal to the gear ratio of the gears corresponding to the reverse clutch 22, the output speed NF of the forward clutch 22 is equal to the output speed NR of the reverse clutch 22. The rotation direction of the output shaft of the forward clutch 21 is opposite to that of the reverse clutch 22 due to the reduction gears.

The shift lever 37 is shifted from the reverse position R to the forward position F at time t0, which disengages the reverse clutch 22 and partially engages the forward clutch 21, which is the post-shifting clutch, such that the forward clutch 21 functions as a brake (clutch pressure control of FIG. 19). Thus, the speed of the front wheels 14 and the vehicle speed V are lowered. Accordingly, the output speed NF of the forward clutch 21 and the output speed NR of the reverse clutch 22 are lowered at the same gradient. Braking of the forward clutch 21 creates a load, which acts on the output shaft 18 of the torque converter 11, which lowers the turbine speed NT.

The vehicle speed V is zero at time t1. At this time, the output speed NF of the forward clutch 21 and the output speed NR of the reverse clutch 22 are also zero. Time t1 corresponds to a time at which the count value CNT, which represents the predicted period TSB in step S310, is zero. After time t1, the outcome of step S310 is negative and step S316 is executed. Until the difference ΔVQ between the input speed NF of the forward clutch 21 and the turbine speed NT falls below a predetermined value, the outcome of step S316 is negative and the CPU 56 moves to step S312 to continue the direction switching control procedure.

After time t1, the forward clutch 21 functions as a driving clutch. That is, rotation of the output shaft 18 of the torque converter 11 is transmitted to the front wheels 14 through the reduction gears of the forward clutch 21, which is partially engaged. Accordingly, the front wheels 14 starts rotating in a direction opposite to the direction before time t1. Therefore, the vehicle is started in the opposite direction. The output shaft of the clutches 21, 22 starts rotating in a direction opposite the direction before the time t1.

At time t2, which is later than time t1, the output speed NF of the forward clutch 21 is substantially equal to the turbine speed NT. As a result, the outcome of step S316 in FIG. 22 is positive and the CPU 56 moves to the starting control routine of FIGS. 20 and 21. Since the output speed NF of the forward clutch 21 is substantially equal to the turbine speed NT (the input speed of the forward clutch 21), no great shock is created if the forward clutch 21 is suddenly completely engaged in step S465 of FIG. 21.

As described above, the direction switching control is shifted to the vehicle starting control when the predicted period TSB has elapsed and the difference ΔVQ between the input speed and the output speed of the post-shifting clutch 21, 22 falls below the predetermined value. Thus, during the direction switching, the front wheels 14 are not erroneously judged to be locked. Further, the shock accompanying a complete engagement of the post-shifting clutch 21, 22 is significantly reduced.

A sixth embodiment of the present invention will now be described with reference to FIG. 24. The sixth embodiment is the same as the embodiment of FIGS. 12 to 21 except that the routine of FIGS. 17(a) and 17(b) are replaced with the routine of FIG. 24. The same reference numerals are given to those steps that are the same as the corresponding steps in the flowchart of FIGS. 17(a) and 17(b).

Figure 24:
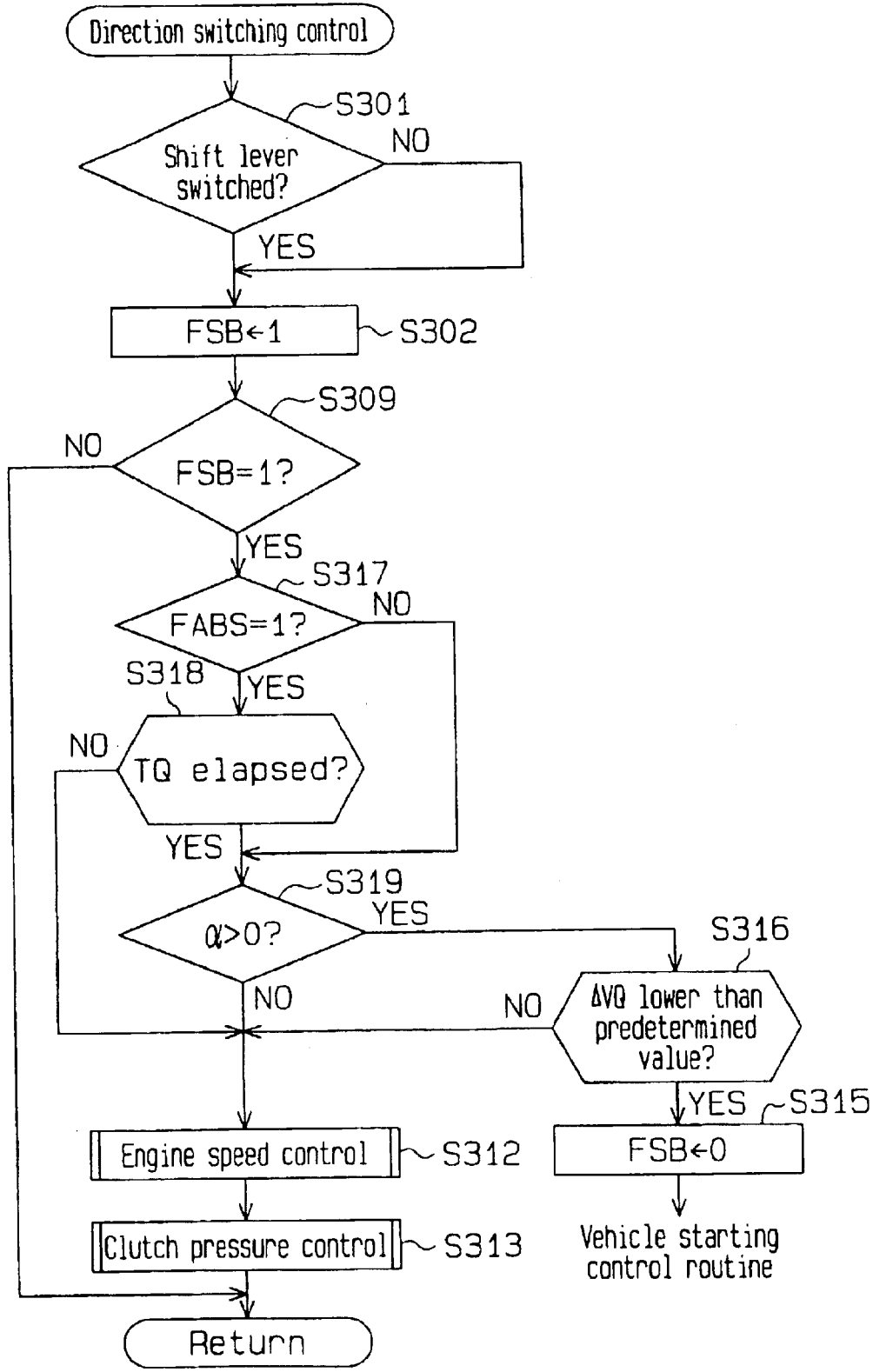
FIG. 24 is a flowchart showing a direction switching control routine according to a sixth embodiment of the present invention.

In the routine of FIG. 24, time at which the acceleration α changes from a negative value to a positive value is judged to be time at which deceleration due to direction switching is shifted to the starting control for moving the vehicle in the opposite direction, or time at which the vehicle is stopped. The routine will be described with reference to FIG. 24.

In step S301, the CPU 56 judges whether the shift lever 37 is shifted for direction switching. If the shift lever 37 is shifted, the CPU 56 moves to step S302 and sets the direction switching flag FSB to one. Thereafter, the CPU 56 moves to step S309. If the shift lever 37 is not shifted, the CPU 56 directly moves to step S309.

In step S309, the CPU 56 judges whether the direction switching flag FSB is one. If the flag FSB is not one, the CPU 56 temporarily suspends the current routine. If the flag FSB is one, the CPU 56 moves to step S317.

In step S317, the CPU 56 judges whether a flag FABS, which indicates whether the ABS control mode is being performed, is one. The flag FABS is set in step S313 in the clutch pressure control routine of FIG. 19. If the flag FABS is one, the CPU 56 moves to step S318. If the flag FABS is one, the CPU 56 moves to step S319.

In step S318, the CPU 56 judges whether a predetermined period TQ has elapsed since the clutch pressure PCL of the post-shifting clutch 21, 22 is restored from the limit value PCL21. If the outcome is positive, the CPU 56 moves to step S319. If the outcome is negative, the CPU 56 directly moves to step S312 without executing step S319.

In step S319, the CPU 56 judges whether the acceleration α is higher than zero, that is, whether the acceleration α has a positive value. If the outcome is positive, the CPU 56 judges that the vehicle has switched from deceleration to the starting control for the opposite direction, that is, the vehicle has stopped, and moves to step S316. If the outcome is negative in step S319, the CPU 56 judges that the vehicle is still decelerating and moves to step S312.

During the ABS control according to the clutch pressure control routine of FIG. 19, the acceleration α can be changed from a negative value to a positive value even if the vehicle is decelerating. Thus, when the acceleration α is changed to a positive value due to execution of the ABS control, the vehicle can be erroneously judged to be switched from the deceleration procedure to the starting procedure in the opposite direction. Step S318 prevents this error.

The importance of step S318 will now be described. As shown in FIGS. 15(b) and 15(c), when the acceleration α is lower than the determination value α0 during the ABS control according to the routine of FIG. 19, the clutch pressure PCL is set to the limit value PCL21. As a result, the acceleration α, which has fallen below the determination value α0, is raised. That is, when the braking force is reduced, the deceleration of the front wheels 14, which had been increasing, starts to decrease. When the acceleration α surpasses the determination value α0, the clutch pressure PCL is increased to a value that is greater than the limit value PCL21 thus limiting the increase of the acceleration α. That is, the braking force is increased again, which limits the decrease of the deceleration of the front wheels 14. Although not shown in FIG. 15(b), after the clutch pressure PCL is increased from the limit value PCL21, the acceleration α may increase from a negative value to a positive value.

Until a predetermined period TQ (for example, 0.2 to 0.5 seconds) has elapsed from when the clutch pressure PCL is increased from the limit value PCL21, in other words, during a period in which the acceleration α can become a positive value due to the ABS control, the outcome of step S318 is negative such that step S319 is not executed. Therefore, if the acceleration α is positive in step S319, it is accurately judged that the vehicle has switched from deceleration to starting in the opposite direction. The time at which a positive outcome of step S319 is determined corresponds to time t1 in FIGS. 23(a) and 23(b).

Step S316 is the same as step S316 in FIG. 22. That is, the CPU 56 judges whether the difference ΔVQ between the input speed and the output speed of the post-shifting clutch 21, 22 is less than predetermined value. If the outcome is positive, the CPU 56 moves to step S315 for executing the starting control routine of FIGS. 20 and 21. If the outcome is negative, the CPU 56 moves to step S312 for continuing the direction switching control.

In step S312, the engine speed control of FIG. 18 is executed. In step S313, the clutch pressure control of FIG. 19 is executed.

The sixth embodiment has the same advantages as the embodiments of FIGS. 12 to 21 and FIGS. 22 to 23(b). Particularly, the period from when the direction switching is started until when the vehicle is stopped need not be computed, which simplifies the procedure.

Figure 25:
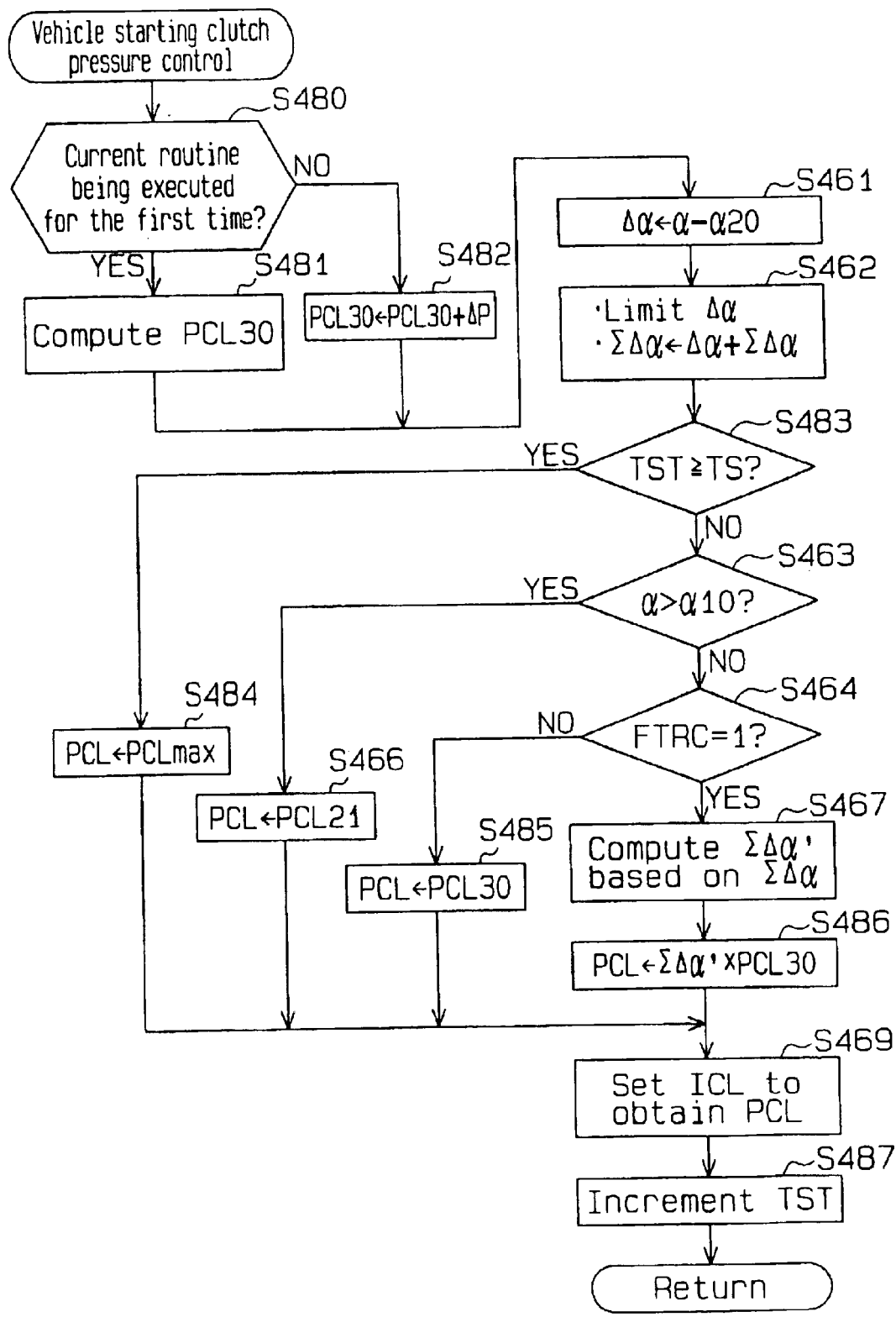
FIG. 25 is a flowchart showing a vehicle starting clutch pressure control according to a seventh embodiment of the present invention.

A seventh embodiment of the present invention will now be described with reference to FIG. 5. The seventh embodiment is the same as the embodiment of FIGS. 12 to 21 except that the vehicle starting clutch pressure control routine of FIG. 21 is replaced by the routine of FIG. 25. The same reference numerals are given to those steps that are the same as the corresponding steps in the flowchart of FIG. 21.

In the routine of FIG. 21, the post-shifting clutch 21, 22 is completely engaged immediately after the vehicle starting control is initiated. In the start clutch pressure control routine of FIG. 25, however, the post-shifting clutch 21, 22 is partially engaged immediately after the vehicle starting control is initiated. Then, the engaging force of the post-shifting clutch 21, 22 is gradually increased for a predetermined period TS after the starting control is started unless the front wheels 14 spin. After the period TS, the engaging force of the post-shifting clutch 21, 22 is maximized. If the front wheels 14 are judged to be spinning, the TRC control is executed in the same manner as the routine of FIG. 21. The routine of FIG. 25 will now be described.

In step S480, the CPU 56 judges whether the current routine is being executed for the first time since the starting control was initiated. If the outcome is positive, the CPU 56 moves to step S481. If the outcome is negative, the CPU 56 moves to step S482.

Figure 14:
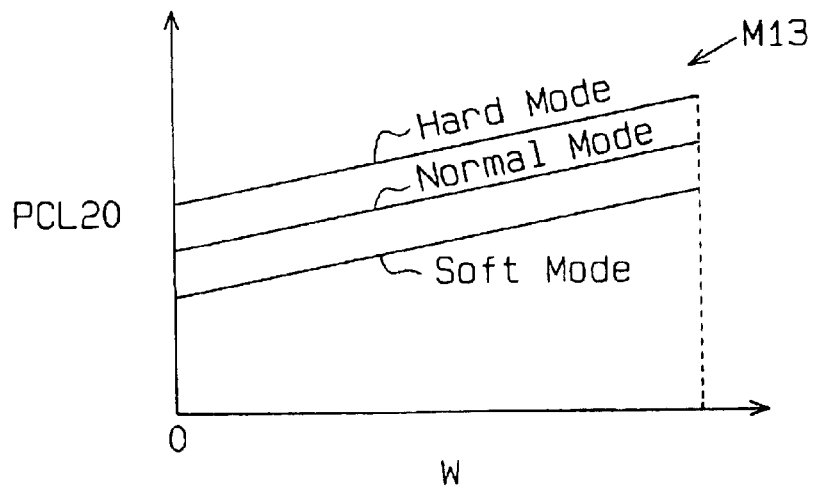
FIG. 14 is a graph showing a map for defining the relationship between the load weight W and an initial clutch pressure PCL20 according to a deceleration mode.

In step S481, the CPU 56 computes an initial clutch pressure PCL30 of the post-shifting clutch 21, 22 according to the load weight W. The initial clutch pressure PCL30 is smaller than the maximum value PCLmax of the clutch pressure PCL and increases as the load weight W increases. The initial clutch pressure PCL30 may be computed according to the load weight W and the deceleration mode. In this case, a map similar to the map M13 shown in FIG. 14 is referred to when computing the initial clutch pressure PCL30.

In step S492, the CPU 56 adds the predetermined value ΔP to the current initial clutch pressure PCL30 and sets the resultant as a new initial clutch pressure PCL30. Therefore, the initial clutch pressure PCL30 gradually increases as time passes after the starting control procedure is started.

Steps S461 to S464, S466, S467 and S469, which will be described below, are the same as the routine of FIG. 21. In steps S461 and S462, the CPU 56 computes the difference Δα between the acceleration α and the reference value α20. The CPU 56 also adds the difference Δα, the value of which has been limited, the current accumulated value ΣΔα and sets the resultant as a new accumulated value ΣΔα.

In step S483, the CPU 56 judges whether a measured time TST from the start of the starting control has reached the predetermined period TS. If the measured time TST has not reached the predetermined period TS, the CPU 56 moves to step S463. If the measured time TST has reached the period TS, the CPU 56 moves to step S484.

In step S463, the CPU 56 judges whether the acceleration α is higher than the determination value α10. If the acceleration α is lower than the determination value α10, the CPU 56 judges that the front wheels 14 are not spinning and moves to step S464. If the acceleration α is higher than the determination value α10, the CPU 56 judges that the front wheels 14 are spinning and moves to step S466.

In step S464, the CPU 56 judges whether the flag FTRC, which is set in the routine of FIG. 20, is one. If the flag FTRC is not one, the CPU 56 moves to step S485 and sets the clutch pressure PCL to the initial clutch pressure PCL30. In step S469, the CPU 56 sends a current the value ICL of which corresponds to the clutch pressure PCL (the initial clutch pressure PCL30) to the clutch valve 23, 24 of the post-shifting clutch 21, 22. Thereafter, the CPU 56 increments the measured time TST in step S487 and temporarily suspends the current routine.

When the vehicle starting control is initiated, the clutch pressure PCL of the post-shifting clutch 21, 22 is set to the initial clutch pressure PCL30, which is computed according to the load weight W in step 481. Thereafter, the initial clutch pressure PCL is gradually increased until the measured time TST reaches the predetermined period TS unless the front wheels 14 spin.

If the measured time TST reaches the predetermined time TS in step S483, the CPU 56 moves to step S484. In step S484, the CPU 56 sets the clutch pressure PCL to the maximum value PCLmax and moves to step S469. In this manner, the engaging force of the post-shifting clutch 21, 22 is maximized, which sets the power transmission efficiency from the engine 10 to the front wheels 14 to one hundred percent.

If the acceleration α is higher than the determination α10 in step S463, the CPU 56 moves to step S466 and sets the clutch pressure PCL to a predetermined limit value PCL21. Then, the CPU 56 moves to step S469. Accordingly, the engaging force of the post-shifting clutch 21, 22 is reduced, which stops the front wheels 14 from spinning. When the acceleration α surpasses the determination value α10, the CPU 56 sets the flag FTRC to one in the routine of FIG. 20 and starts the TRC control mode.

If the acceleration α is lower than the determination value α10 in step S463 and the flag FTRC is one in step S464, the CPU 56 moves to step S467. In step S467, the CPU 56 computes a variable ΣΔα' based on the accumulated value ΣΔα of the difference αΔ. Then, in step S486, the CPU 56 multiplies the initial clutch pressure PCL30 by the variable ΣΔα' and sets the resultant as the clutch pressure PCL of the post-shifting clutch 21, 22. The CPU 56 then moves to step S469. Therefore, when the clutch pressure PCL is increased from the limit value PCL21, the clutch pressure PCL is smaller than the current initial clutch pressure PCL30 according to the accumulated value ΣΔα.

In the seventh embodiment, the post-shifting clutch 21, 22 is not completely engaged but partially engaged immediately after the vehicle starting control is started. Then, during the predetermined period TS after the start of the starting control, the engaging force of the post-shifting clutch 21, 22 is gradually increased unless the front wheels 14 spin. Thus, the vehicle is smoothly started without shock.

The initial clutch pressure PCL30, which is set immediately after the vehicle starting control is started, is determined taking the load weight W into consideration. Therefore, when switching the moving direction, the vehicle is not influenced by the load weight W and is smoothly accelerated in the opposite direction.

The embodiments of FIGS. 12 to 25 may be embodied in the following manners.

Step S311 in FIG. 17(b) or step S316 of FIG. 22 may be omitted. In this case, when the predicted period TSB has elapsed in step S310, the CPU 56 switches from the direction switching control to the vehicle starting control. Likewise, step S316 of FIG. 24 may be omitted. In this case, when the acceleration α is a positive value in step S319, the CPU 56 shifts the direction switching control to the vehicle starting control.

The predicted period TSB need not be a period from when the direction switching is started until the vehicle is stopped. The period TSB may be the period from when the direction switching is started until the vehicle speed V becomes equal to the determination value V0 (see FIG. S311 in FIG. 17(b)). That is, the predicted period TSB may be a period from when the direction switching is started until the vehicle speed V is decreased to a value that is sufficiently low for switching the moving direction without creating any shock.

The predicted period TSB need not be computed based on the vehicle deceleration prediction data, which is previously stored in the ROM 57. That is, the vehicle deceleration may be actually detected when the vehicle is decelerated due to direction switching and the predicted period TSB may be computed based on the detected deceleration.

When the vehicle is decelerating due to direction switching, braking by the post-shifting clutch 21, 22 need not be executed. The vehicle may be decelerated by limiting the engine speed NE to, for example, the idling speed.

When the vehicle is decelerating due to the direction switching control, the engine speed NE need not be limited.

During the ABS control or the TRC control, the clutch pressure PCL need not be fixed to the limit value PCL21. The clutch pressure PCL may be gradually changed.

A sensor for detecting the speed of the rear wheels (not shown) may be used.

An eighth embodiment of the present invention will now be described with reference to FIGS. 26 to 27(b). The eighth embodiment is a modification of the clutch control procedure that was explained in the embodiment of FIGS. 1 to 6.

Since the mechanical structure of the vehicle of the eighth embodiment is the same as that of FIG. 1, the wheel brakes 46 shown in FIG. 7 may be used for the front wheels 14.

As described in the clutch control section of the embodiment of FIGS. 1 to 6, when the shift lever 37 is switched from the neutral position N to the forward position F or to the reverse position R, the clutch pressure PFCL, PRCL of the clutch 21, 22 that corresponds to the new shift lever position is temporarily maintained at the initial value PRCL0, PRCL0 and is then increased to maximum value PFCLmax, PRCLmax.

In the embodiment of FIGS. 1 to 6, the clutch pressure PFCL, PRCL is maintained at the initial value PFCL0, PRCL0 until the difference ΔN between the engine speed NE and the speed NT of the output shaft 18 of the torque converter 11 falls below the determination value ΔN0. In the eighth embodiment, the clutch pressure PFCL, PRCL is maintained at the initial value PFCL0, PRCL0 until the difference ΔVQ between the input speed Vin and the output speed Vout of the clutch 21, 22 falls below a predetermined determination value ΔVQ0. This procedure will be described with reference to the flowchart of FIG. 26.

Figure 26:
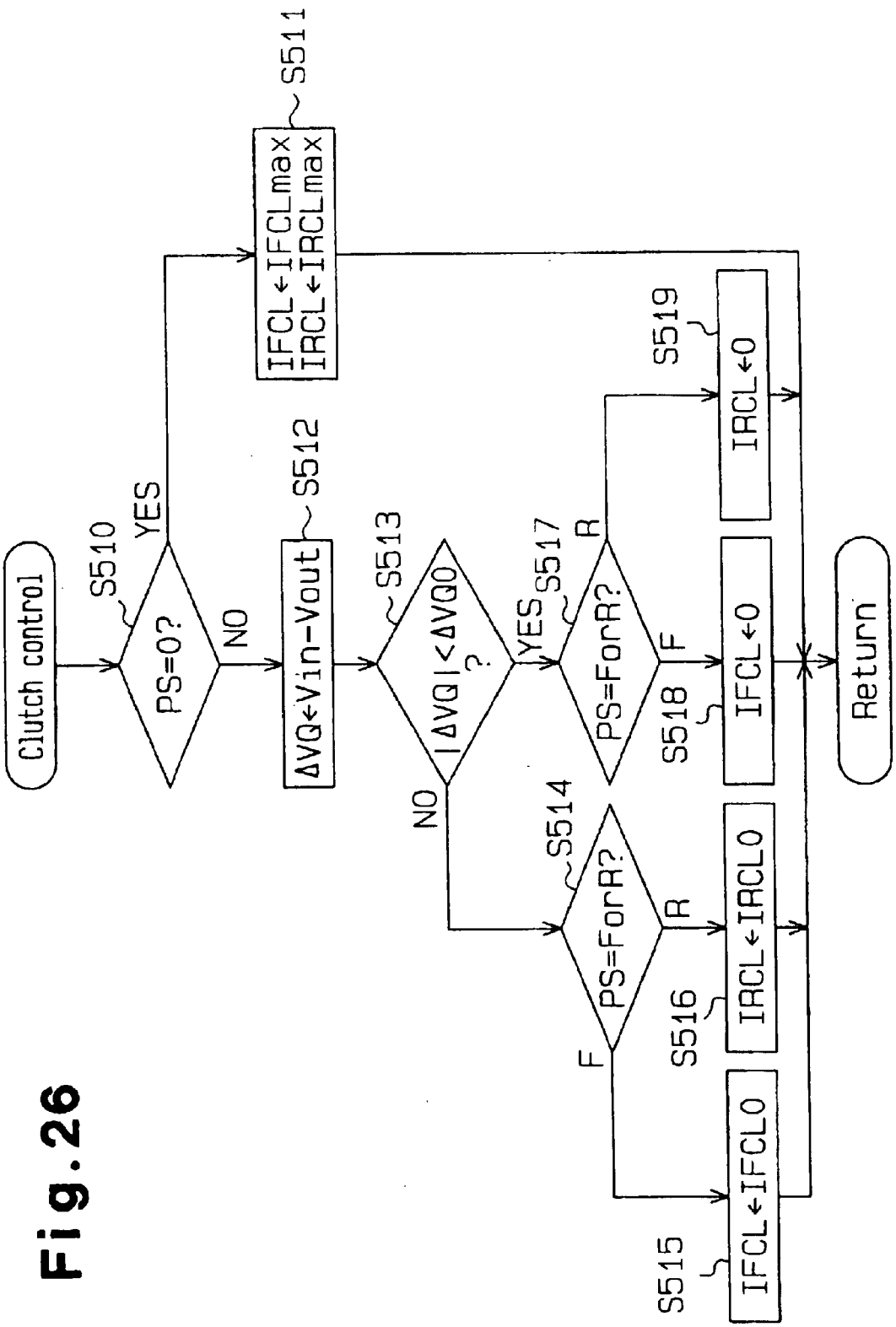
FIG. 26 is a flowchart showing a clutch control routine according to an eighth embodiment of the present invention.

FIG. 26 is a flowchart showing the clutch control routine executed by the CPU 56. The routine of FIG. 26 is executed at predetermined intervals, for example ten milliseconds, while the engine 10 is running.

In step S510, the CPU 56 judges whether the signal PS, which represents the shift lever position, indicates the neutral position N. If the shift position signal PS indicates the neutral position N, the CPU 56 moves to step S511. In step S511, the CPU 56 maximizes the values IFCL, IRCL of a current to the clutch valves 23, 24, that is, the CPU 56 sets the electric current value to the maximum values IFCLmax, IRCLmax so that the clutch pressures PFCL, PRCL of the clutches 21, 22 are zero. The CPU 56 then temporarily suspends the current routine. In this embodiment, the clutch pressures PFCL, PRCL decrease as the values IFCL, IRCL of the electric currents to the clutch valves 23, 24 are increased.

If the shift position signal PS indicates the forward position F or the reverse position R, the CPU 56 moves to step S512. In step S512, the CPU 56 computes the difference ΔVQ between the input speed Vin and the output speed Vout of the clutch 21, 22 that corresponds to the current shift lever position.

As described in the embodiment of FIGS. 22 to 23(b), the speed NT of the input shaft 19, which is detected by the rotational speed sensor 28 shown in FIG. 1, is used as the input speed Vin of the clutches 21, 22. The output speed Vout of the clutches 21, 22 is computed based on the speed ND of the output shaft 20, which is detected by the rotational speed sensor 30, taking the reduction ratio of the reduction gears into account.

In step S513, the CPU 56 judges whether the absolute value of the rotational speed difference ΔVQ is less than a determination value ΔVQ0. The determination value ΔVQ0 is, for example, zero or a value close to zero. If the rotational speed difference ΔVQ is equal to greater than the determination value ΔVQ0, the CPU 56 moves to step S514. In step S514, the CPU 56 judges whether the shift position signal PS indicates the forward position F or the reverse position R.

If the shift position signal PS indicates the forward position F, the CPU 56 moves to step S515. In step S515, the CPU 56 sets the current value IFCL to the forward clutch valve 23 to an initial value IFCL0, which corresponds to the initial value PFCL0 of the forward clutch pressure PFCL and temporarily suspends the current routine. If the shift position signal PS indicates the reverse position R in step S514, the CPU 56 moves to step S516. In step S516, the CPU 56 sets the current value IRCL to the reverse clutch valve 24 to an initial value IRCL0, which corresponds to an initial value PRCL0 of the reverse clutch pressure PRCL and temporarily suspends the current routine.

The initial values PFCL0, PRCL0 are determined taking the load weight W into account. The initial values PFCL0, PRCL0 are increased as the load weight W increases. Therefore, the initial values IFCL0, IRCL0 of the current values that correspond to the initial values PFCL0, PRCL0 decrease as the load weight W increases. A map (not shown) that defines the relationship between the load weight W and the initial value PRCL0, PRCL0 or the initial values IFCL0, IRCL0 is previously stored in the ROM 57 of FIG. 2.

If the rotational speed difference $\Delta VQ$ is less than the determination value $\Delta VQ0$ in step 5513, the CPU 56 moves to step S517. In step 517, the CPU 56 judges whether the shift position signal PS indicates the forward position F or the reverse position R.

If the shift position signal PS indicates the forward position F, the CPU 56 moves to step S518. In step 518, the CPU 56 sets the current value IFCL to the forward clutch valve 23 to zero so that the forward clutch pressure PFCL is set to the maximum value PFCLmax. Then, the CPU 56 temporarily suspends the current routine. If the shift position signal PS indicates the reverse position R, the CPU 56 moves to step S519. In step S519, the CPU 56 sets the current value IRCL to zero so that the reverse clutch pressure PRCL is set to the maximum value PRCLmax. Then, the CPU 56 temporarily suspends the current routine.

Figure 27A:
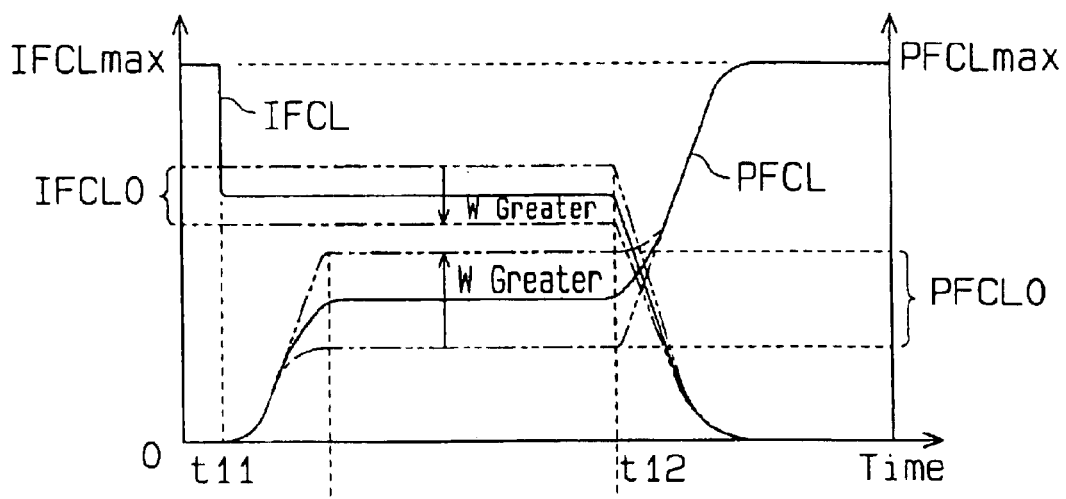
FIG. 27(a) is a timing chart showing changes of a supplied current value IFCL and a forward clutch pressure PFCL when the shift lever is switched from a neutral position to a forward position.
Figure 27B:
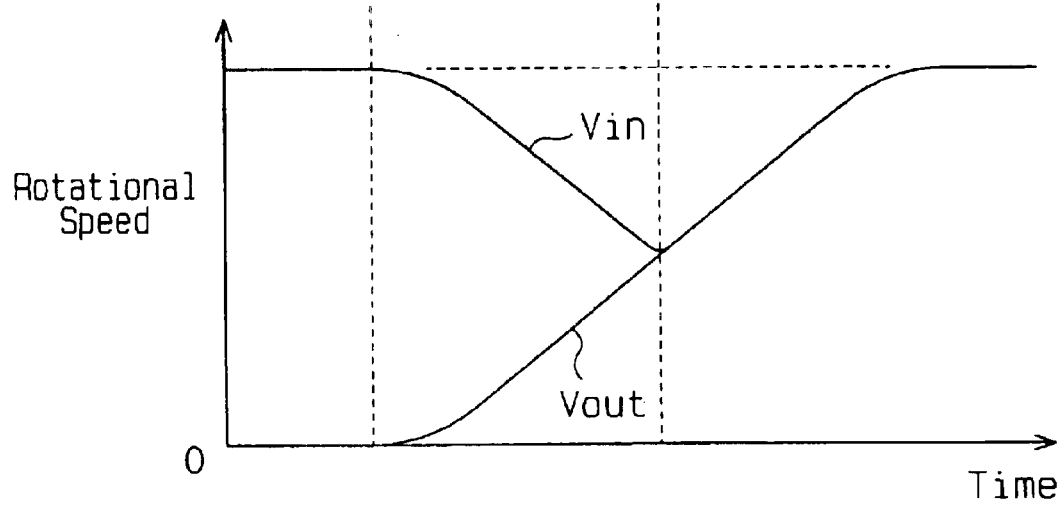
FIG. 27(b) is a timing chart showing changes of the input speed Vin and output speed Vout of the forward clutch.

The clutch control will now be described with reference to the timing charts of FIGS. 27(a) and 27(b). FIG. 27(a) shows changes of the current value IFCL to the forward clutch valve 23 and the forward clutch pressure PFCL when the shift lever 37 is shifted from the neutral position N to the forward position F. The left vertical axis refers to the current value IFCL, and the right vertical axis refers to the forward clutch pressure PFCL. FIG. 27(b) shows changes of the input speed Vin and the output speed Vout of the forward clutch 21. When the shift lever 37 is shifted from the neutral position N to the reverse position R, the reverse clutch 22 and the reverse clutch valve 24 behave like the forward clutch 21 and the forward clutch valve 23 as shown in FIGS. 27(a) and 27(b).

When the shift lever 37 is at the neutral position N, the current value IFCL is maintained at the maximum value IFCLmax, which maintains the forward clutch pressure PFCL to zero. In this state, the input speed Vin corresponds to the current engine speed NE, and the output speed Vout is zero.

When the shift lever 37 is switched to the forward position F at time t11, the current value IFCL is changed to the initial value IFCL0, which increases the forward clutch pressure PFCL to the initial value PFCL0. The initial value IFCL0 of the current value IFCL has a smaller value for a smaller load weight W. Therefore, the initial value PFCL0 of the forward clutch pressure PFCL increases as the load weight W increases.

When the forward clutch pressure PFCL is the initial value PFCL0, the forward clutch 21 is partially engaged. Accordingly, the output speed Vout gradually increases, which starts the vehicle slowly, rather than suddenly. The load due to the forward movement of the vehicle gradually decreases the input speed Vin.

At time t12, which is slightly later than time t11, the output speed Vout substantially matches the input speed Vin.

Then, the outcome of step S513 of FIG. 26 is positive and step S518 is executed. That is, the current value IFCL is set to zero and the forward clutch pressure PFCl is increased to the maximum value PFCLmax. Since the output speed Vout is substantially the same as the input speed Vin, complete engagement of the forward clutch 21 in step S518 does not create shock.

After time t12, the output speed Vout and the input speed Vin equally increase to a value that corresponds to the current engine speed NE.

The clutches 21, 22 are controlled in the above manner when the vehicle is started, which permits the vehicle to be smoothly started without a shock. Further, the period during which the clutches 21, 22 are partially engaged is a minimally required period for avoiding a shock caused by a complete engagement. Therefore, wear of the clutches 21, 22 due to partially engagement is minimized. Also, the vehicle is quickly accelerated.

The initial values PFCL0, PRCL0 of the clutch pressures PFCL, PRCL are determined taking the load weight W into consideration. Thus, the operator feels the same acceleration for the same degree of depression of the acceleration pedal 31 regardless of the load weight W.

A ninth embodiment of the present invention will now be described with reference to FIGS. 28(a) to 29(b). Mainly, the differences from the embodiment of FIGS. 26 to 27(b) will be discussed below. The embodiment of FIGS. 28(a) to 29(b) is different from the embodiment of FIGS. 26 to 27(b) in that the clutch pressures PFCL, PRCL are gradually increased from initial values PFCL0, PRCL0 at a rate that is determined based on the engine speed NE from when the shift lever 37 is switched to the forward position F or to the reverse position R until a predetermined period TA elapses.

A clutch control according to the ninth embodiment will now be described with reference to flowcharts of FIGS. 28(a) and 28(b) and graphs of FIGS. 29(a) and 29(b). Like FIG. 27(a), the FIGS. 29(a) and 29(b) show changes of the current value IFCL to the forward clutch valve 23 and the forward clutch pressure PFCL when the shift lever 37 is switched from the neutral position N to the forward position F.

Figure 28A:
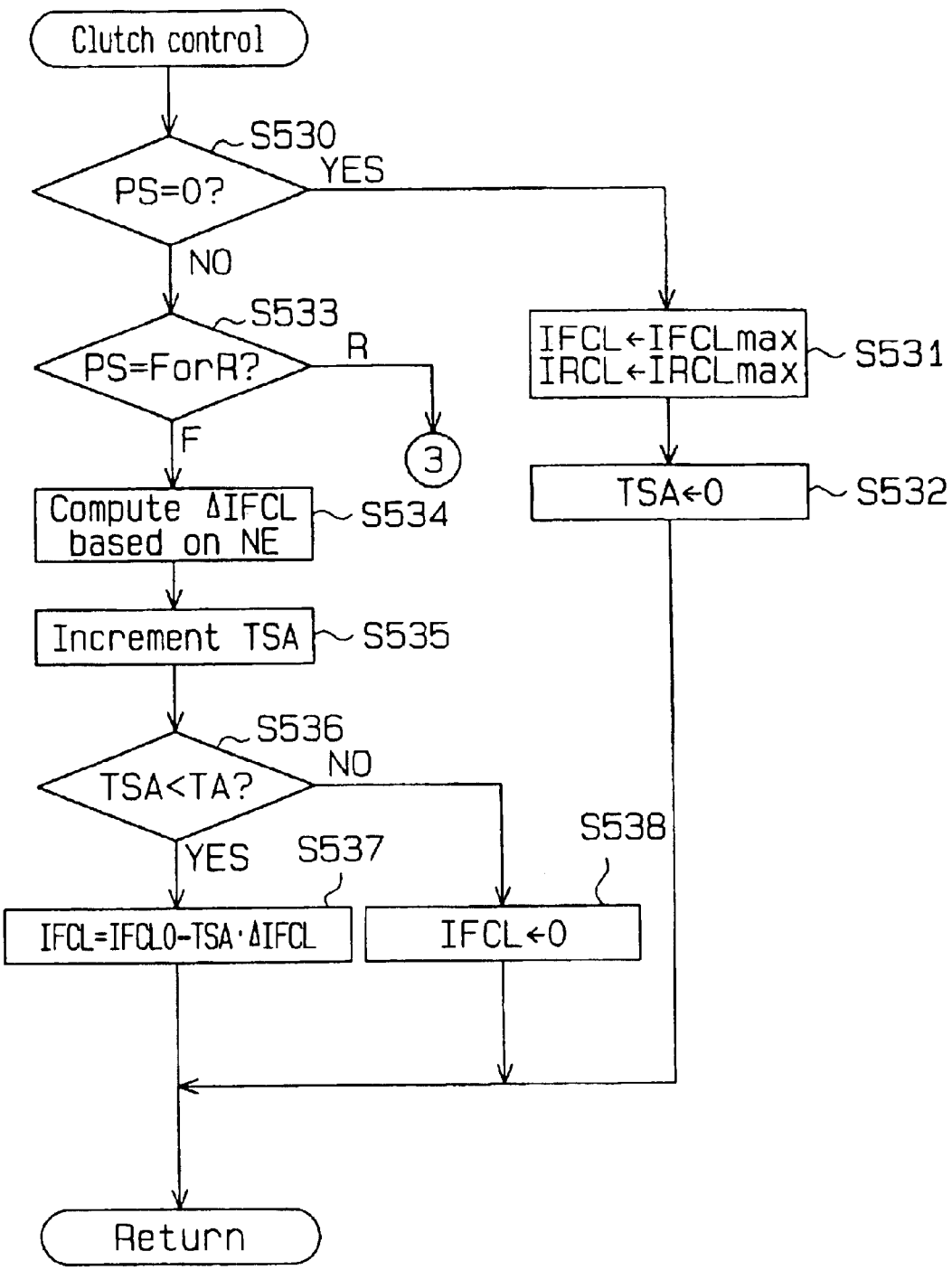
FIGS. 28(a) and 28(b) are flowcharts showing a clutch control routine according to a ninth embodiment of the present invention.
Figure 29A:
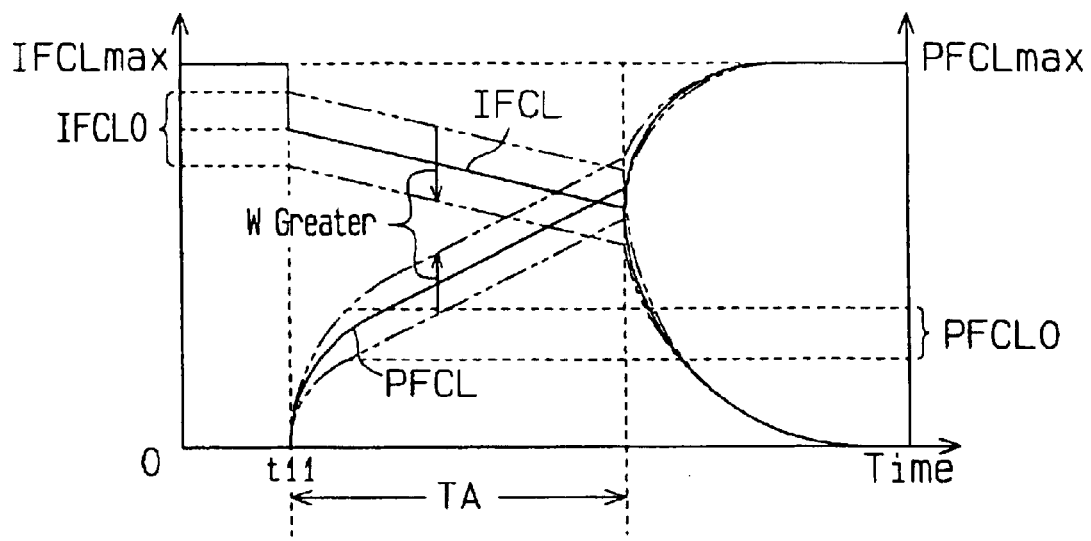
FIGS. 29(a) and 29(b) are timing charts showing changes of the supplied current value IFCL and the forward clutch pressure PFCL when the shift lever is switched from the neutral position to the forward position.
Figure 29B:
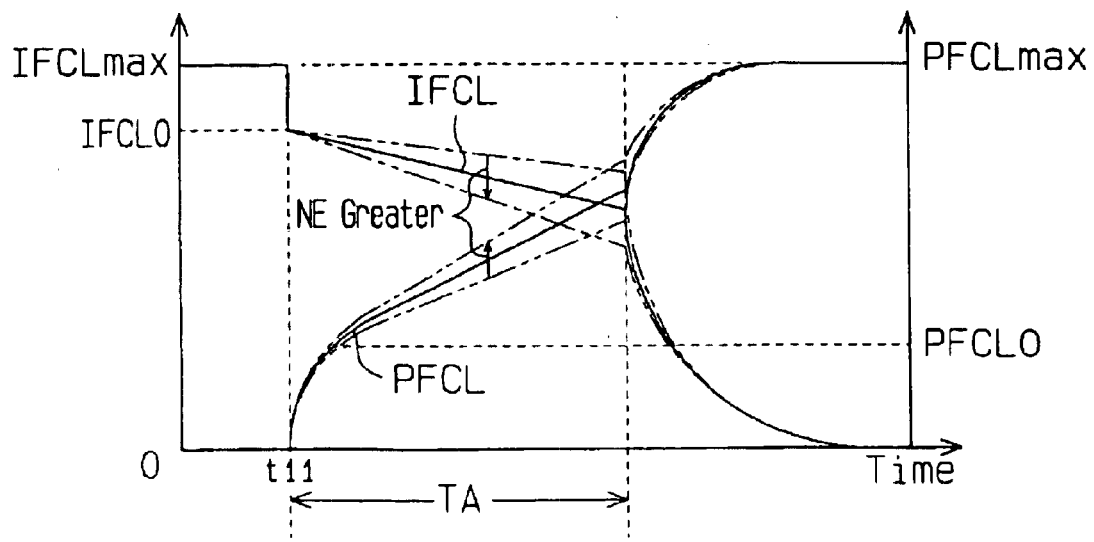

In step S530 of FIG. 28(a), the CPU 56 judges whether the shift position signal PS indicates the neutral position N, if the shift position signal PS indicates the neutral position N, the CPU 56 moves to step S531 and executes the same process as step S511. That is, the CPU 56 sets the current value IFCL, IRCL to the clutch valves 23, 24 to the maximum values IFCLmax, IRCLmax so that the clutch pressures PFCL, PRCL of the clutches 21, 22 are set to zero. In step S532, the CPU 56 resets a measured period TSA to zero and temporarily suspends the current routine.

If the shift position signal PS does not indicate the neutral position N in step S530, the CPU 56 moves to step S533. In step S533, the CPU 56 judges whether the shift position signal PS indicates the forward position F or the reverse position R.

If the shift position signal PS indicates the forward position F, the CPU 56 moves to step S534 and computes a reduction value $\Delta$IFCL of the current value IFCL to the forward clutch valve 23 based on the engine speed NE. The reduction value $\Delta$IFCL is increased as the engine speed NE increases. A map (not shown) defining the relationship between the engine speed NE and the reduction value $\Delta$IFCL is previously stored in the ROM 57 of FIG. 2.

In step S535, the CPU 56 increments the measured period TSA. In step S536, the CPU 56 judges whether the measured time TSA is equal to or less than a predetermined period TA.

The predetermined period TA is determined considering the period in which the difference ΔVQ between the input speed Vin and the output speed Vout of the clutch 21, 22 that corresponds to the shifted lever position falls below a determination value ΔVQ0 (see the embodiment of FIGS. 26 to 27(b)). Therefore, when the measured period TSA reaches the predetermined period TA, the speed difference ΔVQ is less than the determination value ΔVQ0. If the measured period TSA has not reached the predetermined period TA, the CPU 56 moves to step S537.

In step S537, the CPU 56 multiplies the reduction value ΔIFCL by the measured period TSA and subtracts the resultant from the initial value IFCL0 of the current value IFCL. The CPU 56 sets the final resultant as the current value IFCL to the forward clutch valve 23 and temporarily suspends the current routine. Like the embodiment of FIGS. 26 to 27, the initial value IFCL0 of the current value IFCL is determined according to the load weight W.

Therefore, as shown in FIG. 29(a), the current value IFCL decreases from the initial value IFCL0 at a rate that corresponds to the engine speed NE from when the shift lever 37 is shifted to the forward position F at time t11. As a result, the forward clutch pressure PFCL is increased from the initial value PFCL0, which corresponds to the load weight W, at a rate that corresponds to the engine speed NE.

The reduction value ΔIFCL of the current value IFCL is increased as the engine speed NE increases. Thus, as shown in FIG. 29(b), the current value IFCL decreases at a greater rate when the engine speed NE is greater. As a result, the forward clutch pressure PFCL increases at a greater rate when the engine speed NE is higher.

If the measured period TSA exceeds the predetermined period TA in step S536, the CPU 56 moves to step S538, in step 538, the CPU 56 sets the current value IFCL to the forward clutch valve 23 to zero so that the forward clutch pressure PFCL is set to the maximum value PFCLmax and temporarily suspends the current routine. As shown in FIGS. 29(a) and 29(b), the current value IFCL is gradually decreased to zero in time.

Figure 28B:
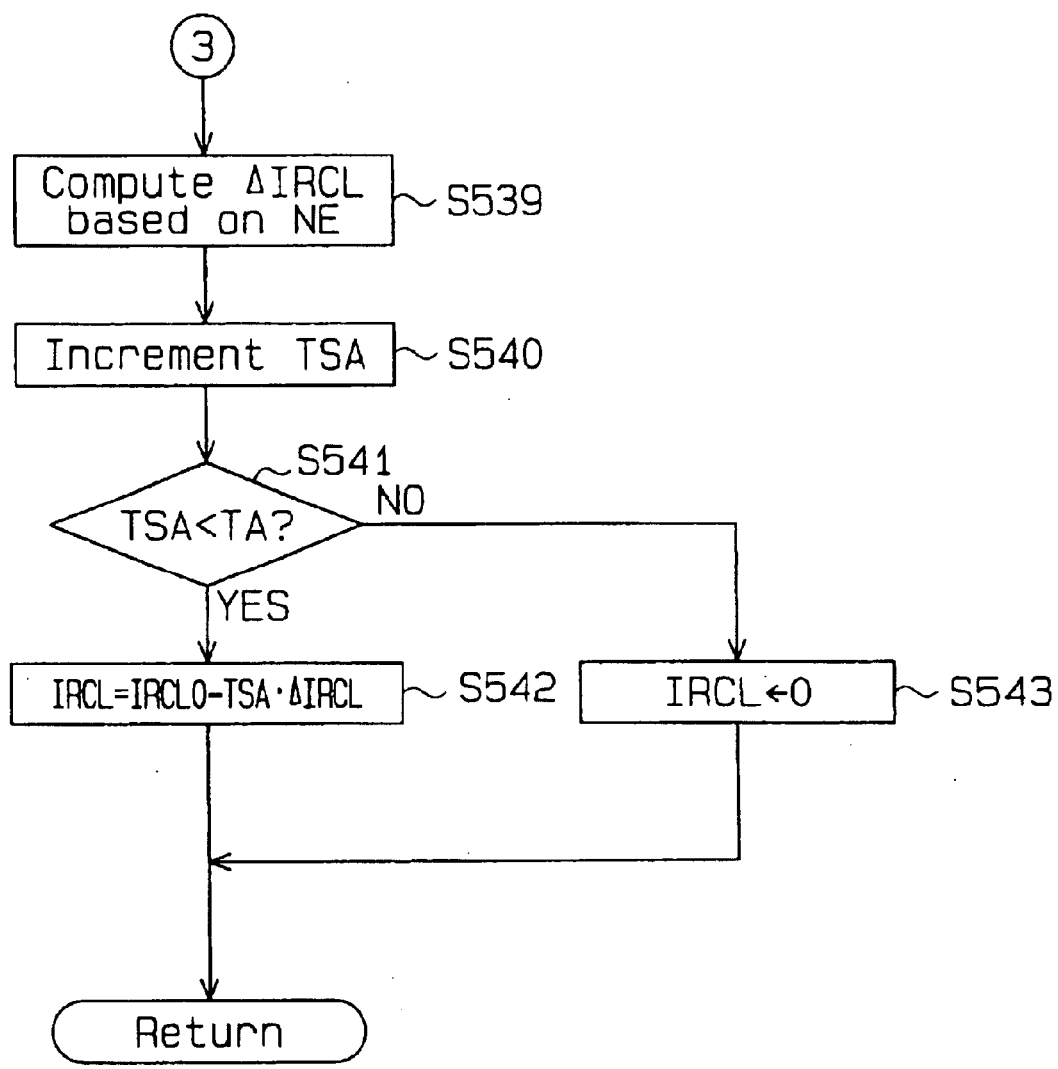

If the shift position signal PS indicates the reverse position R in step S533, the CPU 56 moves to step S539, which is shown in FIG. 28(b). Steps S539 to 543 corresponds to steps S534 to S538, which are executed when the shift position is switched to the forward position F.

That is, in step S539, the CPU 56 computes a reduction value ΔIRCL of the current value IRCL to the reverse clutch valve 24 based on the engine speed NE. The reduction value ΔIRCL is increased as the engine speed NE increases. A map (not shown) that defines the relationship between the engine speed NE and the reduction value ΔIRCL is previously stored in the ROM 57 of FIG. 2.

In step S540, the CPU 56 increments the measured period TSA. In step S541, the CPU 56 judges whether the measured period TSA is equal to or less than the predetermined period TA. If the measured period TSA is equal to or less than the predetermined period TA, the CPU 56 moves to step S542.

In step S542, the CPU 56 multiplies the reduction value ΔIRCL by the measured period TSA and subtracts the resultant from the initial value IRCL0 of the current value IRCL. The CPU 56 sets the final resultant as the current value IRCL to the reverse clutch valve 24 and temporarily suspends the current routine. Like the embodiment of FIGS. 26 to 27(b), the initial value IRCL0 of the current value IRCL is determined according to the load weight W.

As a result, the reverse clutch pressure PRCL is increased from the initial value PRCL0, which corresponds to the load weight W, at a rate corresponding to the engine speed NE as in the case of the forward clutch PRCL shown in FIGS. 29(a) and 29(b). The reverse clutch PRCL is increased at a greater rate for a greater value of the engine speed NE.

If the measured period TSA is more than the predetermined period TA in step S541, the CPU 56 moves to step S543. In step S543, the CPU sets the current value IRCL to the reverse clutch valve 24 to zero so that the reverse clutch pressure PRCL is set to the maximum value PRCLmax and temporarily suspends the current routine. The current value IRCL is gradually decreased to zero in time.

As the clutch pressures PFCL, PRCL increase, the load on the engine 10 increases. Therefore, when the engine speed NE is low, in other words, when the engine power is small, a sudden increase of the clutch pressures PFCL, PRCL temporarily drops the engine speed NE due to the increase of the load on the engine 10. This hinders smooth starting of the vehicle.

In this embodiment, when the shift lever 37 is switched to the forward position F or to the reverse position R, the clutch pressures PFCL, PRCL are increased from the initial values PRCL0, PRCL0 at a rate that is determined according to the engine speed NE. The increase rate of the clutch pressures PFCL, PRCL is higher for a greater value of the engine speed NE. If the engine speed NE is low, the clutch pressures PFCL, PRCL are gradually increased, which prevents the load on the engine 10 from increasing suddenly. Therefore, the engine speed NE does not temporarily drop and the vehicle is started smoothly without jerky movements.

If the engine speed NE is relatively high, the clutch pressures PFCL, PRCL are relatively quickly increased, which permits the vehicle to be rapidly accelerated.

The difference ΔVQ between the input speed Vin and the output speed Vout of the clutches 21, 22 is judged to be less than the determination value ΔVQ0 when the measured period TSA surpasses the predetermined period TA. Therefore, the input speed Vin and the output speed Vout need not be detected, which simplifies the control.

The embodiments of FIGS. 26 to 29(b) may be modified as follows.

The initial values PFCL0, PRCL0 of the clutch pressures PFCL, PRCL may be constant regardless of the load weight W.

In the embodiment of FIGS. 28(a) to 29(b), the decrease rate of the current value IFCL, IRCL (the increase rate of the clutch pressure PFCL, PRCL) may be constant regardless of the engine speed NE. Even with such modification, the vehicle acceleration is improved compared to the embodiment of FIGS. 26 to 27(b), in which the clutch pressures PFCL, PRCL are temporarily maintained at the initial values PFCL0, PRCL0.

The clutch pressures PFCL, PRCL for a specific current values IFCL, IRCL vary for each clutch valve 23, 24 due to dimensional errors and errors produced by assembling. Thus, if the decrease rate of the current values IFCL, IRCL are set constant regardless of the engine speed NE, the initial values IFCL0, IRCL0 of the current values IFCL, IRCL and the decrease rate are preferably determined under the assumption that the initial values PFCL0, PRCL0 of the clutch pressures PFCL, PRCL are obtained by the current values IFCL, IRCL that are the greatest in the tolerance range.

As in the embodiment of FIGS. 26 to 27(b), the clutch pressures PFCL, PRCL may be set to the maximum values PFCLmax, PRCLmax when the difference ΔVA of the input speed Vin and output speed Vout falls below the determination value ΔVQ0 in the embodiment of FIGS. 28(a) to 29(b). In the embodiment of FIGS. 26 to 27(b), the clutch pressures PFCl, PRCL may be set to the maximum values PFCLmax, PRCLmax when the measured period TSA reaches the predetermined period TA.

Unlike the embodiments of FIGS. 26 to 29(b), the clutch valves 23, 24 may be replaced by clutch valves in which the clutch pressures PFCL, PRCL increase as the current values IFCL, IRCL increase.

A tenth embodiment of the present invention will now be described with reference to FIGS. 30 to 31. In the embodiments of FIGS. 1 to 25, the speed ND of the output shaft 20 of the transmission 12 is detected by the rotational speed sensor 30 and is used as the speed of the front wheels 14. During the ABS control and the TRC control, locking and spinning of the front wheels 14, which are driving wheels, are judged based on the detection signal of the sensor 30.

The output shaft 20 is coupled to the front wheels 14 by the differential 13. The differential 13 permits a speed difference between the front wheels 14. Therefore, locking or spinning of one of the front wheels 14 cannot be detected based on the speed ND of the output shaft 20. Thus, if one of the wheels 14 locks or spins, no measures are taken to prevent locking or spinning. The objective of the tenth embodiment is to prevent locking and spinning from occurring at one of the front wheels 14.

Figure 30:
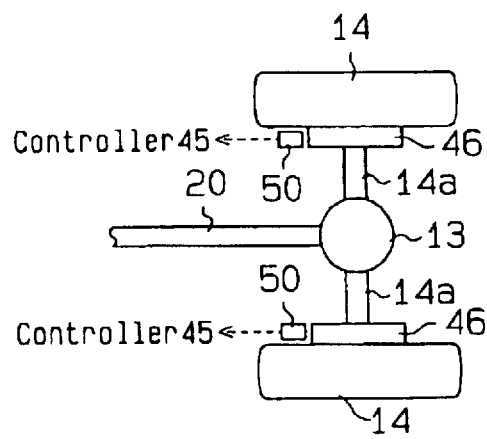
FIG. 30 is a partial view illustrating a vehicle according to a tenth embodiment of the present invention.

As shown in FIG. 30, the mechanical structure of the vehicle according to the tenth embodiment is different from the vehicle shown in FIG. 1 in that a wheel brake 46 is provided for each front wheel 14 and a front wheel sensor 50 is located in the vicinity of each front wheel 14 to detect the rotating speed of the corresponding front wheel 14. Unlike the vehicle of FIG. 1, the vehicle of FIG. 30 does not have the rotational speed sensor 30. Otherwise, the structure is the same as the vehicle of FIG. 1. The wheel brakes 46 may be omitted.

A skidding prevention control according to the tenth embodiment will now be described with reference to the flowchart of FIG. 31. The routine of FIG. 31 is executed at predetermined intervals (for example, ten to fifty milliseconds) while the engine is running. When necessary, the left front wheel 14 will be referred to as a left driving wheel 14L, and the right front wheel 14 will be referred to as a right driving wheel 14R.

In step S601, the CPU 56 reads the speed VL of the left driving wheel 14L based on a detection signal from the left front wheel sensor 50. In step S602, the CPU 56 reads the speed VR of the right driving wheel 14R based on a detection signal from the right front wheel sensor 50.

In step S603, the CPU 56 computes the speed ND of the output shaft 20 based on the speeds VL, VR of the driving wheels 14L, 14R. The differential 13, which is shown in FIG. 30, operates such that the half of the sum of the speeds VL and VR of the driving wheels 14L and 14R is equal to the speed ND of the output shaft 20. Therefore, the speed ND of the output shaft 20 is obtained by the following equation.

$$ND=(VL+VR)/2$$

Since the vehicle of the tenth embodiment does not have the rotational speed sensor 30, the speed ND computed in step S603 is used instead of the output shaft speed ND detected by the sensor 30 of FIG. 1. For example, the vehicle speed V is computed based on the speed ND, which is computed in step S603.

In step S604, the CPU 56 computes the acceleration $\Delta$VL of the left driving wheel 14L. The acceleration $\Delta$VL is computed based, for example, on the difference between the speed VL detected last time the routine of FIG. 31 was executed and the speed VL detected in the current execution of the routine of FIG. 31.

In step S605, the CPU 56 computes the acceleration $\Delta$VR of the right driving wheel 14R in the same manner as the acceleration $\Delta$VL of the left wheel 14L is computed.

In step S606, the CPU 56 judges whether the vehicle is accelerating. This judgment is based on whether the average of the accelerations $\Delta$VL and $\Delta$VR of the driving wheels 14L and 14R has a positive value. If the average of the accelerations $\Delta$VL and $\Delta$VR is positive, the CPU 56 judges that the vehicle is accelerating. If the average of the accelerations $\Delta$VL and $\Delta$VR is negative, the CPU 56 judges that the vehicle is decelerating. Whether the vehicle is accelerating may be judged based on whether the speed ND of the output shaft 20, which is detected in step S603, has increased since the last time the routine was executed.

If the vehicle is judged to be accelerating in step S606, the CPU 56 moves to step S607. In step S607, the CPU 56 selects the higher one of the accelerations $\Delta$VL and $\Delta$VR as an acceleration $\alpha$. In this case, the acceleration $\alpha$ has a positive value.

If the vehicle is judged to be decelerating in step S606, the CPU 56 moves to step S608. In step S608, the CPU 56 selects the one of the accelerations $\Delta$VL and $\Delta$VR that has the greater absolute value as the acceleration. In this case, the acceleration $\alpha$ is a negative value and represents deceleration.

The CPU 56 moves to step S609 either from steps S607 or S608. In step S609, the CPU 56 executes vehicle control procedures including the ABS control, the TRC control and the direction switching control using the selected acceleration $\alpha$. The vehicle control procedures include, for example, any of the control procedures described in the embodiments of FIGS. 1 to 25.

Figure 31:
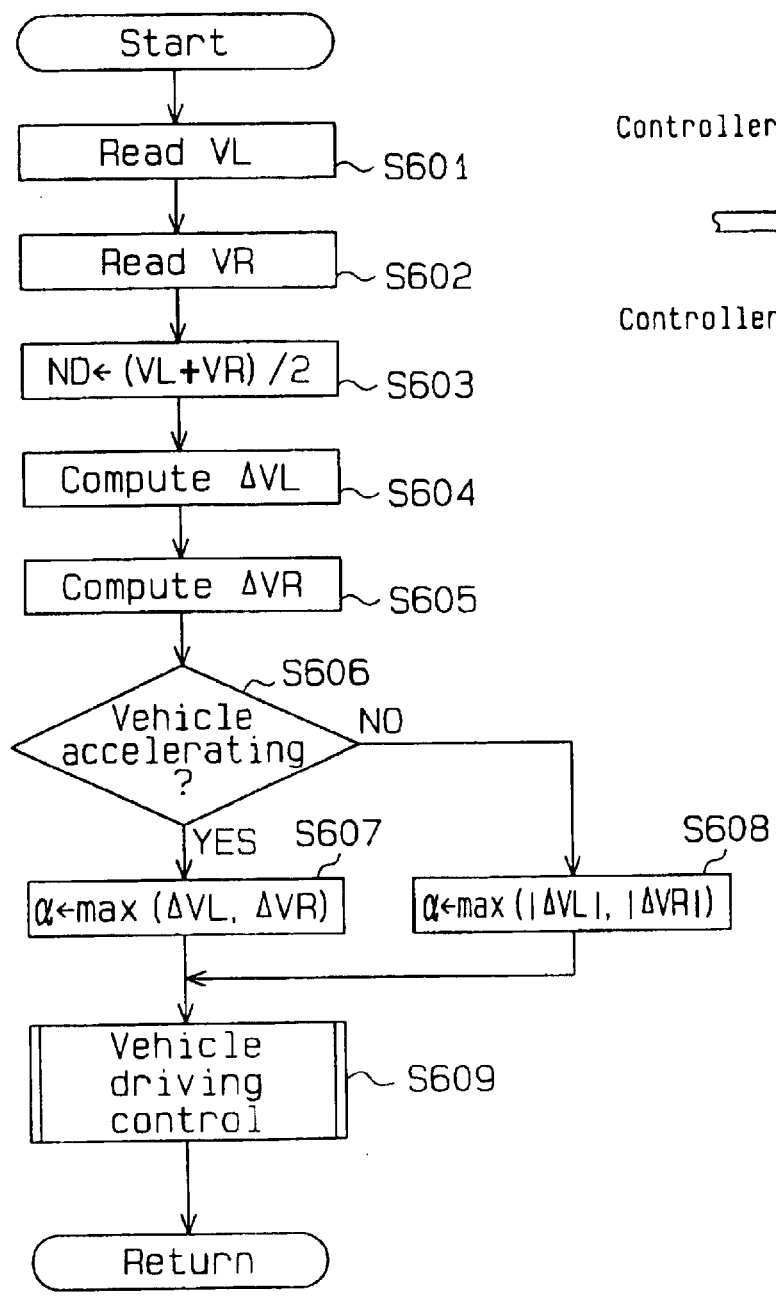
FIG. 31 is a flowchart showing a skidding prevention control routine according to the tenth embodiment.

According to the routine of FIG. 31, control procedures for stopping locking or spinning are executed if one of the wheels 14L, 14R is locked or spins. That is, when the vehicle is accelerating, the higher one of the accelerations $\Delta$VL and $\Delta$VR of the driving wheels 14L and 14R is selected as the acceleration $\alpha$ ($\alpha$>0). When the acceleration $\alpha$ exceeds a value that represents spinning of the wheel 14 (for example, the determination value $\alpha$10 of step S211 in FIG. 10(a)), a control procedure for stopping the spinning is executed in step S609 of FIG. 31.

If the vehicle is decelerating, the one of the accelerations $\Delta$VR and $\Delta$VL that has the greater absolute value is selected as the acceleration $\alpha$ ($\alpha$<0). If the acceleration $\alpha$ falls below a value that represents locking of the wheel 14 (for example, the determination value $\alpha$0 of step S60 in FIG. 6), a procedure control for stopping the locking is executed in step S609.

In this embodiment, the front wheel sensors 50, each of which is located in the vicinity of one of the front wheels 14, separately detects the speed of each front wheel 14. Then, according to the state of one of the wheels 14, the speed of which is changing more rapidly, a control procedure for stopping skidding is executed. Therefore, if at least one of the front wheels 14 is locked or spins, a control procedure for stopping the locking or the spinning is executed.

An eleventh embodiment of the present invention will now be described with reference to FIGS. 32 to 33. Mainly, the differences from the embodiment of FIGS. 30 and 31 will be discussed below. As shown in FIG. 32, the eleventh embodiment is different from the embodiment of FIGS. 30 and 31 in that a rear wheels 73 is provided for each of the rear wheels 72, which are driven wheels. The structures of and about the front wheels 14 are the same as that shown in FIG. 30. That is, the vehicle of the eleventh embodiment has the rear wheel sensors 73 in addition to the front wheel sensors 50.

FIG. 32 diagrammatically shows the structure about the rear wheels 72. An rear axle beam 71 is located at the rear of the vehicle. The rear wheels 72 are supported at the lateral ends of the rear axle beam 71. The rear wheels 72 are driven wheels and are steered by a steering wheel (not shown) provided in the cab. Each rear wheel sensor 73 detects the speed of the corresponding rear wheel 72. A wheel angle sensor 74 detects the angle θ of the rear wheels 72.

A skidding prevention control according to the eleventh embodiment will now be described with reference to the flowchart of FIG. 33. The routine of FIG. 33 is executed at predetermined intervals (for example, ten to fifty milliseconds) while the engine 10 is running. When necessary, the front rear wheel 14 will be referred to as a left driving wheel 14L, and the right front wheel 14 will be referred to as a right driving wheel 14R. Also, the left rear wheel 72 will be referred to as a left driven wheel 72L, and the right rear wheel 72 will be referred to as a right driven wheel 72R.

In step S621, the CPU 56 computes the moving speed VDL of the left driving wheel 14L relative to the road surface based on the speed VL of the left driving wheel 14L, which is detected by the left front wheel sensor 50, and the diameter of the left driving wheel 14L.

In step S622, the CPU 56 computes the moving speed VDR of the right driving wheel 14R relative to the road surface based on the speed VR of the right driving wheel 14R, which is detected by the right front wheel sensor 50, and the diameter of the right driving wheel 14R.

The detected moving speeds VDL, VDR are computed based on the speed VL, VR of the driving wheels 14L, 14R. Therefore, when the driving wheels 14L, 14R spin or are locked, the detected moving speeds VDL, VDR are different from the actual moving speeds of the driving wheels 14L, 14R.

In step S623, the CPU 56 computes a predicted moving speed VFL of the left driving wheel 14L relative to the road surface. In step S624, the CPU 56 computes a predicted moving speed VFR of the right driving wheel 14R relative to the road surface.

The predicted moving speeds VFL, VFR are computed in the following manner. First, the average of the speed of the left driven wheel 72L, which is detected by the left rear wheel sensor 73, and the speed of the right driven wheel 72R, which is detected by the right rear wheel sensor 73, is computed. Then, the vehicle moving speed VF at the midpoint of the driven wheels 72L and 72R is computed based on the average and the diameters of the driven wheels 72L, 72R. The vehicle moving speed VF is used as a value representing the vehicle speed V.

A correction factor KL for the left driving wheel 14L and a correction factor KR for the right driving wheel 14R are computed based on the angle θ of the driven wheels 72L, 72R, which is detected by the angle sensor 74. The vehicle moving speed VF is multiplied by the correction factor KL for obtaining the predicted moving speed VFL of the left driving wheel 14L. Also, the vehicle moving speed VF is multiplied by the correction factor KR for obtaining the predicted moving speed VFR of the right driving wheel 14R.

The predicted moving speeds VFL, VFR are computed based on the speeds of the driven wheels 72L, 72R in steps S623 and S624. The driven wheels 72L, 72R contact the road surface and rotate as the vehicle moves. The driven wheels 72L, 72R are not braked. Therefore, unlike the driving wheels 14L, 14R, the driven wheels 72L, 72R do not skid when the vehicle is accelerating or decelerating. Thus, the predicted moving speeds VFL, VFR substantially accurately represent the actual moving speeds of the driving wheels 14L, 14R regardless of whether the driving wheels 14F, 14R are spinning or locked.

In step S625, the CPU 56 computes a skid value SL of the left driving wheel 14L based on the detected moving speed VDL and the predicted moving speed VFL. The left skid value SL is computed by one of the following equations.

$$SL=(VDL-VFL)/VFL$$

or $$SL=VDL-VFL$$

The left skid value SL computed by the first equation represents a skid rate. The left skid value SL computed by the second equation represents a speed deviation. Regardless of which of the equations is used for computing the skid value SL, the skid value SL is a positive value when the left driving wheel 14L is spinning and is a negative value when the left driving wheel 14L is locked.

In step S626, the CPU 56 computes a skid value SR of the right driving wheel 14R based on the detected moving speed VDR and the predicted moving speed VFR. The right skid value SR is computed by one of the following equations.

$$SR=(VDR-VFR)/VFR$$

or $$SR=VDR-VFR$$

Regardless of which of the equations is used for computing the skid value SR, the skid value SR is a positive value when the right driving wheel 14R is spinning and is a negative value when the right driving wheel 14R is locked.

In step S627, the CPU 56 judges whether the vehicle is accelerating. The judgment is based on whether the vehicle moving speed VF (see the description of steps S623, S624), which is detected at the midpoint of the driven wheels 72L, 72R, has increased since the last time the routine of FIG. 33 was executed.

If the vehicle is judged to be accelerating in step S627, the CPU 56 moves to step S628 and adopts the higher one of the skid values SL and SR as a skid value SV for detecting spinning. In this case, the skid value SV is positive.

If the vehicle is judged to be decelerating in step S627, the CPU 56 moves to step S629. In step S629, the CPU 56 selects the one of the skid values SL and SR that has the greater absolute value as the skid value SV for detecting locking. In this case, the skid value SV is negative.

The CPU 56 moves to step S630 either from step S628 or step S629. In step S630, the CPU 56 executes vehicle control procedures including the ABS control, the TRC control and the direction switching control using the selected skid value SV. Like step S609 in FIG. 31, the vehicle control procedures include, for example, any of the control procedures described in the embodiments of FIGS. 1 to 25. In this case, the skid value SV is used instead of the acceleration α. Also, the spinning detection value and the locking detection value, which correspond to the acceleration α, are replaced by a spinning detection value and a locking detection value, which correspond to the skid value SV.

When the vehicle is accelerating, the higher one of the skid values SL, SR is selected as the skid value SV (SV>0) for detecting spinning. When the skid value SV exceeds a spinning determination value, a procedure for stopping spinning is executed in step S630 of FIG. 33. If the skid rate is used as the skid value SV, the spinning determination value will be set at about 0.2.

When the vehicle is decelerating, one of the skid values SL, SR that has the greater absolute value is adopted as the skid value SV (SV<0) for detecting locking. If the skid value SV falls below a locking determination value, a procedure for stopping locking is executed in step S630 of FIG. 33.

In this embodiment, the skid values SL, SR, which represent the skidding state of the left and right front wheels 14, respectively, are computed. Procedures for stopping skidding are executed based on the one of the skid values SL and SR that has the greater absolute value. Therefore, as in the embodiment of FIGS. 30 and 31, if at least one of the front wheels 14 is locked or spins, a control for stopping the locking or the spinning is executed.

One of the rear wheel sensors 73 may be omitted and the speed of one of the rear wheels 72 may be detected.

A twelfth embodiment of the present invention will now be described. In this embodiment, the differential 13 has a structure that prevent locking and spinning of the front wheels 14 even if only one of the wheels 14 is locks or spins. Therefore, the front wheel sensors 50, which are shown in FIG. 30, and the rear wheel sensors 73, which are shown in FIG. 32, are not required. The vehicle of the twelfth embodiment is the same as the vehicle of FIG. 1 except for the differential 13. That is, the vehicle of the twelfth embodiment has a rotational speed sensor 30 for detecting the speed ND of the output shaft 20. The twelfth embodiment will be described with reference to FIG. 1.

The differential 13 of the twelfth embodiment has a differential limit mechanism (not shown). When there is a speed difference between the shafts 14a, the differential limit mechanism limits a relative rotation between the differential case and a differential gear or between differential gears. Torque generated by limiting the relative rotation increases the torque that is transmitted to the lower speed shaft 14a. The differential limit mechanism is, for example, a rotational speed sensitive type and includes a viscous fluid coupling. The viscous fluid coupling limit relative rotation between gears in the differential 13 by the viscous resistance.

The differential limit mechanism substantially prevents skidding of the front wheels 14 when one of the wheels 14 skids. Skidding of both wheels 14 is detected based on the speed ND of the output shaft 20, which is detected by the rotational speed sensor 30. That is, as the embodiments of FIGS. 1 to 25, the acceleration α is computed based on the speed ND of the output shaft 20. Skidding of both wheels 14 is judged based on the acceleration α. When the wheels 14 are judged to be skidding, the procedures for stopping skidding are executed.

The differential limit mechanism need not be a rotational speed sensitive type, but may be a friction type or a ZF type. Friction type differential limit mechanisms include a torque proportion type, a preload type and a Gleason type, which is a combination of a torque proportion type and a reload type.

In this embodiment, the rear wheel sensors 73, which are shown in FIG. 32, may be used and a procedure of the routine shown in FIG. 33 may be executed. In this case, the detected moving speeds VDL, VDR of the front wheels 14 are computed based on the speed ND of the output shaft 20, which is detected by the rotational speed sensor 30, and have the same value.

Instead of the rotational speed sensor 30, at least one front wheel sensor 50 may be used and a detection value of the front wheel sensor 50 may be used as a replacement for the detection value of the sensor 30.

A thirteenth embodiment of the present invention will now be described with reference to FIG. 34. In the thirteenth embodiment, the embodiments of FIGS. 30 to 33 are applied to a battery-powered forklift. Like or the same reference numerals are given to those components that are like or the same as the corresponding components of the embodiment of FIGS. 1, 30 and 32.

Figure 34:
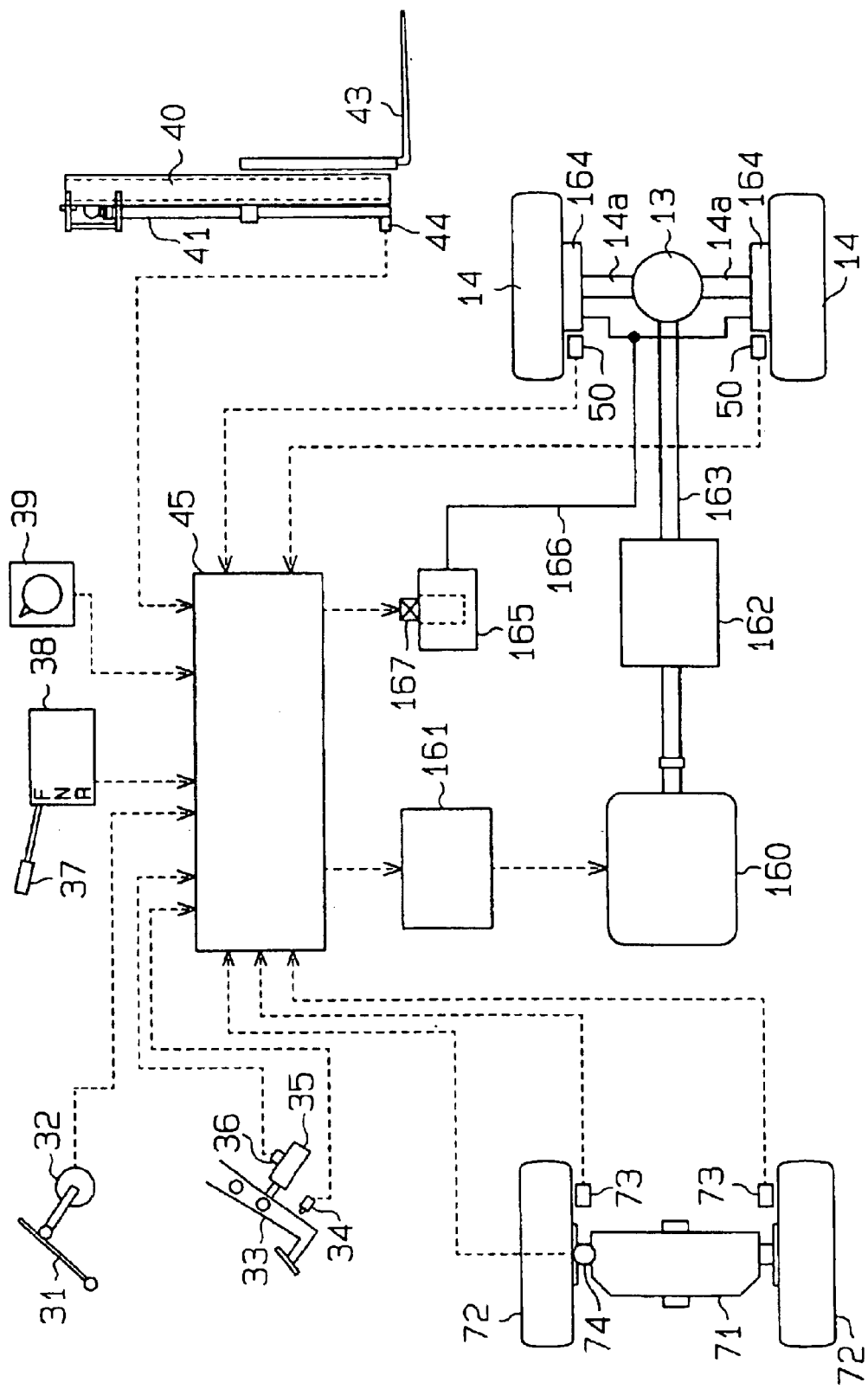
FIG. 34 is a diagrammatic view illustrating a battery-powered forklift according to a thirteenth embodiment of the present invention.

As shown in FIG. 34, a drive source, which is an electric motor 160, is actuated by a drive circuit 161 and the controller 45. The motor 160 is coupled to the differential by a decelerator 162 and an output shaft 163. Each front wheel sensor 50 is located in the vicinity of one of the front wheels 14. Each rear wheel sensor 73 is located in the vicinity of one of the rear wheels 72. The angle sensor 74 detects the steered angle of the rear wheels 72.

A hydraulic brake 164, which functions as a service brake, is located adjacent to each front wheel 14. The hydraulic brakes 164 are connected to a brake valve 165 by a pipe 166. The brake valve 165 receives hydraulic oil from an oil pump (not shown). The controller controls an electromagnetic valve 167, which is installed in the brake valve 165, based on a detection signal from the pressure sensor 36. As a result, the flow rate of oil flowing to the hydraulic brakes 164 is adjusted. Accordingly, the brakes 164 generate braking force, the magnitude of which corresponds to the depression force applied to the brake pedal 33.

The controller 45 controls the motor 160 through the drive circuit 161 in accordance with the pedal depression degree ACC, which is detected by the acceleration pedal sensor 32. Also, the controller 45 controls the rotation direction of the motor 160 through the drive circuit 161 according to the position of the shift lever 37. When the shift lever 37 is shifted for direction switching, the controller 45 commands the drive circuit 161 such that the motor 160 generates a regenerative torque. The regenerative torque brakes the vehicle.

The skidding prevention control of the routine shown in FIG. 33 is executed in the vehicle of FIG. 34. In step S630 of FIG. 33, the torque of the motor 160 is reduced for stopping spinning of the front wheels 14 when the vehicle is accelerating. To prevent the front wheels 14 from locking during deceleration of the vehicle, the hydraulic pressure in the hydraulic brakes 164 is lowered. Alternatively, the torque of the motor 160 may be limited when the vehicle is decelerating.

The rear wheel sensors 73 may be omitted from the vehicle of FIG. 34 and the skidding prevention control may be executed according to the routine of FIG. 31.

The differential 13 shown in FIG. 34 may be replaced by the differential according to the twelfth embodiment, which includes the differential limit mechanism. In this case, as in the twelfth embodiment, a rotational speed sensor for detecting the speed of the output shaft 163 is used, and at least front wheel sensors 50 among the sensors 50 and 73 are omitted.

The embodiments of FIGS. 1 to 25 may be applied to the battery-powered forklift shown in FIG. 34.

When In the vehicle of FIG. 34, the hydraulic brakes 164 function as service brakes and are controlled based on depression of the brake pedal 33. However, the function of the service brake may be replaced by a procedure using a regenerative torque of the motor 160.

The embodiments of FIGS. 1 to 34 may be modified as follows.

The acceleration α may be detected by a sensor that is designed specially for detecting acceleration.

The mode switch 39, which discretely changes the deceleration mode, may be replaced by a switch that continuously changes the deceleration mode.

The transmission 12 may be a dry-clutch type.

The rotational speed sensors 16, 28, 30, which are shown in FIG. 1, may be magnetic sensors, optical sensors or rotary encoders. The front wheels sensors 50, which are shown in FIG. 30, and the rear wheel sensors 73, which are shown in FIG. 32, also may be magnetic sensors, optical sensors or rotary encoders.

The clutch valves 23, 24 and the parking brake valves 26, which are actuated based on the value of a flat level current, may be replaced by electromagnetic valves, which are actuated by a duty-controlled pulse current.

An inching pedal (not shown) may be provided in the cab of the vehicle shown in FIG. 1. When the inching pedal is depressed, one of the clutches 21, 22 that is being used for moving the vehicle is partially engaged. Therefore, the inching pedal is useful when carrying a load and moving the vehicle very slowly. When the brake pedal 33 is depressed, the inching pedal is not moved. However, when the inching pedal is depressed by more than a predetermined depression degree, the brake pedal 33 is moved in the synchronized manner.

The present invention may be applied to industrial vehicles other than forklifts. For example, the present invention may be applied to a bucket loader. Also, the present invention is not limited to four-wheel industrial vehicles but may be applied to three-wheel industrial vehicles. Further, the present invention may be applied to a rear-wheel drive vehicle or an all-wheel drive vehicle.

The present examples and embodiments are to be considered as illustrative and not restrictive and the invention is not to be limited to the details given herein, but may be modified within the scope and equivalence of the appended claims.

What is claimed is:

1. An industrial vehicle comprising:

an engine;

a torque converter;

a transmission coupled to the engine by the torque converter;

a driving wheel, wherein the driving wheel is rotated by power that is transmitted from the transmission;

a hydraulic brake for braking the driving wheel, wherein the hydraulic brake generates a braking force, the magnitude of which corresponds to a hydraulic pressure applied to the hydraulic brake;

a brake valve for adjusting the hydraulic pressure applied to the hydraulic brake;

a brake actuator, which is moved by a human operator to actuate the hydraulic brake;

a sensor for detecting the rotational speed of the driving wheel; and a controller, wherein the controller controls the brake valve such that the hydraulic brake brakes the driving wheel with a force of a normal value, which corresponds to a force applied to the brake actuator, wherein the controller computes the rotational deceleration of the driving wheel while braking based on the detected rotational speed, and wherein, when the computed rotational deceleration exceeds a predetermined deceleration determination value, the controller controls the brake valve such that the braking force of the hydraulic brake is set to a limit value, which is smaller than the normal value, wherein the hydraulic brake is one of a forward clutch and a reverse clutch, which are included in the transmission, the forward clutch being engaged when the vehicle is moving forward, the reverse clutch being engaged when the vehicle is moving backward, each clutch producing an engaging force corresponding to an applied hydraulic pressure, wherein the brake valve is one of a forward clutch valve for adjusting a hydraulic pressure applied to the forward clutch and a reverse clutch valve for adjusting a hydraulic pressure applied to the reverse clutch, wherein, when the vehicle is moving forward, the reverse clutch functions as the hydraulic brake and the reverse clutch valve functions as the brake valve, and wherein, when the vehicle is moving backward, the forward clutch functions as the hydraulic brake and the forward clutch valve functions as the brake valve.

2. The industrial vehicle according to claim 1, wherein the controller increases the braking force of the hydraulic brake as the load weight on the vehicle increases.

3. The industrial vehicle according to claim 1, wherein the driving wheel is one of left and right driving wheels, and the sensor is one of a plurality of sensors, each corresponding to one of the driving wheels, wherein the controller computes the rotational deceleration of each driving wheel based on the rotational speed detected by the corresponding sensor, and wherein, when the rotational deceleration of at least one of the driving wheels exceeds the deceleration determination value, the controller changes the braking force of the hydraulic brake to the limit value.

4. An industrial vehicle comprising:

an engine;

a torque converter;

a transmission coupled to the engine by the torque converter;

a driving wheel, wherein the driving wheel is rotated by power that is transmitted from the transmission;

a hydraulic brake for braking the driving wheel, wherein the hydraulic brake generates a braking force, the magnitude of which corresponds to a hydraulic pressure applied to the hydraulic brake;

a brake valve for adjusting the hydraulic pressure applied to the hydraulic brake;

a brake actuator, which is moved by a human operator to actuate the hydraulic brake;

a parking brake located on an output shaft;

a sensor for detecting the rotational speed of the driving wheel; and a controller, wherein the controller controls the brake valve such that the hydraulic brake brakes the driving wheel with a force of a normal value, which corresponds to a force applied to the brake actuator, wherein the controller computes the rotational deceleration of the driving wheel while braking based on the detected rotational speed, and wherein, when the computed rotational deceleration exceeds a predetermined deceleration determination value, the controller controls the brake valve such that the braking force of the hydraulic brake is set to a limit value, which is smaller than the normal value, wherein, when the vehicle speed is lower than a predetermined determination value, the controller maintains the braking force of the hydraulic brake at the normal value regardless of the rotational deceleration, and wherein the parking brake is switched from a non-braking state to a braking state by the controller if the vehicle speed is lower than a predetermined value.

5. An industrial vehicle comprising:

an engine;

a torque converter;

a transmission coupled to the engine by the torque converter;

a driving wheel, wherein the driving wheel is rotated by power that is transmitted from the transmission;

a hydraulic brake for braking the driving wheel, wherein the hydraulic brake generates a braking force, the magnitude of which corresponds to a hydraulic pressure applied to the hydraulic brake;

a brake valve for adjusting the hydraulic pressure applied to the hydraulic brake;

a brake actuator, which is moved by a human operator to actuate the hydraulic brake;

a sensor for detecting the rotational speed of the driving wheel; and a controller, wherein the controller controls the brake valve such that the hydraulic brake brakes the driving wheel with a force of a normal value, which corresponds to a force applied to the brake actuator, wherein the controller computes the rotational deceleration of the driving wheel while braking based on the detected rotational speed, and wherein, when the computed rotational deceleration exceeds a predetermined deceleration determination value, the controller controls the brake valve such that the braking force of the hydraulic brake is set to a limit value, which is smaller than the normal value, wherein the controller controls the brake valve such that the braking force of the hydraulic brake is increased to the normal value after being decreased to the limit value, and wherein the normal value of the braking force is gradually decreased each time the braking force is increased to the normal value from the limit value.

6. The industrial vehicle according to claim 5, wherein the hydraulic brake is one of a forward clutch and a reverse clutch, which are included in the transmission, the forward clutch being engaged when the vehicle is moving forward, the reverse clutch being engaged when the vehicle is moving backward, each clutch producing an engaging force corresponding to an applied hydraulic pressure, wherein the brake valve is one of a forward clutch valve for adjusting a hydraulic pressure applied to the forward clutch and a reverse clutch valve for adjusting a hydraulic pressure applied to the reverse clutch, wherein, when the vehicle is moving forward, the reverse clutch functions as the hydraulic brake and the reverse clutch valve functions as the brake valve, and wherein, when the vehicle is moving backward, the forward clutch functions as the hydraulic brake and the forward clutch valve functions as the brake valve.

7. The industrial vehicle according to claim 5, wherein the hydraulic brake is a hydraulic-clutch type parking brake.

8. The industrial vehicle according to claim 5, wherein, when the rotational deceleration exceeds a predetermined reference value, the controller computes the difference between the rotational deceleration and the reference value, and wherein, when the braking force of the hydraulic brake is increased from the limit value to the normal value, the controller decreases the normal value by a degree that corresponds to an accumulated value of the difference.

9. The industrial vehicle according to claim 8, further comprising a mode selector for selecting one deceleration mode among plural deceleration modes for determining a deceleration feel while braking, and wherein the controller modifies the reference value in accordance with the selected deceleration mode.

10. An industrial vehicle comprising:

an engine;

a torque converter;

a transmission coupled to the engine by the torque converter;

a driving wheel, wherein the driving wheel is rotated by power that is transmitted from the transmission;

a hydraulic brake located in a power transmission path between the torque converter and the driving wheel to brake the driving wheel, wherein the hydraulic brake generates a braking force, the magnitude of which corresponds to a hydraulic pressure applied to the hydraulic brake;

a brake valve for adjusting the hydraulic pressure applied to the hydraulic brake;

a brake actuator, which is moved by a human operator to actuate the hydraulic brake;

a sensor for detecting the rotational speed of the driving wheel;

a controller, wherein the controller controls the brake valve such that the hydraulic brake brakes the driving wheel with a force of a normal value, which corresponds to a force applied to the brake actuator, wherein the controller computes the rotational deceleration of the driving wheel while braking based on the detected rotational speed, and wherein, when the computed rotational deceleration exceeds a predetermined deceleration determination value, the controller controls the brake valve such that the braking force of the hydraulic brake is set to a limit value, which is smaller than the normal value; and a wheel brake located at the driving wheel to directly brake the driving wheel in response to actuation of the brake actuator.

11. An industrial vehicle comprising:

an engine;

a torque converter;

a transmission coupled to the engine by the torque converter, wherein the transmission includes a hydraulic forward clutch, which is engaged when the vehicle is moving forward, and a hydraulic reverse clutch, which is engaged when the vehicle is moving backward, and wherein each clutch produces an engaging force, the magnitude of which corresponds to a hydraulic pressure applied to the clutch;

a driving wheel, wherein the driving wheel is rotated by power that is transmitted from the transmission;

a hydraulic brake for braking the driving wheel, wherein the hydraulic brake generates a braking force, the magnitude of which corresponds to a hydraulic pressure applied to the hydraulic brake;

a brake valve for adjusting the hydraulic pressure applied to the hydraulic brake;

a brake actuator, which is moved by a human operator to actuate the hydraulic brake;

a sensor for detecting the rotational speed of the driving wheel;

a controller, wherein the controller controls the brake valve such that the hydraulic brake brakes the driving wheel with a force of a normal value, which corresponds to a force applied to the brake actuator, wherein the controller computes the rotational deceleration of the driving wheel while braking based on the detected rotational speed, and wherein, when the computed rotational deceleration exceeds a predetermined deceleration determination value, the controller controls the brake valve such that the braking force of the hydraulic brake is set to a limit value, which is smaller than the normal value;

a forward clutch valve for adjusting a hydraulic pressure applied to the forward clutch;

a reverse clutch valve for adjusting a hydraulic pressure applied to the reverse clutch; and a shift actuator, which is shifted between a forward position for moving the vehicle forward and a reverse position for moving the vehicle backward, wherein, when the shift actuator is shifted to the forward position, the controller controls the forward clutch valve to engage the forward clutch, and when the shift actuator is shifted to the reverse position, the controller controls the reverse clutch valve to engage the reverse clutch, and wherein, when direction switching is performed, in which the shift actuator is moved from the forward position to the reverse position or from the reverse position to the forward position while the vehicle is moving, the controller executes a vehicle deceleration control procedure for switching the moving direction of the vehicle, wherein during the vehicle deceleration control procedure, the controller limits the engine speed to be equal to or lower than a predetermined upper limit value.

12. The industrial vehicle according to claim 1, wherein the controller changes the upper limit value in accordance with the weight of a load carried by the vehicle.

13. The industrial vehicle according to claim 11, wherein, during the vehicle deceleration control procedure, the controller controls one of the clutch valves that corresponds to a post-shifting clutch, which is one of the clutches that corresponds to the position of the shift actuator after the shift actuator is shifted, such that the post-shifting clutch brakes the driving wheel.

14. The industrial vehicle according to claim 13, wherein, during the vehicle deceleration control procedure, the controller controls one of the clutch valves that corresponds to the post-shifting clutch such that the post-shifting clutch is partially engaged.

15. The industrial vehicle according to claim 13, further comprising a mode selector for selecting one deceleration mode among plural deceleration modes for determining a deceleration feel while braking, and wherein, during the vehicle deceleration control procedure, the controller changes the engaging force of the post-shifting clutch in accordance with the selected deceleration mode.

16. The industrial vehicle according to claim 13, wherein, during the vehicle deceleration control procedure, the controller changes the engaging force of the post-shifting clutch in accordance with the weight of a load carried by the vehicle.

17. The industrial vehicle according to claim 13, wherein, during the vehicle deceleration control procedure, the controller computes the rotational deceleration of the driving wheel based on the rotational speed detected by the sensor, and wherein, when the computed rotational deceleration exceeds the deceleration determination value, the controller controls one of the clutch valves that corresponds to the post-shifting clutch to decrease the engaging force of the post-shifting clutch.

18. The industrial vehicle according to claim 17, wherein the driving wheel is one of left and right driving wheels, and the sensor is one of a plurality of sensors, each corresponding to one of the driving wheels, wherein the controller computes the rotational deceleration of each driving wheel based on the rotational speed detected by the corresponding sensor, and wherein, when the rotational deceleration of at least one of the driving wheels exceeds the deceleration determination value, the controller decreases the engaging force of the post-shifting clutch.

19. The industrial vehicle according to claim 13, wherein, when direction switching is performed, the controller computes a predicted period, from when the direction switching is performed until when the vehicle speed reaches a level at which the vehicle can be started in a direction that is opposite to the current moving direction without creating shock, based on the rotational speed detected by the sensor, and wherein the controller continues the vehicle deceleration control procedure at least until the predicted period has elapsed.

20. The industrial vehicle according to claim 19, wherein, when direction switching is performed, the controller computes the vehicle speed based on the rotational speed detected by the sensor and computes the vehicle deceleration in accordance with the engaging force of the post-shifting clutch, and wherein the controller computes the predicted period based on the computed vehicle speed and the computed vehicle deceleration.

21. The industrial vehicle according to claim 19, wherein, when the predicted period has elapsed and the vehicle speed, which is computed based on the detected rotational speed, is judged to have fallen below a predetermined value, the controller terminates the vehicle deceleration control procedure.

22. The industrial vehicle according to claim 19, wherein, when the predicted period has elapsed and the difference between an input rotational speed and an output rotational speed of the post-shifting clutch falls below a predetermined value, the controller terminates the vehicle deceleration control procedure.

23. The industrial vehicle according to claim 13, wherein the controller judges whether the driving wheel has changed from a decelerating state to an accelerating state based on the rotational speed detected by the sensor, and wherein the controller continues the vehicle deceleration control procedure at least until the driving wheel has changed to an accelerating state.

24. The industrial vehicle according to claim 23, wherein, when the driving wheel has changed to an accelerating state and the difference between an input rotational speed and an output rotational speed of the post-shifting clutch falls below a predetermined value, the controller terminates the vehicle deceleration control procedure.

25. The industrial vehicle according to claim 23, wherein, during the vehicle deceleration control procedure, the controller computes the rotational deceleration of the driving wheel based on the rotational speed detected by the sensor, and wherein, when the computed rotational deceleration exceeds the deceleration determination value, the controller controls one of the clutch valves that corresponds to the post-shifting clutch to decrease the engaging force of the post-shifting clutch, and wherein the controller stops judging whether the driving wheel has changed from a decelerating state to an accelerating state for a predetermined period during which the driving wheel can be shifted to an accelerating state due to a decrease of the engaging force of the post-shifting clutch.

26. The industrial vehicle according to claim 13, wherein the controller starts a vehicle starting control procedure after terminating the vehicle deceleration control procedure, and wherein, during the vehicle starting control procedure, the controller controls one of the clutch valves that corresponds to the post-shifting clutch such that the post-shifting clutch rotates the driving wheel.

27. The industrial vehicle according to claim 26, wherein, during the vehicle starting control procedure, the controller computes the rotational acceleration of the driving wheel based on the rotational speed detected by the sensor, and wherein, when the computed acceleration exceeds a predetermined acceleration determination value, the controller controls one of the clutch valves that corresponds to the post-shifting clutch to decrease the engaging force of the post-shifting clutch so that the power transmitted to the driving wheel decreases.

28. The industrial vehicle according to claim 27, wherein the driving wheel is one of left and right driving wheels, and the sensor is one of sensors, each corresponding to one of the driving wheels, wherein the controller computes the rotational acceleration of each driving wheel based on the rotational speed detected by the corresponding sensor, and wherein, when the rotational acceleration of at least one of the driving wheels exceeds the acceleration determination value, the controller decreases an engaging force of the post-shifting clutch.

* * * * *

UNITED STATES PATENT AND TRADEMARK OFFICE
CERTIFICATE OF CORRECTION

PATENT NO. : 6,782,961 B1
DATED : August 31, 2004
INVENTOR(S) : Kazuo Ishikawa et al.

It is certified that error appears in the above-identified patent and that said Letters Patent is hereby corrected as shown below:

Column 23,
Line 57, please delete "3325", and insert therefore -- S325 --

Column 25,
Line 36, please delete "$\Sigma\Delta\alpha$" and insert therefore -- $\Sigma\Delta\alpha'$ --

Column 51,
Line 30, please delete "claim 1" and insert -- claim 11 --

Signed and Sealed this

Twenty-fifth Day of January, 2005

JON W. DUDAS
*Director of the United States Patent and Trademark Office*